(12) United States Patent
Yamashita et al.

(10) Patent No.: US 8,335,425 B2
(45) Date of Patent: Dec. 18, 2012

(54) PLAYBACK APPARATUS, PLAYBACK METHOD, AND PROGRAM FOR PERFORMING STEREOSCOPIC PLAYBACK

(75) Inventors: Ken Yamashita, Nara (JP); Germano Leichsenring, Osaka (JP)

(73) Assignee: Panasonic Corporation, Osaka (JP)

( * ) Notice: Subject to any disclaimer, the term of this patent is extended or adjusted under 35 U.S.C. 154(b) by 149 days.

(21) Appl. No.: 12/620,066

(22) Filed: Nov. 17, 2009

(65) Prior Publication Data
US 2010/0142924 A1  Jun. 10, 2010

Related U.S. Application Data

(60) Provisional application No. 61/115,747, filed on Nov. 18, 2008.

(51) Int. Cl.
*H04N 9/80* (2006.01)
(52) U.S. Cl. .......................... 386/248; 386/341; 348/51
(58) Field of Classification Search .................. 386/341, 386/357, 248, 244; 348/51
See application file for complete search history.

(56) References Cited

U.S. PATENT DOCUMENTS

| | | | | |
|---|---|---|---|---|
| 5,784,097 A * | 7/1998 | Iinuma et al. | | 348/43 |
| 6,005,607 A * | 12/1999 | Uomori et al. | | 348/42 |
| 7,403,201 B2 * | 7/2008 | Takemoto et al. | | 345/419 |
| 7,605,776 B2 * | 10/2009 | Satoh et al. | | 345/9 |
| 7,643,672 B2 * | 1/2010 | Era | | 382/154 |
| 2002/0118275 A1 * | 8/2002 | Harman | | 348/51 |
| 2003/0043918 A1 | 3/2003 | Jiang et al. | | |
| 2003/0053797 A1 | 3/2003 | Oshima et al. | | |
| 2003/0090711 A1 * | 5/2003 | Yoshii et al. | | 358/1.15 |
| 2003/0198392 A1 | 10/2003 | Jiang et al. | | |
| 2005/0078108 A1 * | 4/2005 | Swift et al. | | 345/419 |
| 2005/0122342 A1 * | 6/2005 | Miyamoto et al. | | 345/589 |
| 2006/0203085 A1 * | 9/2006 | Tomita | | 348/51 |
| 2006/0204075 A1 * | 9/2006 | Mashitani et al. | | 382/154 |
| 2006/0204092 A1 * | 9/2006 | Hamasaka et al. | | 382/173 |
| 2006/0290778 A1 * | 12/2006 | Kitaura et al. | | 348/51 |
| 2007/0086727 A1 | 4/2007 | Tanaka et al. | | |
| 2007/0236493 A1 | 10/2007 | Horiuchi et al. | | |
| 2007/0286575 A1 | 12/2007 | Oashi et al. | | |

(Continued)

FOREIGN PATENT DOCUMENTS

JP  8-249493  9/1996

(Continued)

OTHER PUBLICATIONS

Taiwan Office action, mail date is Jan. 30, 2012 along with an English translation thereof.

*Primary Examiner* — David Harvey
(74) *Attorney, Agent, or Firm* — Greenblum & Bernstein, P.L.C.

(57) ABSTRACT

In performing stereoscopic view, a shift information memory (21) stores, as a number of pixel lengths, an offset indicating how far in a right direction or a left direction to move coordinates of pixels to realize stereoscopic view. When realizing stereoscopic view, a plane shift engine (20) moves the coordinates of image data in a graphics plane in the right direction or the left direction by the number of pixel lengths indicated by the offset. When a scale of video data targeted for stereoscopic view is changed by a basic graphics plane (15), a shift distance of pixel coordinates by the plane shift engine (20) is based on a number of pixel lengths obtained by multiplying the offset by a changed scaling factor in the horizontal direction.

2 Claims, 54 Drawing Sheets

U.S. PATENT DOCUMENTS

| | | |
|---|---|---|
| 2008/0145031 A1 | 6/2008 | Tanaka et al. |
| 2008/0192067 A1 | 8/2008 | Barenbrug et al. |
| 2009/0142041 A1* | 6/2009 | Nagasawa et al. ............ 386/124 |
| 2009/0160934 A1* | 6/2009 | Hendrickson et al. .......... 348/47 |
| 2009/0284584 A1* | 11/2009 | Wakabayashi et al. ......... 348/44 |
| 2009/0324202 A1 | 12/2009 | Okubo et al. |
| 2010/0014580 A1 | 1/2010 | Tanaka et al. |
| 2010/0021145 A1 | 1/2010 | Oashi et al. |
| 2010/0104262 A1* | 4/2010 | Kanamaru et al. ............... 386/95 |
| 2010/0150529 A1* | 6/2010 | Leichsenring et al. ......... 386/95 |
| 2010/0254678 A1* | 10/2010 | Kobayashi .................... 386/108 |
| 2011/0032327 A1* | 2/2011 | Ikeda et al. ..................... 348/42 |
| 2011/0187817 A1* | 8/2011 | Sasaki et al. .................... 348/42 |
| 2011/0211815 A1* | 9/2011 | Yamashita et al. ............ 386/353 |
| 2011/0304691 A1* | 12/2011 | Newton et al. .................. 348/43 |

FOREIGN PATENT DOCUMENTS

| | | |
|---|---|---|
| JP | 2000-067265 | 3/2000 |
| JP | 2004-248212 | 9/2004 |
| JP | 2004-274125 | 9/2004 |
| JP | 2005-004341 | 1/2005 |
| JP | 2008/245293 | * 10/2008 |
| TW | 502541 | 9/2002 |
| WO | 2005/119675 | 12/2005 |
| WO | 2007/116549 | 10/2007 |
| WO | WO 2007/111208 | * 10/2007 |

* cited by examiner

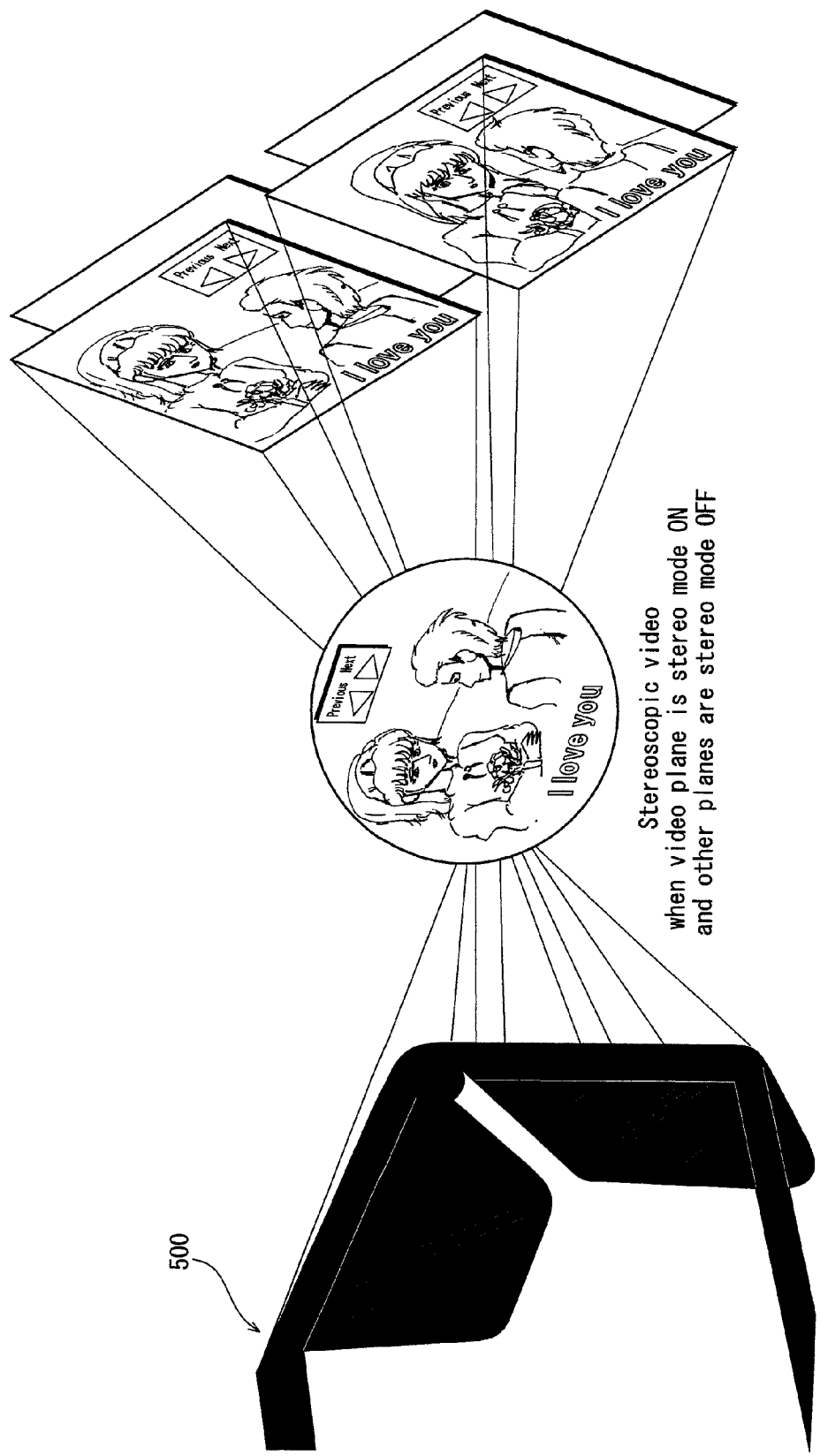

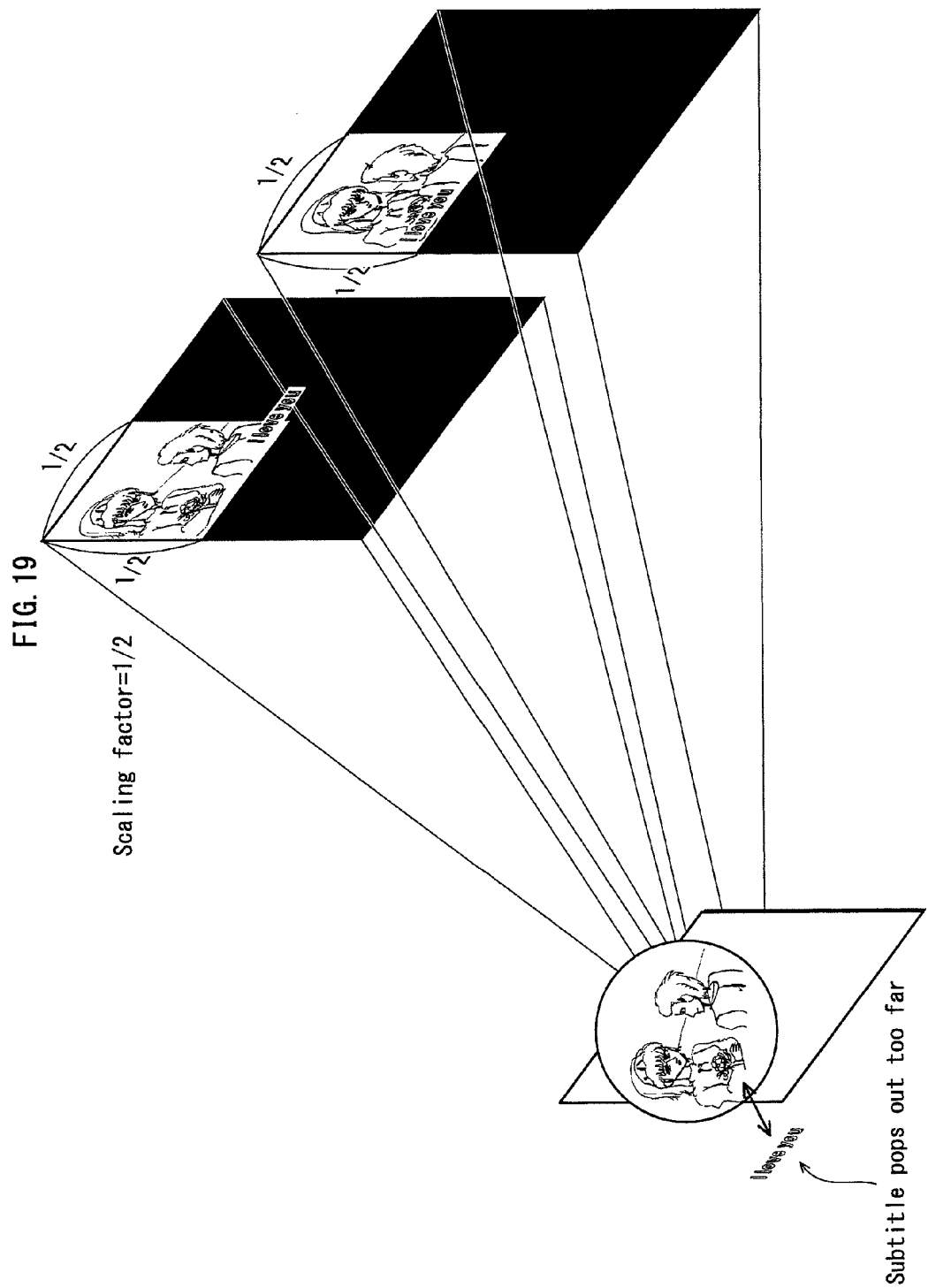

□ ··· 8-bit area (stores pixel code representing YCrCb α)

| Y value | Cr value | Cb value | Transparency α |

□ ··· Transparent pixel  Expressed with pixel code indicating a transparent color ■ ··· Colored pixel  Expressed with pixel code indicating a color other than transparent 1Shift 15 pixels to the right Shift 15 pixels to the left Shift 15 pixels to the right Shift 15 pixels to the left

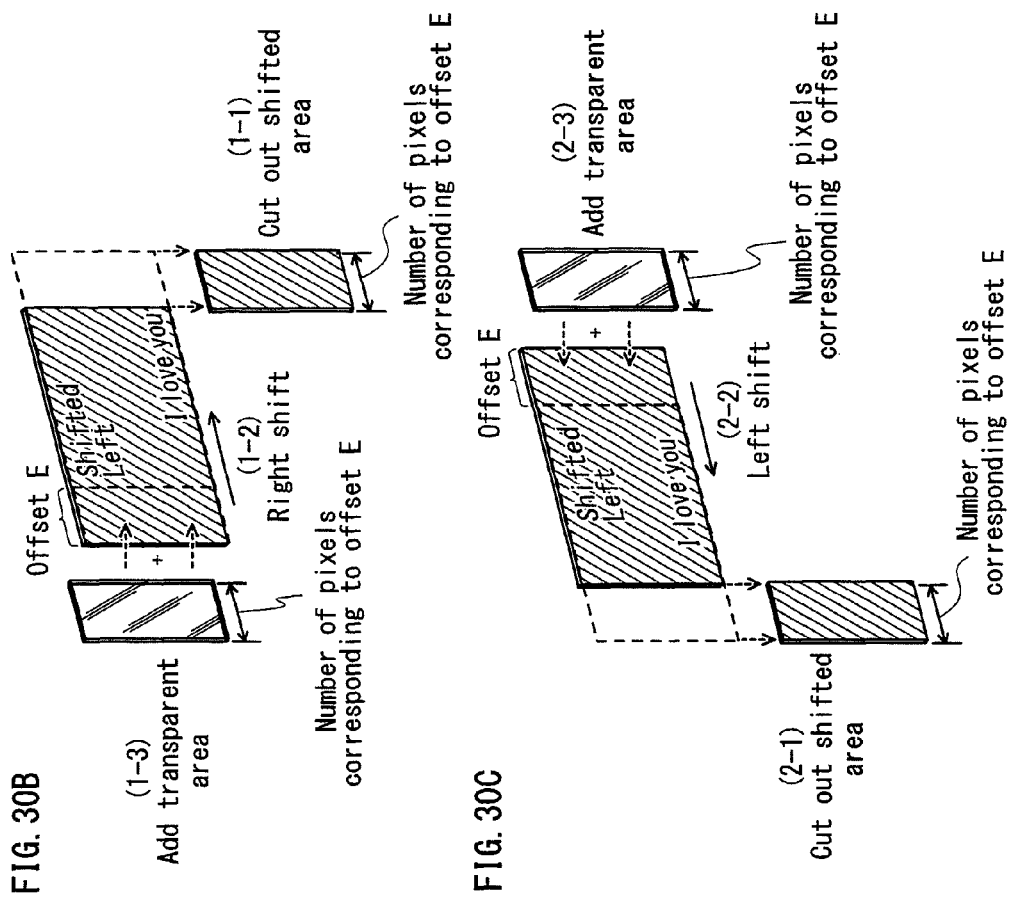
FIG. 30B
FIG. 30C
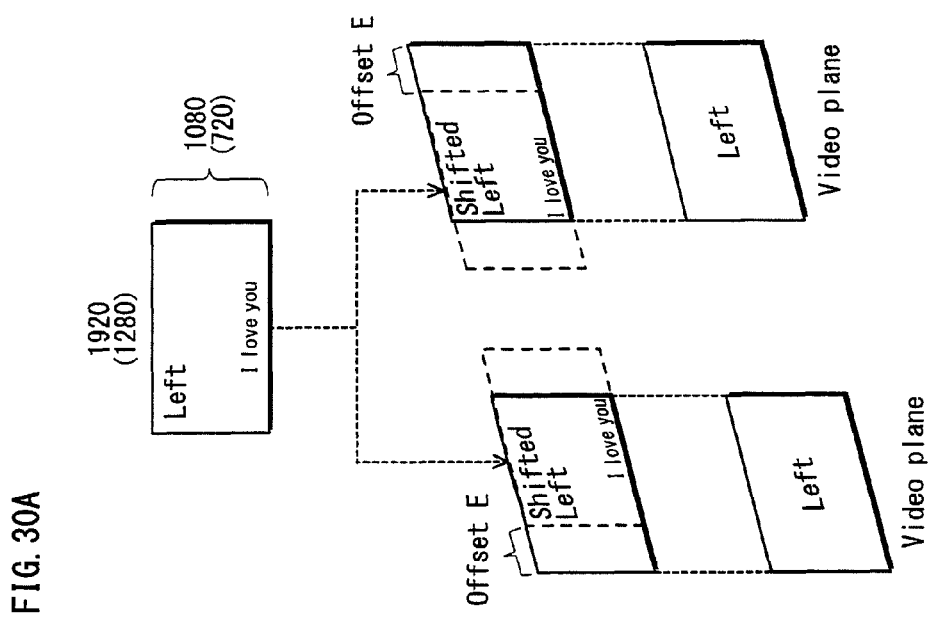
FIG. 30A

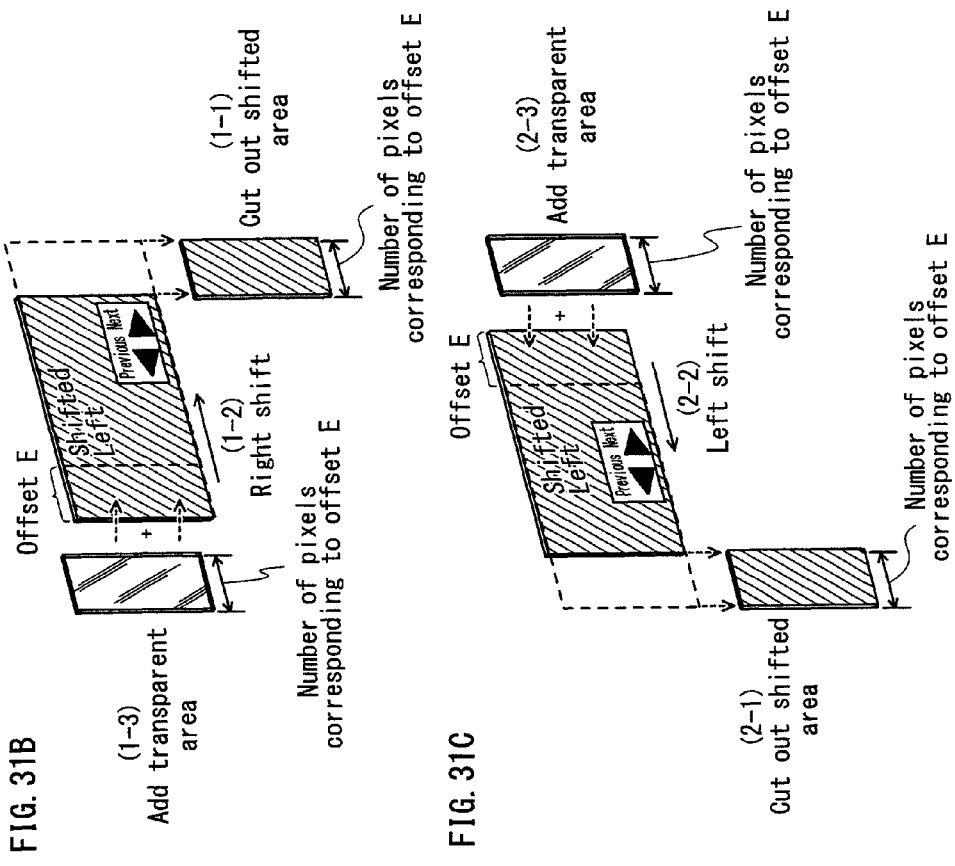
FIG. 31B
FIG. 31C
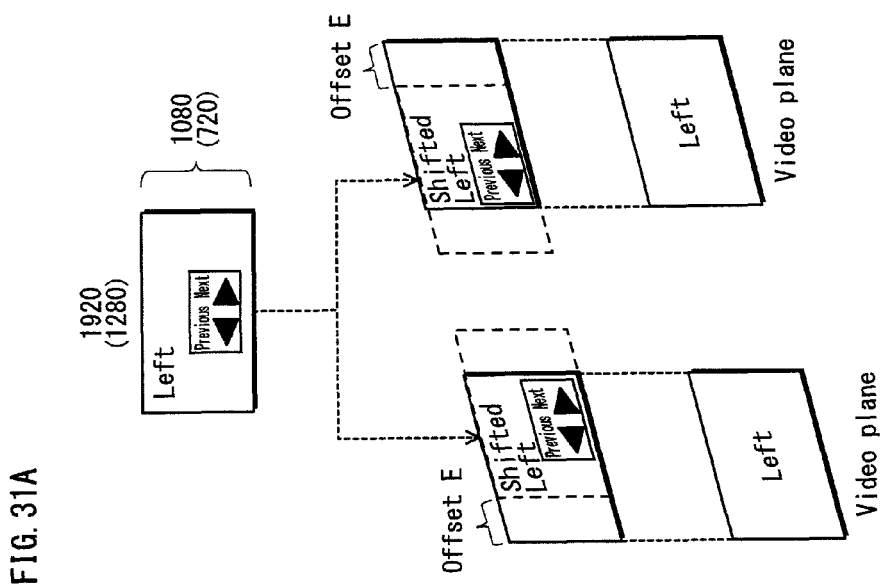
FIG. 31A

FIG. 32

| 0001 | 0002 | 0003 | 0004 | ... | 07A5 | 07A6 | 07A7 | 07A8 |
|---|---|---|---|---|---|---|---|---|
| (0,0) | (1,0) | (2,0) | (3,0) | ... | (1916,0) | (1917,0) | (1918,0) | (1919,0) |

| 07A9 | 07AA | 07AB | 07AC | ... | 0EE9 | 0EEA | 0EEB | 0EEC |
|---|---|---|---|---|---|---|---|---|
| (0,1) | (1,1) | (2,1) | (3,1) | ... | (1916,1) | (1917,1) | (1918,1) | (1919,1) |

| 0EED | 0EEE | 0EEF | 0EF0 | ... | 1677 | 1678 | 1679 | 1680 |
|---|---|---|---|---|---|---|---|---|
| (0,2) | (1,2) | (3,2) | (4,2) | ... | (1916,2) | (1917,2) | (1918,2) | (1919,2) |

| 1681 | 1682 | 1683 | 1684 | ... | 1DFD | 1DFE | 1DFE | 1E00 |
|---|---|---|---|---|---|---|---|---|
| (0,3) | (0,3) | (3,3) | (4,3) | ... | (1916,3) | (1917,3) | (1918,3) | (1919,3) |

Addresses of storage elements in plane memory

☐ : Storage element   (xx,yy) : Coordinates of image data stored in storage element

FIG. 35

Display mode storage unit 29

Display mode: 2D or 3D

Background plane setting

Resolution: YY x ZZ
Stereo mode: ON or OFF
THREE_D: ON or OFF

Video plane setting

Resolution: YY x ZZ
Stereo mode: ON or OFF
THREE_D: ON or OFF

Image plane setting

Resolution: YY x ZZ
Stereo mode: ON or OFF
THREE_D: ON or OFF
Plane offset: -63~63

Interactive graphics plane setting

Resolution: YY x ZZ
Stereo mode: ON or OFF
THREE_D: ON or OFF
Plane offset: -63~63

Display setting

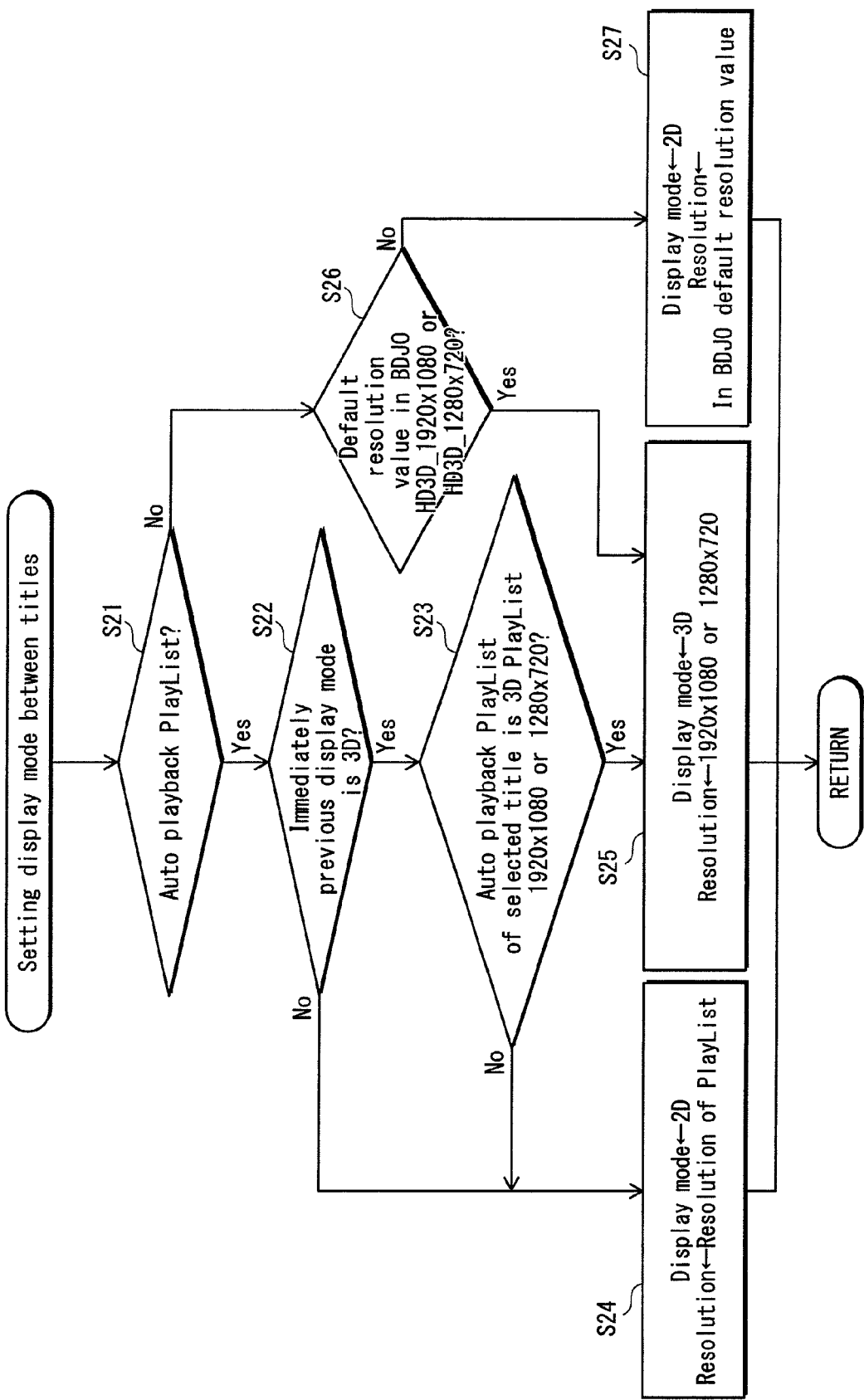

FIG. 38
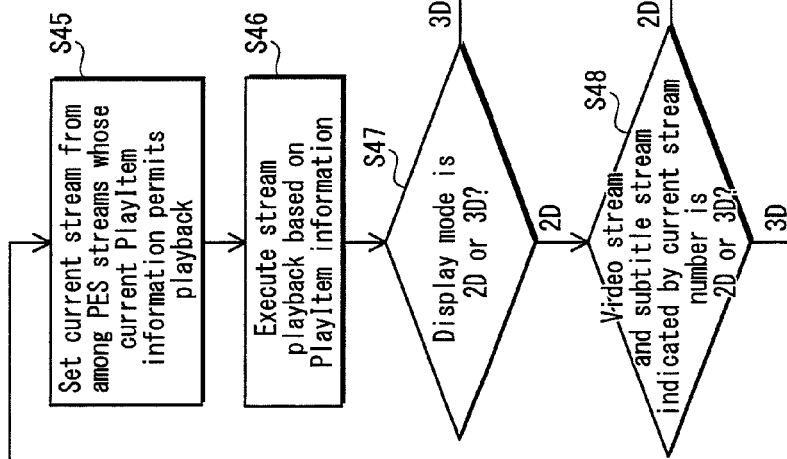
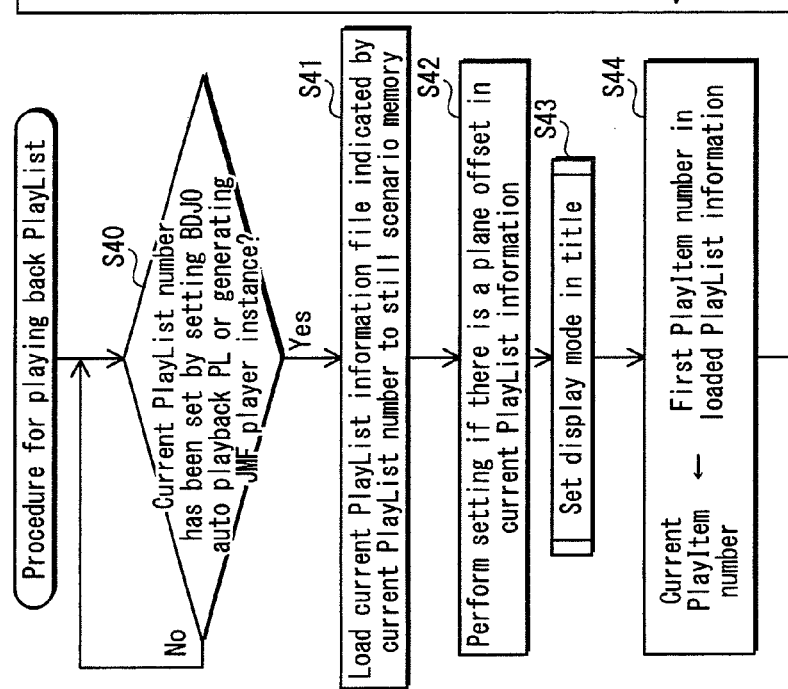

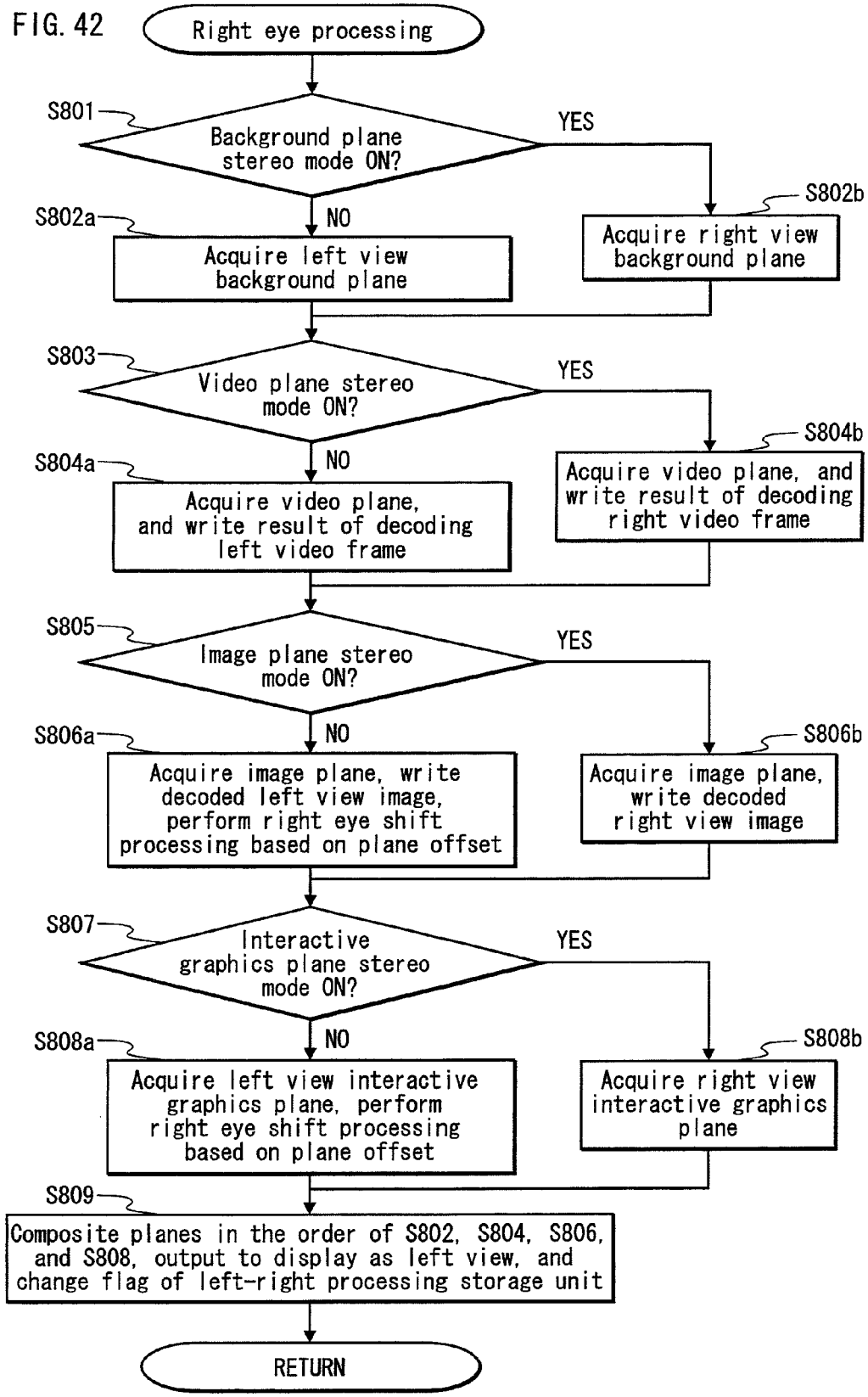

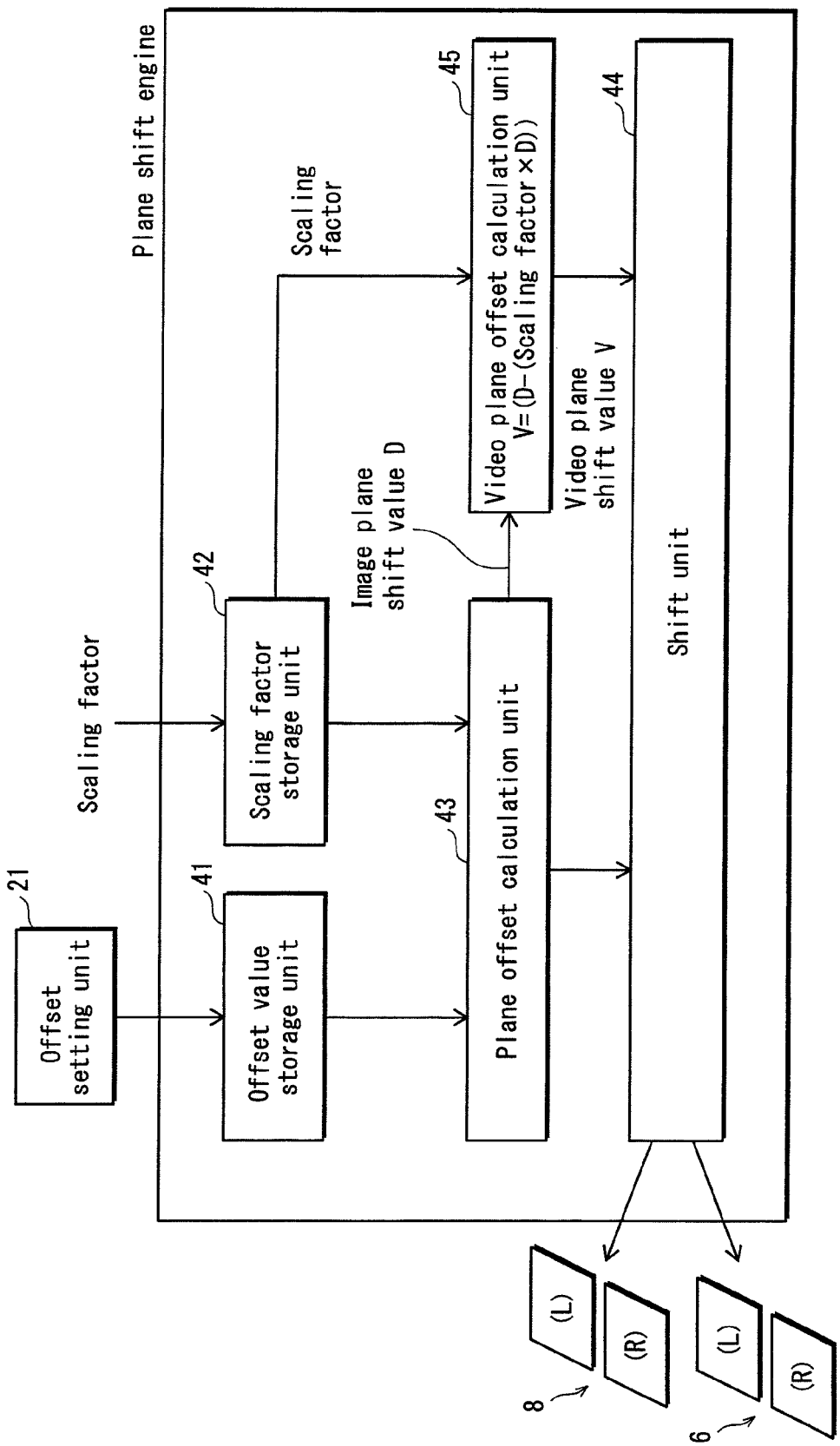

PLAYBACK APPARATUS, PLAYBACK METHOD, AND PROGRAM FOR PERFORMING STEREOSCOPIC PLAYBACK

BACKGROUND OF THE INVENTION (1) Field of the Invention

The present invention belongs to the technical field of stereoscopic playback.

(2) Background Art

Stereoscopic playback technology introduces a mechanism for showing different pictures to the left eye and the right eye, and uses a parallax between the eyes to create the illusion of a stereoscopic video.

Although currently the mainstream application of stereoscopic playback technology is use in theaters and the like, a use mode for enjoying stereoscopic playback on a playback apparatus or a display at home is expected to rapidly become widespread in the near future.

There are various methods for displaying a stereoscopic video to users (stereoscopic display). For example, one common method is to use shutter glasses. In this method, the shutter glasses alternately block a viewer's left eye field of view and then the viewer's right eye field of view at high speed, while a display image for the left eye and a display image for the right eye are alternately updated at high speed in synchronization with the blocking operation of the shutter glasses. This operation results in the image for the left eye on the display being visible only to the left eye, and the image for the right eye on the display being visible only to the right eye.

In order to allow the viewers to view the stereoscopic video at the same frame rate as normal monoscopic video, the playback apparatus must play back two videos to be seen respectively by the right eye and the left eye, and the display requires a response performance twice as high as the response performance needed for the normal monoscopic video. This means, for example, that it is necessary to switch among at least 120 frames per second in order to display video consisting of 60 frames per second. Patent Literature 1 listed below is conventional technology disclosing a playback apparatus for home use, and Patent Literature 2 is conventional technology disclosing stereoscopic playback.

CITATION LIST

Patent Literature

Patent Literature 1

International Publication No. 2005/119675

Patent Literature 2

International Publication No. 2008/0192067

SUMMARY OF THE INVENTION

When considering the recording and distribution of recording media, such as optical disks, of movie works that can be stereoscopically displayed, there is disagreement about how to realize a composite video, in which graphics such as subtitles and GUI in the moving images are composited.

One method is preparing a left eye and a right eye video stream, separately preparing left eye subtitles and right eye subtitles, and superimposing each subtitle on a corresponding video stream.

The second method is, as disclosed in Patent Literature 2, a method using one video stream and depth information corresponding to the video stream to give a stereoscopic effect to the video, and superimposing a subtitle object on the video. In patent document 2, using Zero parallax, that is, eliminating depth, when displaying the portion of video on which subtitles overlap enables avoiding giving viewers a sense of difference in depth between the subtitles and the video.

In the third method, a left eye video stream and a right eye video stream are prepared in advance, one subtitle object is prepared for both streams, and by causing a plane shift based on depth information, a subtitle with a stereoscopic effect is superimposed on each video stream.

In the first method, since not only the video stream, but also the graphics stream for subtitles and GUI must be created for both left and right views, the authoring load is large. In contrast, in the second method, it is not necessary to create left and right graphics streams for subtitle display, and thus the authoring load is reduced. However, since the sense of depth is lost in the portion where the subtitle overlaps with the stream, the visual effect is not ideal.

In the third method using plane shift, it is not necessary to create both left- and right-view graphics streams for subtitles and GUI, and also the sense of depth is not lost in the portion where the subtitles or GUI overlap the video, so this is the most ideal. However, when executing a scaling function for enlarging and reducing the screen being displayed, negative effects occur.

When executing a stereoscopic view of a video stream by playing back a video to be seen from a left view and a video to be seen from a right view, even when scaling is performed, since the video to be seen from a left view and the video to be seen from the right view is merely enlarged or reduced, there is no hindrance to stereoscopic view.

However since the graphics used for left view and right view are shared, although the text is reduced due to scaling, the position of the text remains the same as before scaling, and the depth of the subtitle text is preserved. This results in a case in which although the depth of the video has been reduced, the subtitle remains the same, and there is a sharp difference in stereoscopic effect between the video and the subtitles/GUI during scaling.

Before and after scaling, if an interval between the subtitle for the left view and the subtitle for the right view is maintained, and only the depth of the video changes, the extent to which the video pops out is identical to the extent to which the subtitle pops out, and compared to before scaling, the subtitles have largely shifted after the scaling relative to a video plane. As a result, there is a risk of discomfort to the viewer due to the sharp difference in stereoscopic effect between the video and the subtitles. From the viewpoint of protecting consumers, this is undesirable since eyestrain in the viewers increases significantly.

In a playback apparatus using plane shift, the above-described problem does not occur if scaling is prohibited when the subtitles are composited with the video. However, in existing playback apparatuses, for example when playing back a video in full screen, when a menu call operation is performed, processing is performed to display a screen menu, and above that, to display a video that has been scaled to be more compact. The reason for this is that this processing enables enlarging the field of view of the menu without hindering the viewing of the video. GUI processing performed along with scaling the video enlarges the field of view of the menu and preserves the convenience of the user, and even to realize stereoscopic effect, abbreviating the GUI processing along with scaling means regression from the point of view of convenience of existing optical disk playback apparatuses, and cannot be considered an advantageous idea to the industry.

The aim of the present invention is to provide a playback apparatus that adheres to consumer protection while improving realism and realizing the processing of GUI with video scaling.

MEANS TO SOLVE THE PROBLEM

The playback apparatus of an embodiment of the present apparatus for solving the above problem is a playback apparatus that realizes stereoscopic playback including a video decoder operable to obtain video frames by decoding a video stream; a plane memory that stores therein graphics data having a resolution of a predetermined number of horizontal and vertical pixels; an offset storage unit that stores therein an offset indicating a number of pixel lengths for the graphics data; a shift engine operable to shift respective coordinates of the pixels in a left direction by a shift distance based on the offset, and to shift the respective coordinates of the pixels in a right direction by the shift distance, to realize stereoscopic playback; and a composition unit operable to composite the obtained video frames with the graphics data in which the coordinates of the pixels therein have been shifted in each of the left direction and the right direction respectively, wherein when a scaling factor of the video frames to be composited is changed to a value other than 1, the shift distance of the shift engine is based on a value obtained by multiplying the offset by the scaling factor.

EFFECTS OF INVENTION

Configured as above, the stereoscopic video playback apparatus of the present invention can adjust the shift distance by which a subtitle is shifted during the scaling of a video with the subtitle. As a result, when performing GUI processing with scaling, this enables preserving the depth balance between the video and the subtitle even after scaling is performed, and preventing the occurrence of unnatural change of the stereoscopic structure. Thus, the video and the subtitle are displayed in a more natural way, and eyestrain of the viewer can be alleviated, thus enabling ensuring consumer protection from every angle.

Although optional, further effects can be achieved by performing the following modifications on the above-described means of solving the problem.

A calculation table method may be realized, so that a table is used for the calculation of transforming the plane offset to coordinate values. By doing this, the depth of subtitles can be changed by devices with low resources.

Furthermore, when scaling the video with the subtitle, the stereoscopic video playback apparatus may be configured to adjust a shift distance of the video plane. Shifting the video plane can prevent a sharp difference in stereoscopic effect, alleviate eyestrain, and cause the video and the subtitle to be displayed in a more natural way.

Furthermore, when scaling the video with a subtitle, the stereoscopic video playback apparatus may be configured to gradually adjust the shift distance by which the subtitle is shifted for each frame. This way, the difference between the stereoscopic effect of the video and that of the subtitle does not become large. As the video and the subtitle are displayed in a more natural way, eyestrain of the viewer can be alleviated.

Furthermore, when scaling the video with a subtitle, the stereoscopic video playback apparatus may be configured to temporarily disable display of the subtitle. When a predetermined time period has passed, i.e., when the user's eyes have been accustomed to the difference between the stereoscopic effect of the pre-scaling video and that of the post-scaling video, the subtitle is displayed. This way, the difference between the stereoscopic effect of the video and that of the subtitle does not become large. As the video and the subtitle are displayed in a more natural way, eyestrain of the viewer can be alleviated.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 7 shows how data in a background plane 11, data in a video plane, data in an image plane 8 and data in an interactive graphics plane 10 are overlapped when stereo modes of all the planes are ON;

FIG. 11 shows an example of how the stereoscopic video appears when the viewer sees, through shutter glasses 500, an image that is outputted when the stereo mode of the video plane 6 is ON, and the stereo modes of other planes are OFF is viewed;

FIG. 19 shows a stereoscopic image when a plane offset used for compositing with a moving image before scaling is applied to a plane shift of an image plane;

FIG. 30A, FIG. 30B and FIG. 30C show processing procedures for shifting the coordinates of each pixel data piece held in the image plane 8;

FIG. 31A, FIG. 31B and FIG. 31C show processing procedures for shifting the coordinates of each pixel data piece held in the interactive graphics plane 10;

FIG. 32 shows pixel data pieces in the graphics plane;

Each of FIG. 33A

FIG. 35 shows what is stored in a display mode storage unit 29;

FIG. 36 shows a flowchart showing processing procedures for display mode setting when a title is switched;

FIG. 38 is a flowchart showing an exemplary main procedure for playing back a PlayList in BD-J mode;

FIG. 42 is a flowchart showing processing procedures for right eye processing;

FIG. 46 is a block diagram showing an internal structure of a plane shift engine 20 of the playback apparatus in the second embodiment;

DESCRIPTION OF EMBODIMENTS

Embodiment 1

A recording medium and playback apparatus including the above-described means for solving the problem are described below as embodiments of the present invention with reference to the drawings.

Figure 1:
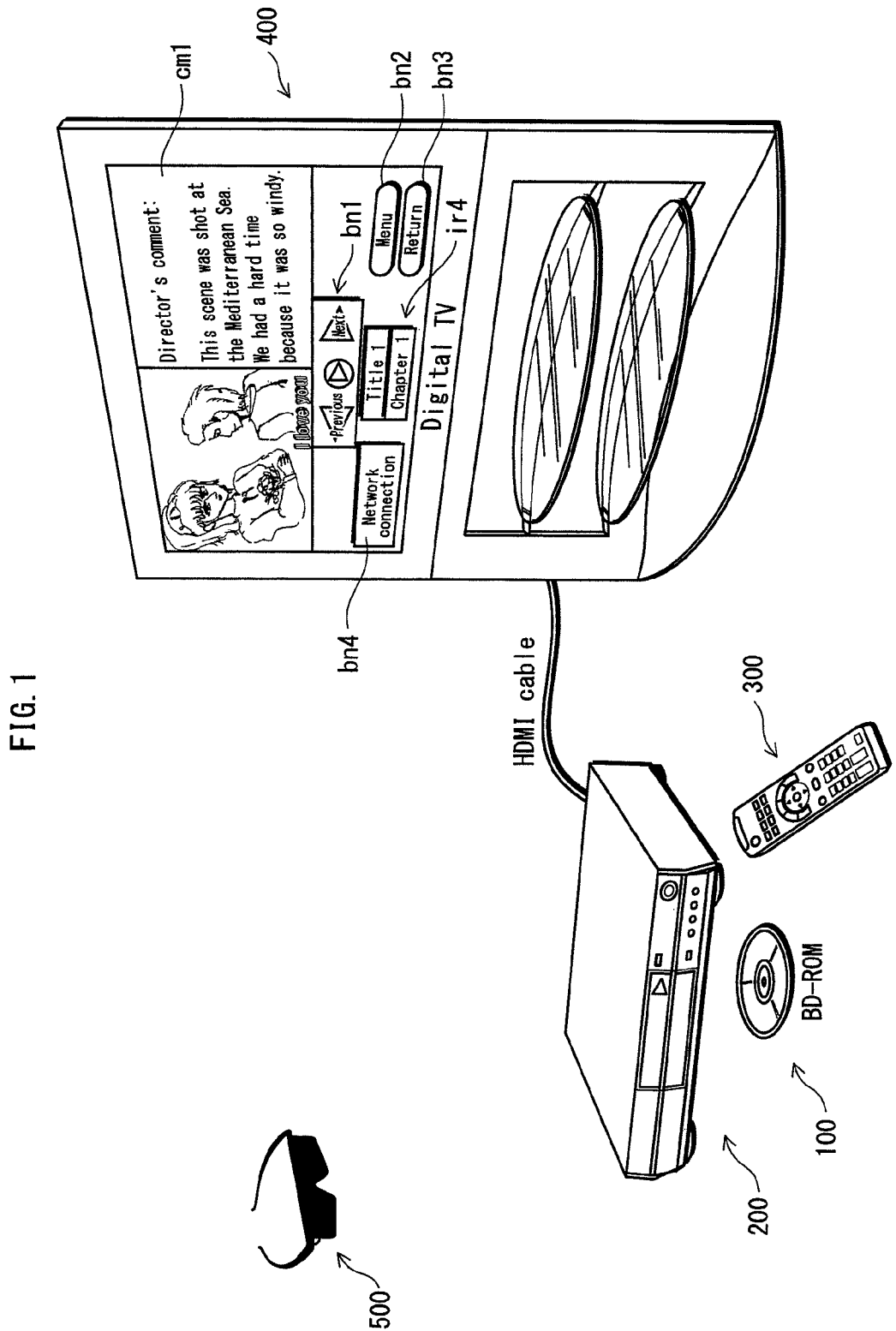
FIG. 1 shows a usage pattern of a recording medium and a playback apparatus.

FIG. 1 shows a usage pattern of the recording medium and the playback apparatus. As shown in FIG. 1, a BD-ROM 100 as an example of recording medium and a playback apparatus 200 compose a home theater system together with a remote control 300, a television 400 and liquid crystal shutter glasses 500, and are used by a user.

The BD-ROM 100 provides the above-stated home theater system with a movie, for example.

The playback apparatus 200 is connected to the television 400, and plays back the BD-ROM 100. A 2D video and a 3D video exist among playback videos to be played back. The 2D video is, for example, when a plane including a display screen of a display apparatus is taken as an X-Y plane, an image displayed as pixels on positions on the display screen, and is also called a monoscopic video.

In contrast, a 3D video is a video in which elements on the X-Y plane in the display screen of the display apparatus appear, by using the structure described in the present embodiment, either farther forward or backward than the display screen, relative to a straight line that intersects with a plane taken as the X-Y plane as an axis (in the present embodiment, defined as an axis that is a straight line vertical to the X-Y plane (Z axis)).

When the 3D video is, for example, a video formed when corresponding data (stream data) of a left view video to be viewed by a left eye and a right view video to be viewed by a right eye is recorded on a recording medium that can be read via a virtual file system 3 shown in FIG. 4, described later (for example, a BD-ROM 100 or a local storage 1*b* shown in FIG. 4, and here for simplicity the BD-ROM 100 is described as an example), and the extent of parallax between the two eyes causes a differing view between the right view to be viewed by the right eye and the left view to be viewed by the left eye, an operation is repeated in which the left view video is shown to the left eye only, and the right eye video is shown to the right eye only, and the video appearing as a stereoscopic image having depth to the human eye, can be displayed to the user. However, when only one of the left view video and the right view video is used for playback, the video merely appears monoscopic to the human eye. For example by showing the left view video to both the right eye and the left eye, the left view video merely appears as a monoscopic video to the human eye.

The remote control 300 is a device that receives an operation for the hierarchized GUI from the user. In order to receive such an operation, the remote control 300 includes: a menu key for calling menus composing the GUI; an arrow key for moving a focus of the GUI parts composing each menu; a decision key for performing a determining operation on the GUI parts composing each menu; a return key for returning to higher order hierarchized menus; and a numerical key.

The TV 400 provides the user with a dialogical operational environment by displaying the playback picture of the movie, a menu and the like. The display screen of the television 400 in FIG. 1 is an example of scaling a video and displaying a full-screen GUI. In the screen of the television 400, the right half displays a director's comment cm1 written by the director of the movie.

In the screen of the television 400, the bottom half includes a button element bn1 for receiving a "next skip" or "previous skip" instruction, a button element bn2 for receiving a menu call, a button element bn3 for receiving a return operation, and a button element bn4 for receiving a network connection. The bottom half also includes an indicator ir1 for displaying the number of the current title and the number of the current chapter. These button elements can be operated by the remote control 300.

The liquid crystal shutter glasses 500 are composed of crystal liquid shutters and a control unit, and realize stereoscopic view with use of binocular disparity of the viewer's eyes. Lenses having a feature that the transmittance of light is changed by changing applied voltage are used for the crystal liquid shutters of the liquid crystal shutter glasses 500. The control unit of the liquid crystal shutter glasses 500 receives a SYNC signal for switching between a right-view image and a left-eye image that are transmitted from the playback apparatus 200, and switches between a first state and a second state in accordance with this SYNC signal.

In the first state, the control unit adjusts the applied voltage so that light does not transmit through a liquid crystal lens corresponding to the right view, and adjusts the applied voltage so that light transmits through a liquid crystal lens corresponding to the left view. In such a state, only the left-view image is viewed, and the left view image is not provided to the right eye.

In the second state, the control unit adjusts the applied voltage such that the liquid crystal lens corresponding to the right view transmits light, and adjusts the applied voltage such that the liquid crystal lens corresponding to the left view does not transmit light. In such a state, the crystal liquid shutters provide view of the right-view image, and the right view image is not provided to the left eye.

Generally, the right-view image and left-view image look a little different due to differences between angles.

With use of such a difference between the image seen respectively by the left eye and the right eye (in other words, an extent of parallax), the user can recognize an image as a stereoscopic image. Thus, the user confuses a monoscopic display with a stereoscopic display by synchronizing timing of the liquid crystal shutter glasses 500 switching between the above-stated first state and second state with timing of switching between the right-view image and the left-view image. Next, a description is given of a time interval in displaying right-view video and left-view video.

Specifically, there is a difference between the right-view image and the left-view image that corresponds to binocular disparity of the user in a monoscopic image. By displaying theses images while switching the images at a short time interval, the images appear as if the images are displayed stereoscopically.

The short time interval may be a time period just enough to cause the user to confuse monoscopic images with stereoscopic images when the switching and the displaying are performed as described above.

This concludes the description of the home theater system.

Figure 2:
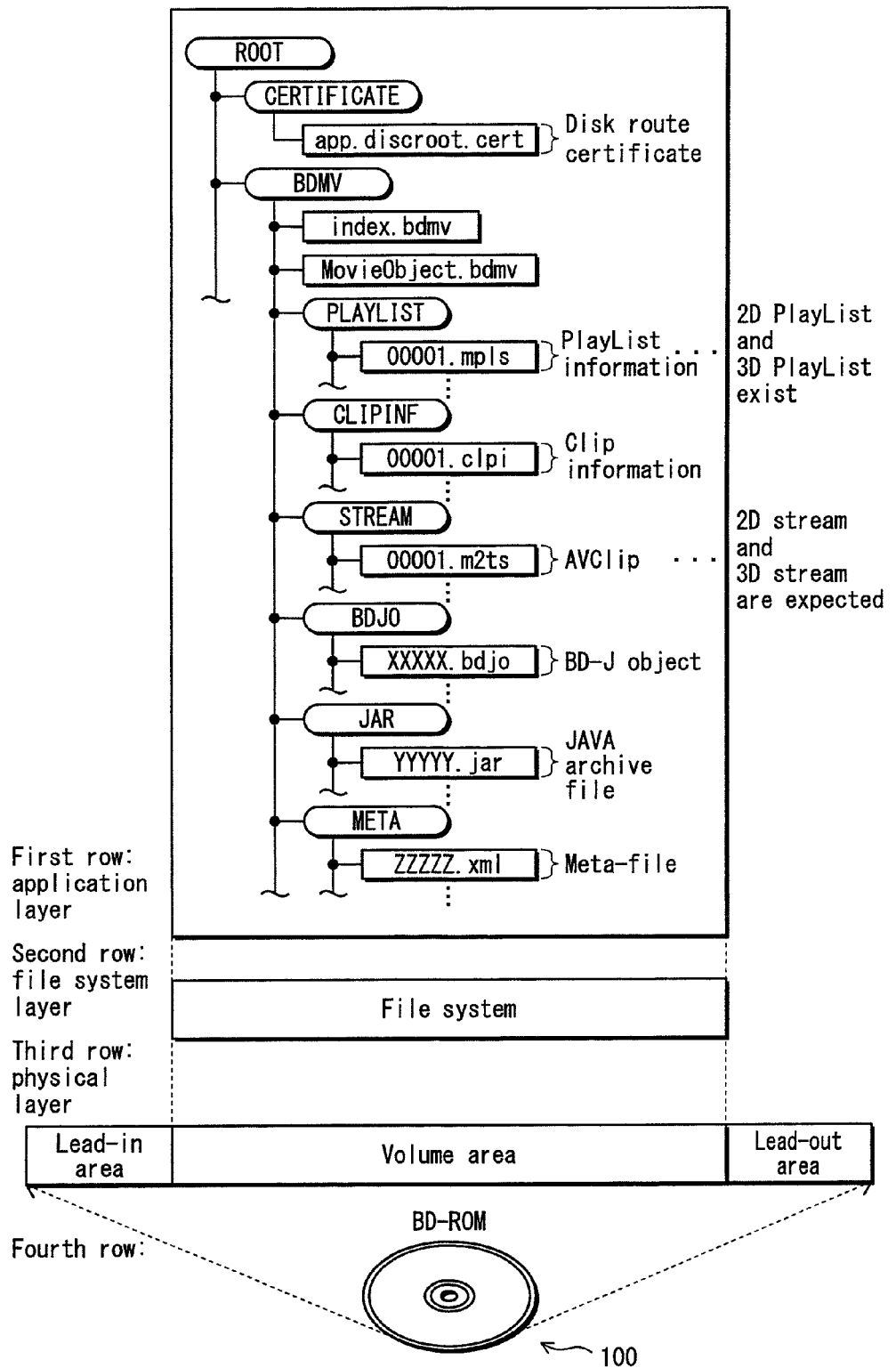
FIG. 2 shows an internal structure of a BD-ROM 100.

The following describes a recording medium to be played back by the playback apparatus 200. The playback apparatus 200 plays back the BD-ROM 100. FIG. 2 shows an exemplary internal structure of the BD-ROM 100.

The BD-ROM 100 that is an example of the recording medium is shown in a fourth row from the top in the present figure, and a track on the BD-ROM 100 is shown in a third tier. Although the track is usually formed in a spiral manner from an inner circumference to an outer circumference, the track is drawn in a laterally-expanded manner in the present figure. This track consists of a lead-in area, a volume area and a lead-out area. Also, in the lead-in area exists a special area called BCA (Burst Cutting Area) that can be read only by a drive. Since this area cannot be read by an application, this area is often used in copyright protection technology.

The volume area in the present figure has a layer model having a file system layer and an application layer. Application data such as image data starting with file system information is stored in the file system layer. The file system is UDF, ISO9660 or the like. In the file system, it is possible to read logic data recorded in the same manner as a normal PC, with use of a directory or a file structure. Also, a file name or a directory name consisting of 255 words can be read. A top tier of FIG. 2 shows an application layer format (application format) of the BD-ROM expressed using a directory structure. As shown in the first tier, in the BD-ROM, a CERTIFICATE directory and a BDMV directory exists below the Root directory.

Below the CERTIFICATE directory, a file of a root certificate (app.discroot.certificate) of a disc exists. This app.discroot.certificate is a digital certificate used for checking whether an application has been tampered with, and identifying the application (hereinafter referred to as signature verification) when executing a program of a JAVA™ application that performs dynamic scenario control using a JAVA™ virtual machine.

The BDMV directory is a directory in which data such as AV content and management information used in the BD-ROM 100 are recorded. Six directories called "PLAYLIST directory", "CLIPINF directory", "STREAM directory", "BDJO directory", "JAR directory" and "META directory" exist below the BDMV directory. Also, two types of files (i.e. INDEX.BDMV and MovieObject.bdmv) are arrayed.

The STREAM directory is a directory storing a file which is a so-called transport stream body. A file (00001.m2ts) to which an extension "m2ts" is given exists in the STREAM directory.

A file (00001.mpls) to which an extension "mpls" is given exists in the PLAYLIST directory.

A file (00001.clpi) to which an extension "clpi" is given exists in the CLIPINF directory.

A file (XXXXX.bdjo) to which an extension "bdjo" is given exists in the BDJO directory.

A file (YYYYY.jar) to which an extension "jar" is given exists in the JAR directory.

An XML file (ZZZZZ.xml) exists in the META directory.

The following describes these files.

M2ts File

Firstly, a description is given of the file to which the extension "m2ts;" is given. The file to which the extension "m2ts;" is given is a digital AV stream in the MPEG-TS (Transport Stream) method, and is acquired by multiplexing a video stream, one or more audio streams, a graphics stream, a text subtitle stream and the like. The video stream represents moving part of the movie, and the audio stream represents audio part of the movie. A transport stream including only a 2D stream is referred to as a "2D stream", and a transport stream including a 3D stream is referred to as a "3D stream". In the case of the 3D stream, both of left-eye data and right-eye data may be included in m2ts, or m2ts may be prepared separately for each of the left-eye data and the right-eye data. It is preferable to use a codec (e.g. MPEG-4 AVC MVC) in which a left-view stream and a right-view stream refer to one another in order to save disc capacity used for streams. Video streams compressed and encoded with use of such a codec are called MVC video streams.

PlayList Information

The file to which the extension "mpls" is given is a file storing PlayList (PL) information. The PlayList information defines a PlayList referring to the AV clip.

A dimension identification flag exists on the BD-ROM 100 for identifying whether the stream targeted for playback is for 2D or 3D, and in the present embodiment, the dimension identification flag is embedded in the PlayList (PL) information.

In the present embodiment, it is possible to determine whether streams to be played back include a 3D video stream, based on a structural format of the PlayList (PL) stored on the BD-ROM 100.

The PlayList information includes MainPath information, Subpath information and PlayListMark information.

1) The MainPath information defines a logic playback section by defining at least one pair of a time point (In_Time) and a time point (Out_Time) on a playback time axis of the AV stream. The MainPath information has a stream number table (STN_table) that stipulates which elementary streams that have been multiplexed into AV stream are permitted to be played back and are not permitted to be played back.

2) The PlayListMark information shows specification of a time point corresponding to a chapter in a part of the AV stream specified by the pair of the In_Time information and the Out_Time information.

3) The Subpath information is composed of at least one piece of SubPlayItem information. The SubPlayItem information includes information on specification of an elementary stream to be played back in synchronization with the AV stream, and includes a pair of In_Time information and Out_Time information on the playback time axis of the elementary stream. The Java™ application for controlling playback instructs a Java™ virtual machine to generate a JMF (Java Media Framework) player instance that plays back this PlayList information. This starts the playback of the AV stream. The JMF player instance is actual data generated on a heap memory of the virtual machine based on the JMF player class.

Furthermore, according to a term definition, a 2D PlayList is a PlayList including only a stream for the 2D playback while a 3D PlayList includes a stream for 3D viewing in addition to the 2D stream.

The file to which the extension "clpi" is given is Clip information which is in one to one correspondence with AVclip information. Since the Clip information is management information, the Clip information has an EP_map showing an encoding format of the stream in the AVClip, a frame rate, a bit rate, information on resolution and the like, and a starting point of GOPs. The Clip information and PL information are classified as "still scenario".

BD-J Objects

The following describes the file to which the extension "BDJO" is given. The file to which the extension "BDJO" is given is a file storing a BD-J object. The BD-J object is information that defines a title by associating an AVClip string defined by the PlayList information with an application. The BD-J object shows an "application management table" and a "reference value for PlayList information". The "reference value for PlayList information" indicates PlayList information to be played back at the same time that the title starts. The application management table lists information for specifying an application that specifies this title as a life cycle.

The application management table stores, as detailed application information for each application, a text string indicating the name of the application, and an icon locator pointing to a location of an icon corresponding to the application. With use of an address, the icon locator points to an icon included in the Java (registered trademark) archive file.

The entity of the Java (registered trademark) application corresponds to a Java (registered trademark) archive file (YYYYY.jar) stored in the JAR directory under the BDMV directory in FIG. 2.

The application is, for example, a Java (registered trademark) application, and is composed of one or more xlet programs loaded in the heap area (also called "work memory") of the virtual machine. Since application signaling is performed and the life cycles are managed according to the application management table in the BD-J object, this is referred to as a BD-J application. The aim of the BD-J application is to improve interactivity. The BD-J application defines an API that can issue a scaling instruction that has, as input information, a size of scaling (hereinafter referred to as "scaling factor", in the playback apparatus platform, to cause the BD-J application to operate. Aside from this, a scaling instruction can also be issued by a resident application that the user has incorporated in a direct device. The timing of issuing the scaling instruction may be determined freely, and while the scaling instruction may be issued during playback of the video stream, the scaling instruction may also be issued at another time.

In the meta file (ZZZZZ.xml) included in the META directory is stored various information pieces relating to the movie in the disc. Examples of information pieces stored in the meta file are a name of the disc and an image of the disc, information on who has created the disc, and a title name for each title. This concludes the description of the BD-ROM 100. The meta file is not a prerequisite, and some BD-ROMs do not include this meta file.

Figure 3:
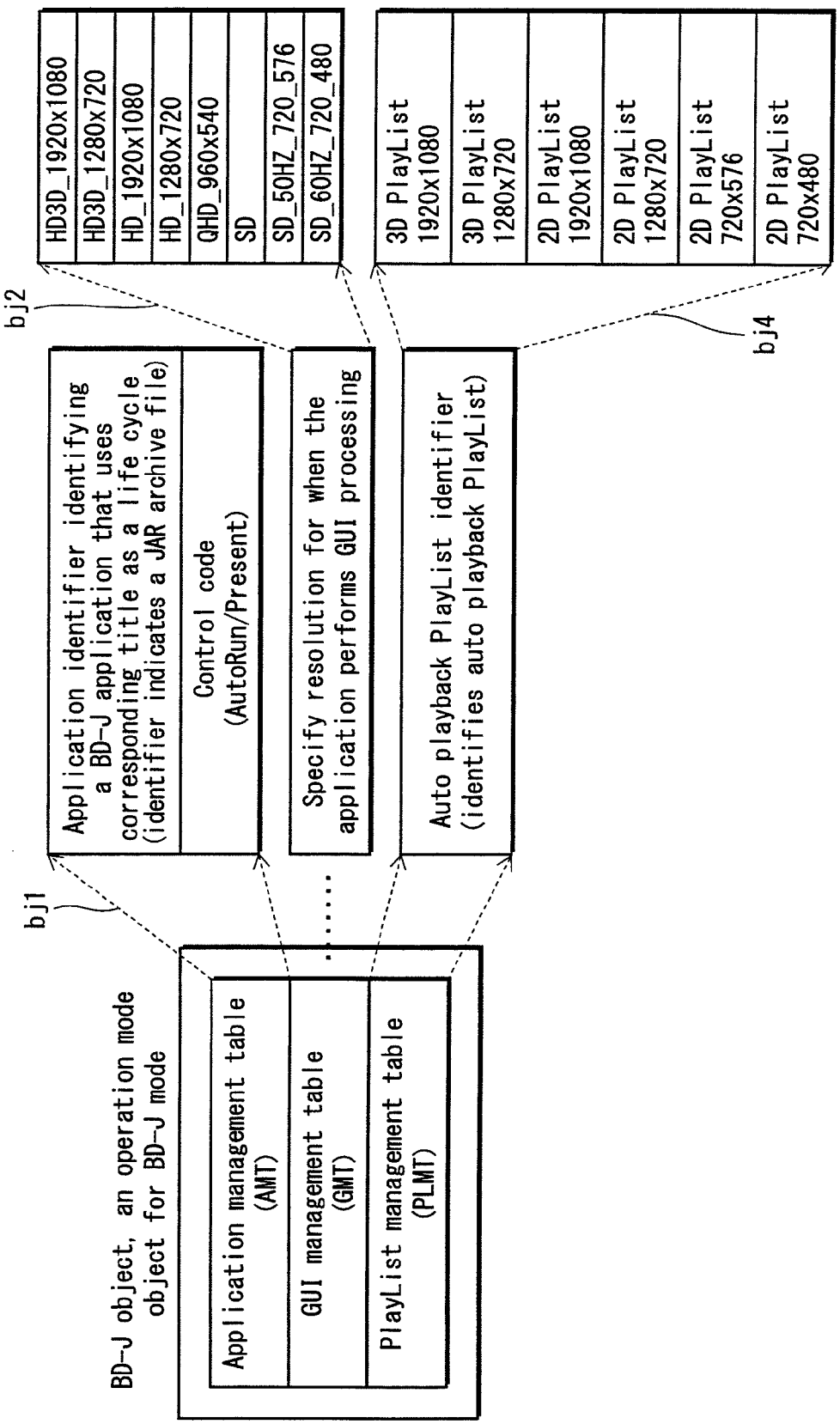
FIG. 3 shows an internal structure of a BD-J object.

This concludes the description of the BD-ROM. The following describes the BD-J object. FIG. 3 shows an exemplary internal structure of the BD-J object. As shown in FIG. 3, the BD-J object is composed of an "application management table", a "GUI management table" and a "PlayList management table".

The following describes these elements.

The "application management table" (AMT) is a table for causing the playback apparatus 200 to perform application signaling that runs the title as a life cycle. A lead line bj1 shows the internal structure of the application management table in closeup. As shown in this lead line, the application management table includes an "application identifier" and a "control code" that specify an application to be operated when a title corresponding to the BD-J object becomes a current title. When the control code is set to AutoRun, the control code shows that this application is automatically started after the application is loaded on the heap memory. When the control code is set to Present, the control code waits for a call from another application, and shows whether the application should be operated after the application is loaded on the heap memory.

The "GUI management table" (GMT) is a table used for GUI related operations by the application. More specifically, resolution, font data used, masking information when GUI for executing the menu call, or a title call is instructed by the user, is included. A lead line bj2 shows the internal structure of the GUI management table in closeup. As shown by this lead line bj2, the GUI management table may be set to one of HD3D_1920×1080, HD3D_1280×720, HD_1920×1080, HD_1280×720, QHD960×540, SD, SD_50HZ_720_576 and SD_60HZ_720_480.

The "PlayList Management Table (PLMT)" includes information on specification of the PlayList to be operated automatically when a title corresponding to the BD-J object becomes a current title. A lead line bj4 shows the internal structure of an auto playback PlayList in closeup. As shown by the lead line bj4, 3D PlayList 1920×1080, 3D PlayList 1280×720, 2D PlayList 1920×1080, 2D PlayList1 1280×720, 2D PlayList 720×576 and 2D PlayList 720×480 can be specified as information specifying the auto playback PlayList.

The following describes details of the structural elements of the playback apparatus. FIG. 4 shows an exemplary internal structure of the playback apparatus. As shown in FIG. 4, the playback apparatus includes a BD drive 1a, a local storage 1b, a network interface 1c, read buffers 2a and 2b, the virtual file system 3, a demultiplexer 4, video decoders 5a and 5b, a video plane 6, image decoders 7a and 7b, image memories 7c and 7d, an image plane 9, and audio decoder 9, an interactive graphics plane 10, a background plane 11, a register set 12, a still scenario memory 13, a playback control engine 14, a scaling engine 15, a composition unit 16, an HDMI transmission and reception unit 17, a display function flag storage unit 18, a left and right processing storage unit 19, a plane shift engine 20, an offset setting unit 21, a BD-J platform 22, a rendering engine 22a, a still scenario memory 23, a mode management module 24, an HDMV module 25, a UO detection module 26, a still image memory 27a, a still image decoder 27b, a display mode setting initial display setting unit 28, and a display mode storage unit 29.

In the present embodiment, the BD-ROM 100 stores data in the file structure shown in FIG. 2. A video stream for the left eye, a video stream for the right eye, a subtitle stream, and a graphics stream are read from a later-described virtual BD-ROM (virtual package) via the later-described virtual file system 3 shown in FIG. 4. For simplicity, in the example described here, the video stream for the left eye and the video stream for the right eye are recorded on the BD-ROM 100.)

Also, subtitle streams and graphics streams for both the left eye and the right eye may be recorded on the BD-ROM 100, or the BD-ROM 100 may be configured so that one graphics stream and one graphics stream are shared for both left and right. In this case, by giving an offset as described later, although the subtitles and graphics visible through the liquid crystal shutter glasses 500 are monoscopic images, it is possible to make them appear to pop out from the display screen, or to appear in a position farther back than the display screen.

Videos recorded on this BD-ROM 100 in which a left eye video stream and a right eye video stream are input to the playback apparatus 200 and played back are videos in which a viewpoint (for example, the angle of vision) is different due to the parallax between the two eyes, and data for playing back this type of video is recorded in advance as a video stream on the BD-ROM 100.

In the present embodiment, it is preferable for a left eye video stream and a right eye video stream, a subtitle stream, and a graphics stream to be embedded in a single stream file in advance. This is to suppress the calculation load required for memory and graphics by a device (for example, a CE device) that is low on device resources.

BD Drive 1a

The BD drive 1a includes, for example, a semiconductor laser (not shown), collimator lenses (not shown), a beam splitter (not shown), an objective lens (not shown), a condenser lens (not shown), an optical head (not shown) including a light detector (not shown). Light beam outputted from the semiconductor laser is collected on a information side of the optical disc through the collimator lenses, the beam splitter and the objective lens. The collected light beam is reflected and diffracted on the optical disc, and then collected by the light detector through the objective lenses, the beam splitter and the condenser lenses. The generated signal corresponds to data read from the BD-ROM in accordance with the amount of light collected on the light detector.

Network Interface 1c

The network interface 1c is for performing communication with an external device to the playback apparatus. The network interface 1c is capable of accessing servers that are accessible via the Internet and servers that are accessible via a local network. For example, the network interface 1c can be used for downloading BD-ROM additional contents made public on the Internet, and by performing data communication between a server on the Internet indicated by the contents, can enable playback of content using an Internet function. BD-ROM additional content is not recorded on the original BD-ROM 100 loaded in the BD drive 1a, and is, for example, additional sub-audio, subtitles, special features, applications, etc. The BD-ROM additional content can control the network interface 1c from a BD-J platform, and can download additional content made public on the Internet to the local storage 1b.

Local Storage 1b

The local storage 1b includes a built-in medium and a removable media, and is used for storing the downloaded additional contents and data used by the application. A storage area for the additional contents is provided for each BD-ROM, and an area that can be used for storing data is provided for each application. Also, merge management information, which is a merge rule regarding how the downloaded additional contents are merged with the data on the BD-ROM that is loaded in the BD drive 1a, is also stored in the built-in medium and the removable media.

The built-in medium is a writable recording medium such as a hard disk drive and a memory built in the playback apparatus 200.

The removable medium is a portable recording medium, for example, and is preferably a portable semiconductor memory card such as an SD card.

A description is given taking a case where the removable media is a semiconductor memory card as an example. The playback apparatus 200 is provided with a slot (not shown) into which the removable media is inserted, and an interface (e.g. memory card I/F) for reading the removable area inserted into the slot. When the semiconductor memory is inserted into the slot, the removable media and the playback apparatus 200 are electrically connected to each other, and it is possible to convert data recorded in the semiconductor memory into an electrical signal and read the electrical signal with use of the interface (e.g. memory card I/F).

Read Buffer 2a

The read buffer 2a temporarily stores source packets composing extents that compose the left view stream read from the BD drive 1a. The read buffer 1 transfers the source packets to the demultiplexer 4 after adjusting the transfer speed.

Read Buffer 2b

The read buffer 2b stores source packets composing extents that compose the right view stream read from the BD drive 1a. The read buffer 2 transfers the source packets to the demultiplexer 4 after adjusting the transfer speed.

Virtual File System 3

The virtual file system 3 configures a virtual BD-ROM (virtual package) in which, for example, the additional contents stored in the local storage 1b are merged with the contents on the loaded BD-ROM based on the merge management information downloaded in the local storage 1b together with the additional contents. The virtual file system 3 for configuring the virtual package has an application data correlation module for generating and updating application correlation information. The application data correlation information is information that correlates local storage information to an application, based on information on the BD-ROM disk and attribute information set by the application.

The virtual package and the original BD-ROM can be referred to from a command interpreter which is a main operational part in the HDMV mode, and the BD-J platform which is a main operational part in the BD-J mode. The playback apparatus performs the playback control with use of the data on the BD-ROM and the data in the local storage 1b during the playback of the virtual package.

Demultiplexer 4

The demultiplexer 4 is composed of, for example, a source packet depacketizer and a PID filter. Receiving an instruction from a packet identifier corresponding to a stream to be played back (the stream is included in the structured virtual package (data on the loaded BD-ROM and the local storage corresponding to the loaded BD-ROM), the demultiplexer 4 executes packet filtering based on the packet identifier. In executing the packet filtering, the demultiplexer 4 extracts one of the left-view video stream and the right-view video stream that corresponds to a display method flag based on the flag in the left-right processing storage unit 19, and the demultiplexer 4 transfers the video stream to the video decoder 5a or the video decoder 5b. The demultiplexer 4 sorts the left view video frame and the right view video frame based on header information of the stream.

When a stream separated from the stream to be played back is a subtitle stream, the demultiplexer 4 writes the separated subtitle stream in to the image memory. When the subtitle streams (a left-view subtitle stream, and a right-view subtitle stream) are included in the stream, the demultiplexer 4 writes the left-view subtitle stream in the image memory 7c, and writes the right-view subtitle stream in the image memory 7d.

When the 2D subtitle stream (subtitle stream used for the monoscopic display) is included in the stream, the demultiplexer 4 writes the 2D subtitle stream in the image memory 7c.

Video Decoder 5a

Figure 4:
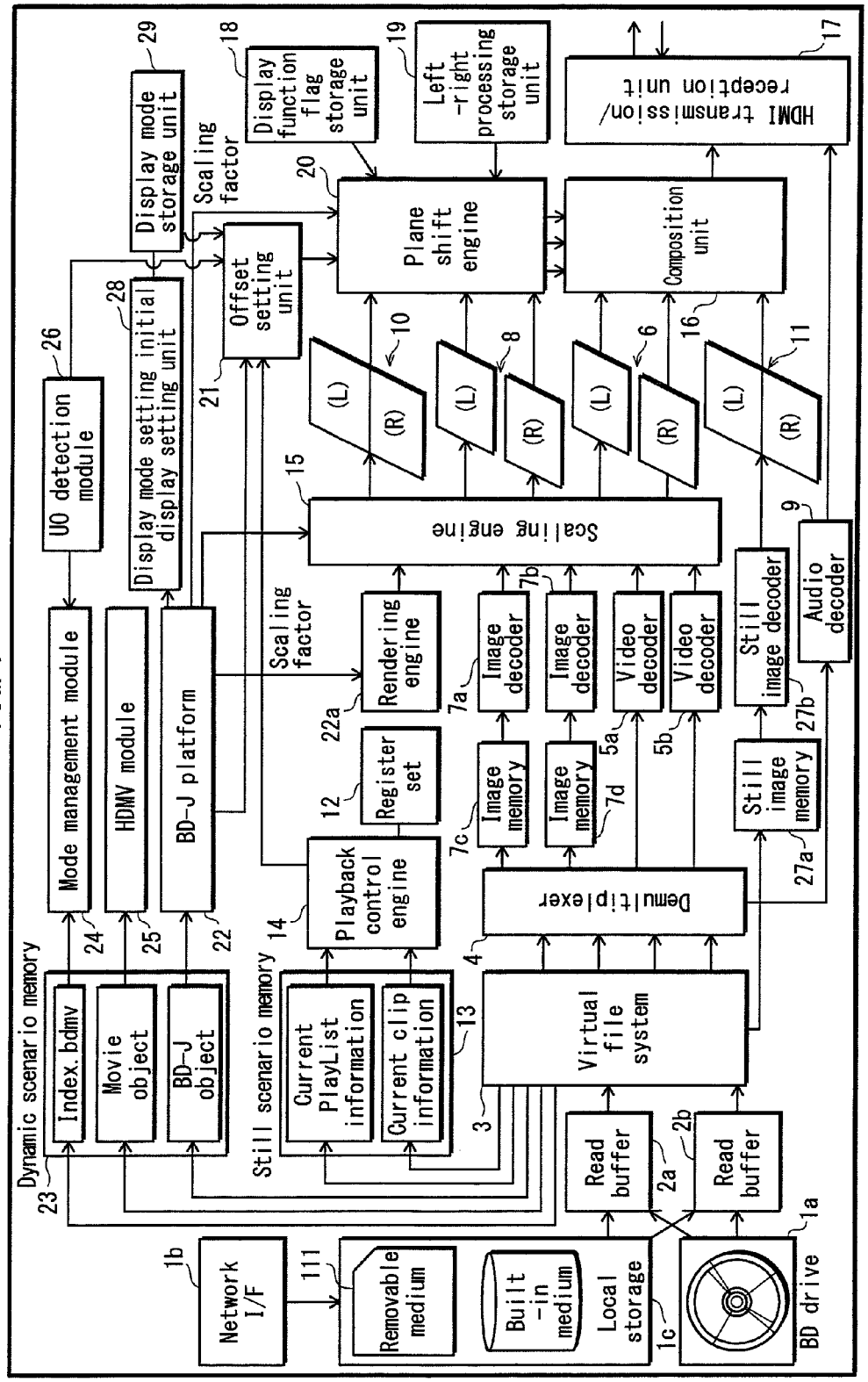
FIG. 4 shows an internal structure of the playback apparatus.

The video decoder 5a decodes a TS packet outputted from the demultiplexer 4, and writes a compressed picture in a left-eye plane 6 (expressed as a code (L) in the video plane 6 in FIG. 4).

Video Decoder 5b

The video decoder 5b decodes the right view video stream outputted from the demultiplexer 4, decodes the TS packet, and writes the uncompressed picture in the right view video plane 6 (expressed as a code (R) in the video plane 6 in FIG. 4).

Video Plane 6

The video plane 6 is, for example, a plane memory that can store picture data compatible with a resolution such as 1920× 2160 (1280×1440). The video plane 6 has a left-eye plane (expressed as the code (L) in the video plane 6 in FIG. 4) having an area capable of storing data with resolution such as 1920×1080 (1280×720), and a right-eye plane (expressed as the code (R) in the video plane 6 in FIG. 4) having an area capable of storing data with resolution such as 1920×1080 (1280×720).

Image Decoders 7a and 7b

Each of the image decoders 7a and 7b decodes TS packets composing the subtitle stream that is outputted from the demultiplexer 4 and written in the image memories 7c and 7d, and writes the uncompressed graphics subtitles in the graphics plane 8a. The "subtitle streams" decoded from the image decoders 7a and 7b are data pieces each showing subtitles compressed by a run-length coding, and is defined by pixel codes showing a Y value, a Cr value, a Cb value and an α value and a run lengths of the pixel codes.

Image Plane 8

The image plane 8 is a graphics plane capable of storing graphics data (e.g. subtitle data) obtained by for example, decoding the subtitle stream with a resolution of 1920×1080 (1280×720). The image plane 8 has a left-eye plane (expressed as a code (L) in the image plane 8 in FIG. 4) having an area capable of storing data having a resolution of 1920×1080 (1280×720), for example, and a right-eye plane (expressed as a code (R) in the image plane 8 in FIG. 4) having an area capable of storing data having a resolution of 1920×1080 (1280×720), for example.

Audio Decoder 9

The audio decoder 9 decodes audio frames outputted from the demultiplexer 4, and outputs the uncompressed audio data.

Interactive Graphics Plane 10

The interactive graphics plane 10 is a graphics plane having a storage area capable of storing graphics data written by the BD-J application using the rendering engine 22a with resolutions such as 1920×2160 (1280×1440). The interactive graphics plane 10 has, for an example, a left-eye plane (expressed as a code (L) in the interactive graphics plane 10 in FIG. 5) having an area capable of storing data having a resolution of 1920×1080 (1280×720), and a right-eye plane (expressed as a code (R) in the interactive graphics plane 10 in FIG. 4) having an area capable of storing data having a resolution of 1920×1080 (1280×720).

The "graphics data" held in the interactive graphics plane 10 is graphics whose pixels each is defined by an R value, a G value, a B value, and an α value. The graphics written in the interactive graphics plane 10 is an image or a widget mainly used for composing the GUI. Although the image data and the graphics data are different in terms of structure, they are collectively expressed as graphics data. There are two types of the graphics plane (i.e. the image plane 8 and interactive graphics plane 10). Hereafter, when the term "graphics plane" is used, it referrers to both or one of the image plane 8 and the interactive graphics plane 10.

Background Plane 11

The background plane 11 is a plane memory capable of storing the still image data to be a background image having a resolution such as 1920×2160 (1280×1440). Specifically, the background plane 11 has a left-eye plane (expressed as a code (L) in the background plane 11 in FIG. 4) having an area capable of storing data having a resolution of 1920×1080 (1280×720), and a right-eye plane (expressed as a code (R) in the background plane 11 in FIG. 4) having an area capable of storing data having a resolution of 1920×1080 (1280×720).

Register Set 12

The register set 12 is a collection of registers including a playback state register storing therein information on playback states of PlayLists, a playback setting register storing configuration information showing a configuration in the playback apparatus 200, and a general register capable of storing arbitrary information used by the contents. Each of the playback states of the PlayLists shows which of the AV data pieces in each kind of AV data information pieces that are written in the PlayList are used, and at which position (time point) of the PlayList the playback is performed.

Still Scenario Memory 13

The still scenario memory 13 is a memory for storing current PlayList information or a current clip information. The current PlayList information is a current processing target from among a plurality of pieces of PlayList information accessible from the BD-ROM, a built-in medium drive or a removable media drive. The current clip information is a current processing target from among a plurality of pieces of clip information accessible from the BD-ROM, a built-in medium drive or a removable media drive.

Playback Control Engine 14

The playback control engine 14 executes an AV playback function and a playback function of the PlayList in response to a function call from the command interpreter which is the main operational part in the HDMV mode and the Java platform which is the main operational part in the BD-J function. The AV playback function is a set of functions used in DVD players and CD players, and includes playback start, playback stop, pause, release of pause, release of freeze frame function, fast forwarding at a playback speed specified by an immediate value, fast rewinding at a playback speed specified by an immediate value, audio conversion, sub image conversion, and angle conversion. The PlayList playback function is to perform playback start or playback stop from among the above-stated AV playback functions according to the current PlayList information composing current PlayLists, and current clip information.

When a disc (for example, the BD-ROM 100) is inserted into the disk drive, a PlayList and an AV stream that are playback processing targets by the playback control engine 14 are Auto playbackPlayLists that are written in the current scenario on the BD-ROM. The playback of the AV stream starts due to a user operation (e.g. playback button) or is automatically started by an event triggered by the terminal (such as a resident application).

Scaling Engine 15

The scaling engine 15 is capable of performing reduction, enlargement, and size control of images in the image plane 8 and the video plane 6. The scaling engine 15 considers scaling to occur when, at a time that image data or picture data has been decoded, a value is set in the plane shift engine 20, and before storing the decoded video data in the video plane 6, scaling is performed via the scaling engine 15.

A scaling factor is, for example, a factor of a number of horizontal pixels and/or a number of vertical pixels. To give an example, compared to graphics data for which a basic resolution is 1920×1080 pixels, when a scaling factor of "1/2" is specified, the resolution of the graphics data is (1920×0.5)×(1080×0.5) pixels, that is, it is reduced to 960×540 pixels. The scaling factor is not always less than 1 as in the case of 1/2, but can also be set to be a value greater than or equal to 1, and in such cases expansion processing is performed.

Composition Unit 16

The composition unit 16 composites data held in the interactive graphics plane 10, data held in the image plane 8, data held in the video plane 6 and data held in the background plane 11.

Each of the interactive graphics plane 10, the image plane 8, the video plane 6 and the background plane 11 has a separate layer structure. Data held in each of the planes is composited (overlaid) in order of the background plane 11, the video plane 6, the image plane 8, then the interactive graphics plane 10. As data of the image plane, subtitles, and as data of the interactive graphics plane 10, a POP-UP menu (graphics), and assuming that contents displaying GUI graphics data are played back, the composition unit always overlays the data of the image plane 8 (subtitles) with the data of the video plane 6 (video), and overlays the data of the interactive graphics plane 10 with the image plane 8. In other words, even if stereoscopic contents are in the video plane 6, when a subtitle, a POP-UP menu, or a GUI with no depth is superimposed on the stereoscopic video, images (such as subtitles, POP-UP menus, and GUI) must be preferentially displayed first. The same is true when scaling is performed.

HDMI Transmission/Reception Unit 17

The HDMI transmission/reception unit 17 includes an interface that complies with the HDMI standard (HDMI: High Definition Multimedia Interface). The HDMI transmission/reception unit 17 performs transmission and reception such that the playback apparatus 200 and a device (in this example, a TV 400) that performs the HDMI connection with the playback apparatus 200 comply with the HDMI standard. The picture data stored in the video and audio data decoded from the uncompressed audio data by the audio decoder 9 are transmitted to the TV 400 via the HDMI transmission/reception unit 17. The TV 400 holds information such as, whether the TV 400 is capable of displaying data stereoscopically, information regarding resolutions at which the monoscopic display can be performed, and information regarding resolutions at which the stereoscopic display can be performed. When the playback apparatus 200 gives a request via the HDMI transmission/reception unit 16, the TV 400 gives the playback apparatus 200 necessary information (e.g. information regarding whether the TV 400 is capable of displaying data stereoscopically, information regarding resolutions at which the monoscopic display can be performed, and information regarding resolutions at which the stereoscopic display can be performed) requested by the TV 400. Thus, the playback apparatus 200 is capable of obtaining, from the TV 400, the information regarding whether the TV 400 is capable of displaying data stereoscopically via the HDMI transmission/reception unit 17.

Display Function Flag Storage Unit 18

The display function flag storage unit 18 stores a 3D display function flag that indicates whether the playback apparatus is capable of 3D display.

Left-Right Processing Storage Unit 19

The left-right processing storage unit 19 stores information showing whether the current output processing is for left-view video or right-view video. A flag in the left-right processing storage unit 19 shows whether or not data to be outputted to a display device (the television 400 in FIG. 1) connected to the playback apparatus 200 shown in FIG. 1 is the left-view video or the right-view video. While the left-view video is outputted, the flag in the left-right processing storage unit 19 is set as the left-view output. Also, while the right-view video is outputted, the flag in the left-right processing storage unit 19 is set as the right-view output.

Plane Shift Engine 20

The plane shift engine 20 combines areas storing a plane offset. After the left-right processing storage unit 19 judges whether the current processing target is a left eye video or a right eye video, the plane shift engine 20 calculates, with use of a stored plane offset, a shift distance of a horizontal axis of an image plane (an amount indicating how far to shift the image displayed on the display screen, in a horizontal direction of the display screen, from a reference position), and shifts the image by the shift distance. By adjusting the shift distance of the displayed subtitles (graphics), the graphics can be shown to appear farther forward or back than the position of the display screen. The shift distance is an amount for adjusting how far forward or backward than the display screen the graphics appear.

In other words, changing the amount of shifting the horizontal axis of the subtitle/graphics changes the depth. An optical effect is obtained so that, for example, the more distant the left-view subtitles and the right-view subtitles become in a predetermined direction, the farther forward the graphics are displayed, and the more distant the left-view subtitles and the right-view subtitles become from one another in an opposite direction, the farther back the graphics are displayed.

Depending on the shift distance, there are cases in which displacement of the image plane becomes too great for the resolution and size of the display, and a phenomenon occurs whereby the eye cannot follow the image, and the image appears to be doubled. In this case, based on a value written in the plane offset, information indicating the resolution and size of the display are combined, and an adjustment is made so that the subtitles/graphics are not displayed too far to the front. For example, when the playback apparatus 200 includes a set-up function by which a value of the plane offset can be set, the plane shift engine 20 stores a value set with use of the set-up function.

Offset Setting Unit 21

The offset setting unit 21, upon receiving an offset update request, sets an offset to be updated in the offset value storage unit 41 of the plane shift engine 20, described later.

Specifically, the offset setting unit 21 performs the settings by operations such as (a) reading an offset value of an image plane setting and an offset value of the interactive graphics plane setting stored in the later-described display mode storage unit 29, and setting the offset values, (b) setting the offset value acquired from the demultiplexer 4 after the demultiplexer 4 acquires the offset value of the image plane and the offset value of the interactive graphics plane stored in a header area of a stream input to the demultiplexer 4, (c) reading the offset value of the image plane and the offset value of the interactive graphics plane sent from the UO detection module 26, and setting the offset values, (d) reading the offset value of the image plane and the offset value of the interactive graphics plane included in the current PlayList information and setting the offset values.

The offset setting unit 21 is a module for temporarily storing the value of a plane offset for which a user or an application has requested an update. In the plane offset, the depth is, for example, expressed as an integer from −63 to 63 (with 63 indicating the farthest front, and −63 indicating the farthest back), and this is ultimately converted to pixel coordinates indicating a shift distance.

BD-J Platform 22

The BD-J platform 22 is a Java platform which is a main operational part in the BD-J mode. The BD-J platform 22 is fully provided with the Java2Micro_Edition (J2ME) Personal Basis Profile (PBP 1.0) and Globally Executable MHP specification (GEM1.0.2) for package media targets. The BD-J platform 22 reads byte codes from a class file in the JAR archive file, and stores the heap memory to start the BD-J application. Then, the BD-J platform 22 converts byte codes composing the BD-J application and byte codes composing a system application into native codes, and causes the MPU to execute the native codes. The BD-J platform 22, when scaling has been requested by the BD-J application, stores a scaling factor given as a parameter in the later-described scaling factor storage unit 42 of the scaling engine 20 shown in FIG. 21.

Rendering Engine 22a

The rendering engine 22a includes base software (e.g. Java 2D, OPEN-GL), and writes graphics and a character string in the interactive graphics plane 10 in accordance with the instruction from the BD-J platform 22 in the BD-J mode. Also, in the HDMV mode, the rendering engine 22a writes graphics data (e.g. graphics data corresponding to an input button) extracted from the graphics stream other than a stream corresponding to the subtitles (subtitle stream), and writes the extracted graphics data held in the interactive graphics plane 10.

Dynamic Scenario Memory 23

The dynamic scenario memory 23 stores current dynamic scenario, and is used for processing by the HDMV module which is the main operational part in the HDMV mode, and the Java platform which is the main operational part in the BD-J mode. The current dynamic scenario is a current execution target which is one of Index.bdmv, the BD-J object and the movie object recorded in the BD-ROM, the built-in media, or the removable media.

The mode management module 24 stores Index.bdmv read from the BD-ROM 100 or the local storage 1b (the built-in medium or the removable medium in the example shown in FIG. 4), and performs mode management and branching control. The mode management by the mode management module 24 is to perform allocation of the dynamic scenario to the module (i.e. to cause one of the BD-J platform 22 and the HDMV module 25 to execute the dynamic scenario).

HDMV Module 25

The HDMV module 25 is a DVD virtual player to be a main operational part in the HDMV mode, and is a main execution part. This module includes a command interpreter, and executes control of the HDMV mode by reading and executing the navigation commands composing the movie object. The navigation commands are written by a syntax similar to a syntax for the DVD-Video. Therefore, the playback control like the DVD-Video can be realized by executing these navigation commands.

UO Detection Module 26

The UO detection module 26 receives the user operation on the GUI. The user operation received by the GUI includes title selection determining which of the titles recorded in the BD-ROM is selected, subtitle selection and audio selection. In particular, one of the user operations unique to the stereoscopic playback is to receive the depth of stereoscopic video. For example, there are three levels of the depth such as distant, usual and close, or levels of the depth may be expressed by the numerical values such as how many centimeters or how many millimeters.

Also, when an instruction is received, via the remote control or a button on the device, to change the scaling of the image plane, the UO detection module 26 issues a direct scaling instruction to the module in the device.

Still Image Memory 27a

The still image memory 27a stores still image data, forming a background image, taken from the BD-ROM or configured virtual package.

Still Image Decoder 27b

The still image decoder 27b decodes still image data read from the still image memory 27a, and writes the uncompressed background image data held in the background plane 11.

Display Mode Setting Initial Display Setting Unit 28

The display mode setting initial display setting unit 28 sets the display mode and the resolutions based on the BD-J object in the current title provided with the BD-J platform unit.

Display Mode Storage Unit 29

The display mode storage unit 29 stores information on whether a display mode is 2D or 3D, and whether a stereo mode is ON or OFF. When the 3D display function flag of the playback apparatus 200 shows that the playback apparatus 200 is capable of displaying 3D video, the display mode which is a terminal setting stored in the display mode storage unit 29 may be switched to one of a 2D mode and a 3D mode. Hereinafter, a state of the display mode shown as "3D" is referred to as a "3D display mode", and a state of the display mode shown as "2D" is referred to as a "2D display mode".

The following describes the particulars of this display mode. When the playback apparatus 200 is in the 3D playback mode, the stereo modes of the planes are either ON or OFF. The difference between ON and OFF of the stereo modes affects compositing methods for the planes.

Using a video stream as an example, "Stereo mode ON" is a 3D display mode in which composition is performed such that the playback apparatus 200 displays two images for which the view (for example the angle of view) is different (for example, a left view video and a right view video having different angles of view).

"Stereo mode OFF" is a 3D display mode in which composition is performed such that the playback apparatus 200 provides one image (for example, one of a left view image and a right eye image, and in the present example, a left view image is used) and provides the image to the left eye/right eye. That is, when viewed by both of the eyes, the picture does not look stereoscopic (is a monoscopic image).

However, when the data held in the graphics plane 8 is shifted in the horizontal direction by the plane offset, the plane graphics data (subtitle data) that is held in the graphics plane 8 is to be displayed can be displayed in a position closer to the viewer than a position of the display screen, or in a position more distant from the viewer than a position of the display screen. The same effect can be obtained when offsets of video data held in the video plane 6, interactive graphics data held in the interactive graphics plane 10, and background image data held in the background plane 11 are adjusted when the "stereo mode is in the OFF state".

As described in the above, there are two modes, "Stereo mode ON" and "Stereo mode OFF" in the "3D display mode". When the playback apparatus 200 is in the "Stereo mode ON" state in the 3D display mode, the left-view data and the right-view data (e.g. an image viewed by the left eye and the image viewed by the right eye can be seen from different angles) are held in the left-eye plane and the right-view plane, respectively, and displayed in accordance with the SYNC signal. This makes it possible to display the stereoscopic image.

Also, when the playback apparatus 200 is in the "Stereo mode OFF" state in the 3D display mode, one of the left-view data and the right-view data (the left-view data held in the present embodiment) is held in each of the left-eye plane and the right-view plane, and the plane offsets of the stored data pieces are adjusted. This makes it possible to display the monoscopic image in a position closer to or more distant from the viewer than the position of the display screen.

In the present embodiment, the "Stereo mode ON" and the "stereo mode OFF" can be set for each plane (i.e. the video plane 6, the graphics plane 8, the interactive graphics plane 10 and the background plane 11).

The "2D display mode" is a normal display that displays the image in a position corresponding to the position of the display screen. In such case, a decoder and a plane used in a default setting is predetermined, and the composited image is displayed with use of the decoder and the plane.

Figure 5:
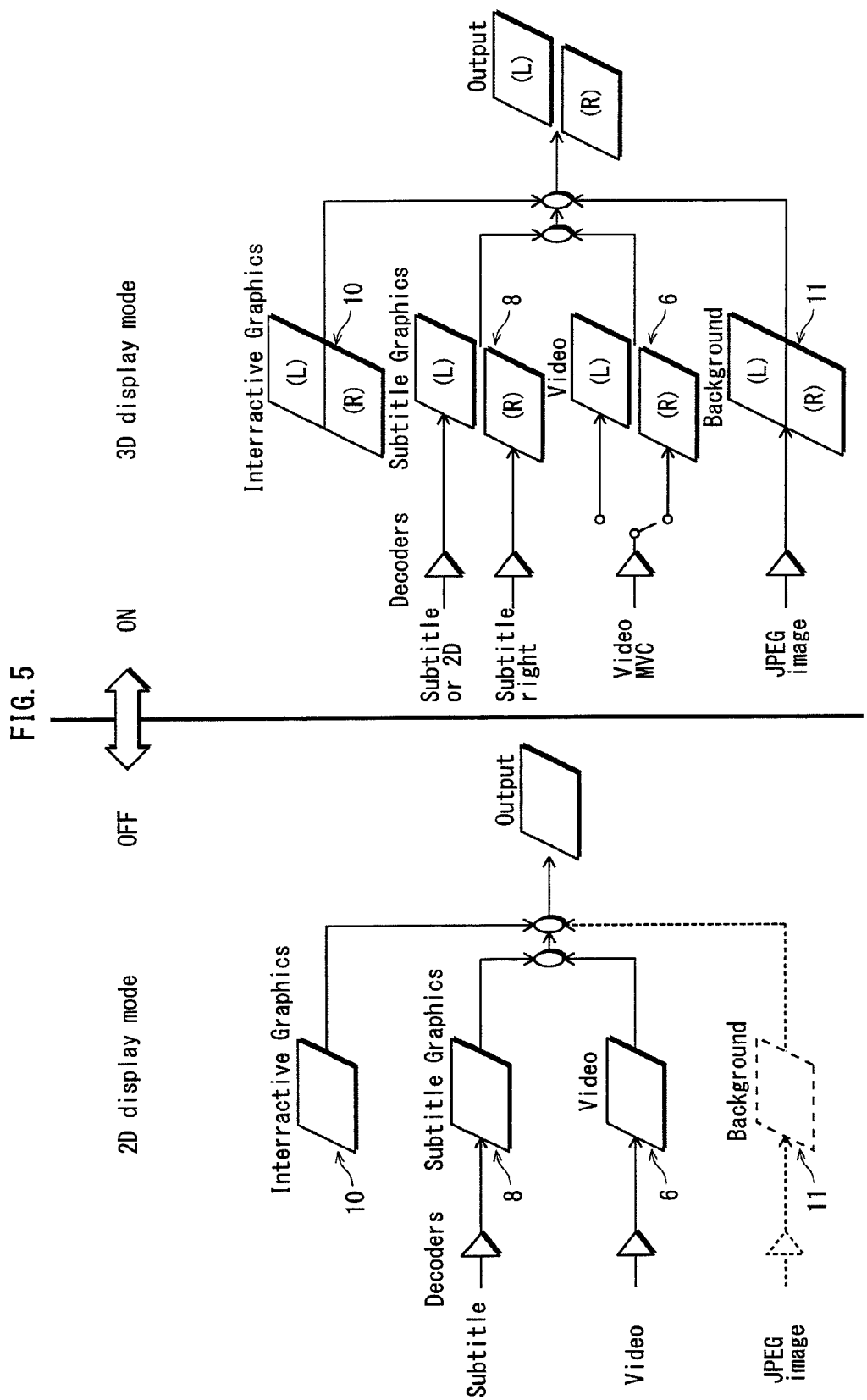
FIG. 5 shows switching between a 2D display mode and a 3D display mode.

For example, when the playback apparatus 200 is in the "2D display mode", the composition unit 16 composites: the 2D video data written by the video decoder 5a in the left-eye video plane (expressed as the code (L) in the video plane 6 in FIG. 5); the 2D graphics data (subtitle data) written by the image decoder 7a in the left-eye plane (expressed as the code (L) in the image plane 8 in FIG. 5); the 2D interactive graphics written by the BD-J application in the left-eye plane (expressed as the code (L) in the interactive graphics plane 10 in FIG. 5) using the rendering engine 22a; and the still image data written by the still image decoder 27b in the left-eye plane (expressed as the code (L) in the background plane 11 in FIG. 5).

At this time, the composition unit 16 performs the composition in the order of the 2D still image data, the 2D video data, the 2D graphics data (subtitle data) and the 2D interactive graphics data in order from the data from the bottom. The composition may be performed without compositing the 2D still image data when the video data is displayed on the whole screen. The flag in the display mode storage unit 29 showing whether the playback apparatus 200 is in the 2D display mode or the 3D display mode may also be stored in the register set 12, or may be stored in both the display mode storage unit 29 and the register set 12.

The following describes how the writing to the plane memories changes depending on the setting of the display mode.

Writing to the Video Plane 6

First, the following describes the video plane 6. When the display mode of the video data is 3D display mode, and the stereo mode is ON, the video decoder 5a decodes the left view video stream and writes the decoded left view video stream to the left eye plane (indicated by the notation (L) in the video plane 6 shown in FIG. 5), and the video decoder 5b decodes the right view video stream and writes the decoded right view video stream to the right eye plane (indicated by the notation (R) in the video plane 6 shown in FIG. 5).

Also, when the display mode of the video data is 3D mode and the stereo mode is OFF, the video decoder 5a, for example, decodes, for example, the left view video stream, and writes that decoded video stream to the left eye plane (indicated by the notation (L) in the video plane 6 shown in FIG. 5) and in the right eye video plane (indicated by the notation (R) in the video plane 6 shown in FIG. 5).

Also, the apparatus is configured so that when the display mode of the video data is 2D, for example, the demultiplexer 4 sends the 2D video stream to the video decoder 5a, and the video decoder 5a writes the decoded 2D video data to the left eye video plane (indicated by the notation (L) in the video plane 6 shown in FIG. 5).

This completes the description of the video plane 6.

The following describes the details of the image plane 8.

Writing to the Image Plane 8

For example when the display mode of the subtitle data is 3D display mode and stereo mode is ON, the image plane 7a decodes the left view subtitle stream stored in the image memory 7c, and writes the decoded left view subtitle stream in the left eye plane (indicated by the notation (L) in the image plane 8 shown in FIG. 5), and the image decoder 7b decodes the right view subtitle stream stored in the image memory 7d and writes the decoded right view subtitle stream in the right eye plane (indicated by the notation (R) in the image plane 8 shown in FIG. 5)

Also, when the display mode of the subtitle data is 3D display mode, and the stereo mode is OFF, the image decoder 7a decodes the left view subtitle stream stored in the image memory 7c and stores the decoded left view subtitle stream in the left eye plane (indicated by the notation (L) in the image plane 8 shown in FIG. 5) and the right eye plane (indicated by the notation (R) in the image plane 8 shown in FIG. 5).

In the above example, when the display mode of the subtitle data is 3D display mode and stereo mode is OFF, the left view subtitle stream is decoded and written in the left plane and the right plane. However, when the subtitle stream stored on the recording medium is configured so that a same subtitle stream is shared between left and right, this shared subtitle stream may be read, and written to the left eye image plane and the right eye image plane.

Also, the apparatus is configured so that, when the display mode of the subtitle data is 2D display mode, the demultiplexer 4 stores the 2D subtitle stream in the image memory 7c, and the image decoder 7a decodes the 2D subtitle stream stored in the image memory 7c, and writes the decoded 2D subtitle stream in the left eye plane (indicated by the notation (L) in the image plane 8 shown in FIG. 5)

This completes the description of the image plane 8. The following describes the stored content of the interactive graphics plane 10.

Writing to the Interactive Graphics Plane 10

When the display mode of the interactive graphics plane is in 3D display mode, and the stereo mode is ON, it is indicated that the BD-J application includes a program that writes an interactive graphics that is viewable by the left eye (left-eye interactive graphics) and an interactive graphics that is viewable by the right eye and is different from the left-eye interactive graphics (right-eye interactive graphics).

The left-eye interactive graphics and the right-eye interactive graphics written by this rendering program can be seen from different angles so as to allow the viewer to see stereoscopic graphics.

When the left-eye interactive graphics and the right-eye interactive graphics are displayed, the BD-J application writes the left-view interactive graphics in the left-eye plane (to which a code (L) is given in the interactive graphics plane 10 in FIG. 4) with use of the rendering engine 22a, and writes the right-view interactive graphics in the right-eye plane (to which a code (R) is given in the interactive graphics plane 10 in FIG. 4).

When the display mode of the interactive graphics plane is in 3D display mode, and the stereo mode is OFF, the BD-J application writes the left-view interactive graphics in the each of the planes to which the code (L) and the code (R) are respectively given, with use of the rendering engine 22a.

When the display mode of the interactive graphics plane is in 2D display mode, the BD-J application writes the 2D interactive graphics in the interactive graphics plane 10 (more specifically, the plane to which the code (L) is given in the interactive graphics plane 10) with use of the rendering engine 22a.

This concludes the description of the interactive graphics plane 10. The following describes the stored content of the background plane 11 depending on display mode.

Writing to the Background Plane 11

When the display mode of the background plane 11 is in 3D display mode, and the stereo mode is ON, the still image decoder 27a decodes left-view still image data and right-view still image data that are stored in the still image memory 27a. Then the image decoder 27a writes the left-view still image data and the right-view still image data held in the left-eye plane (to which a code (L) is given in the background plane 11 shown in FIG. 4) and the right-view plane (to which a code (R) is given in the background plane 11 shown in FIG. 4), respectively.

When the display mode of the background plane 11 is in 3D display mode, and the stereo mode is OFF, the background plane 11 decodes the left-view still image data from among the 3D background images stored in the still image memory 27a (the left-view still image data and the right-view still image data), and writes the decoded left-view image data held in the left-eye plane (to which a code (L) is given in the background plane 11 shown in FIG. 4) and in the right-eye plane (to which a code (R) is given in the background plane 11 shown in FIG. 4).

Writing to the Background Plane 11

When the display mode of the background image is a 2D display mode, the still image decoder 27b decodes the 2D still image data stored in the still image decoder 27a, and writes the decoded 2D still image data held in the left-eye plane (to which a code (L) is given in the background plane 11 shown in FIG. 4).

When the display mode of the background image is a 2D display mode, the still image decoder 27b decodes the 2D still image data stored in the still image decoder 27a, and writes the decoded 2D still image data held in the left-eye plane (to which a code (L) is given in the background plane 11 shown in FIG. 4).

This concludes the description of the stored content of the background plane 11 depending on the display mode.

The following describes the details of switching between 2D display mode and 3D display mode in the present embodiment.

FIG. 5 shows switching between the 2D display mode and the 3D display mode. On the left side of FIG. 5, an output model in the 2D display mode is shown. In the plane structure on the left side of FIG. 5, only one each of the video plane 6, the image plane 8 ("Subtitle" in FIG. 5), the interactive graphics plane 10, the background plane 11 and an output is prepared.

Therefore, the same data is used for the left view and the right view in the 2D display mode. As a result, the same data is outputted.

On the right side of FIG. 5, an output model in the 3D display mode is shown. When the playback apparatus 200 is in the 3D display mode, the video plane 6, the image plane 8 ("Subtitle" in FIG. 5) and the interactive graphics plane 10 are prepared for each of the left view and the right view. The picture data and the graphics data to be played back are held in each of the video plane 6, the image plane 8 ("Subtitle" in FIG. 5), the interactive graphics plane 10 and the background plane 11 for the left eye and the right eye.

Therefore, the left-view output and the right-view output are performed separately in the 3D display mode. A different image can be provided for the left eye and the right eye. As a result, it is possible to obtain a 3D effect that the stereoscopic object in the screen appears to pop out closer to the viewer due to the binocular disparity.

Figure 6:
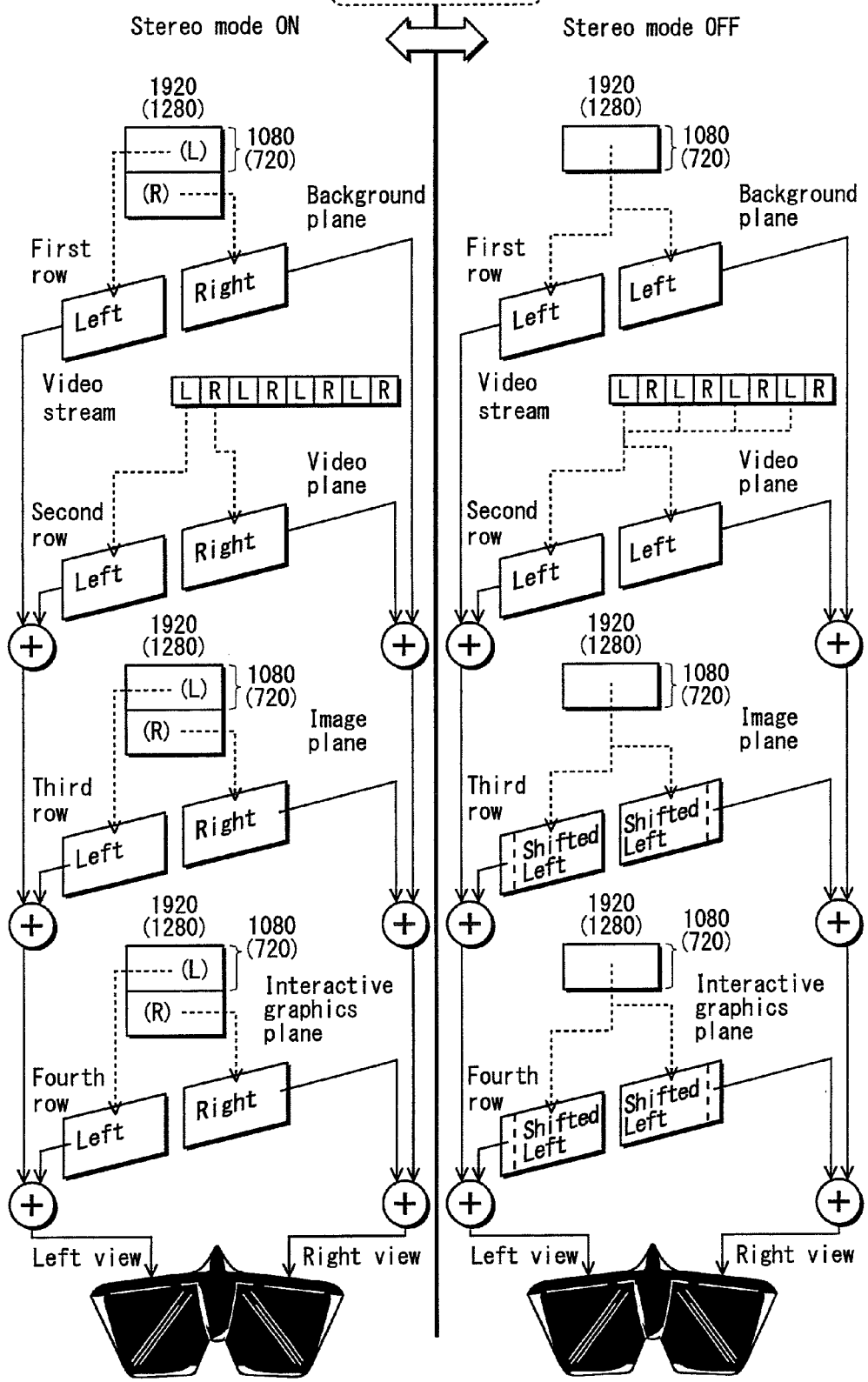
FIG. 6 shows an example of composition processing when a stereo mode of each plane is ON, and an example of composition processing when a stereo mode of each plane is OFF, in 3D display mode.

FIG. 6 shows one example of composition processing when stereo modes of all the planes are ON, and when stereo modes of all the planes are OFF, in the 3D display mode.

Although FIG. 6 shows an example of a case where the stereo modes of the planes are the same, ON/OFF of the stereo mode may be changed for each of the planes.

On the left side of FIG. 6, the plane structure when the stereo modes of all the planes are ON is shown. On the right side of FIG. 6, the plane structure when the stereo modes of all the planes are ON.

The first row shows the background plane 11 and the outputted data before the composition.

The second row shows the video stream, the video plane 6, and the outputted data before the composition.

The third row shows the image plane 8 and the outputted data before the composition.

The fourth row shows the interactive graphics plane 10 and the outputted data before the composition.

When the stereo mode is ON, a left-eye background plane which is expressed as an area to which (L) is given is used for writing the left-view background data, and a right-eye background plane which is expressed as an area to which (R) is given is used for writing the right-view background data. Each of the background data pieces is composited with the corresponding left-eye or right-view picture. When the stereo mode of the background plane 11 is OFF, the left-view background data is written, by the application, in each of the areas to which (L) and (R) are given respectively in the background plane 11. Therefore, the right-view background data does not affect the display.

When the stereo mode is ON, picture data of the left-eye video in the video stream is held in the left-view video plane. Also, picture data of right-eye video in the video stream is held in the right-view video plane. When the video plane 6 is in the OFF state of the stereo mode, the picture data of the left-eye video is held in both the left-view video plane and the right-view video plane.

When the stereo mode is ON, in the image plane 8, left-view image data is written in a left-eye image plane expressed as the area to which (L) is given, and right-view image data is written in a right-eye image plane expressed as the area to which (R) is given. Each of the image data pieces is composited with the corresponding left-eye or right-view picture.

When the image plane 8 is in the OFF state of the stereo mode, the subtitle graphics corresponding to the right-view image data does not affect the display. Also, when the stereo mode is OFF, the content in the image plane 8 is a content shifted in the right or left direction ("Shifted Left" in FIG. 6).

When the stereo mode is ON, in the interactive graphics plane 10, left-view interactive graphics is written in a left-view interactive graphics plane expressed as an area to which (L) is given, and right-view interactive graphics is written in a right-view interactive graphics plane expressed as an area to which (R) is given. Each of the interactive graphics data pieces is composited with the corresponding left-eye or right-view picture.

When the interactive graphics plane 10 is in the OFF state of the stereo mode, the right-view interactive graphics by the application does not affect the display. Also, when the stereo mode is OFF, the content in the interactive graphics plane 10 is a content that is shifted in the right or left direction ("Shifted Left" in FIG. 6).

Figure 7:
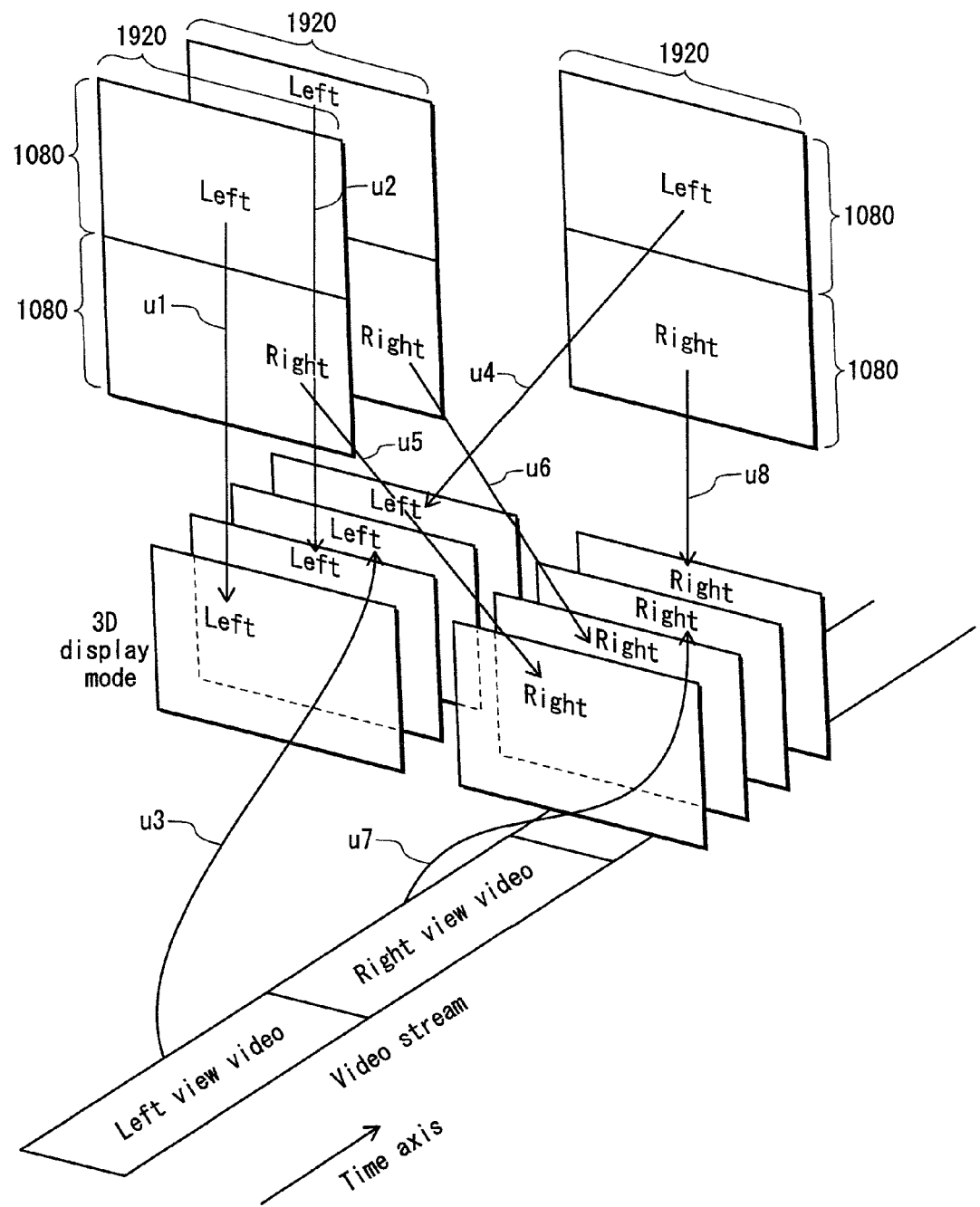

FIG. 7 shows how, when the display mode is 3D, the data held in the background plane 11, the data held in the video plane 6, the data held in the image plane 8 and the data held in the interactive graphics plane 10 are composited with one another when the stereo modes of all the planes are ON. In the stereo mode, it can be seen that left-view background data u4, left-view video u3 read from the video stream, left-view graphics u2 in the image plane 8 and left-view graphics u1 in the interactive graphics plane 10 are composited as the left-view in this order.

Also, it can be seen that right-view background data u8, right-view video u7 read from the video stream, right-view graphics u6 in the image plane 8 and right-view graphics u5 in the interactive graphics plane 10 are composited as the right view in this order.

Figure 8:
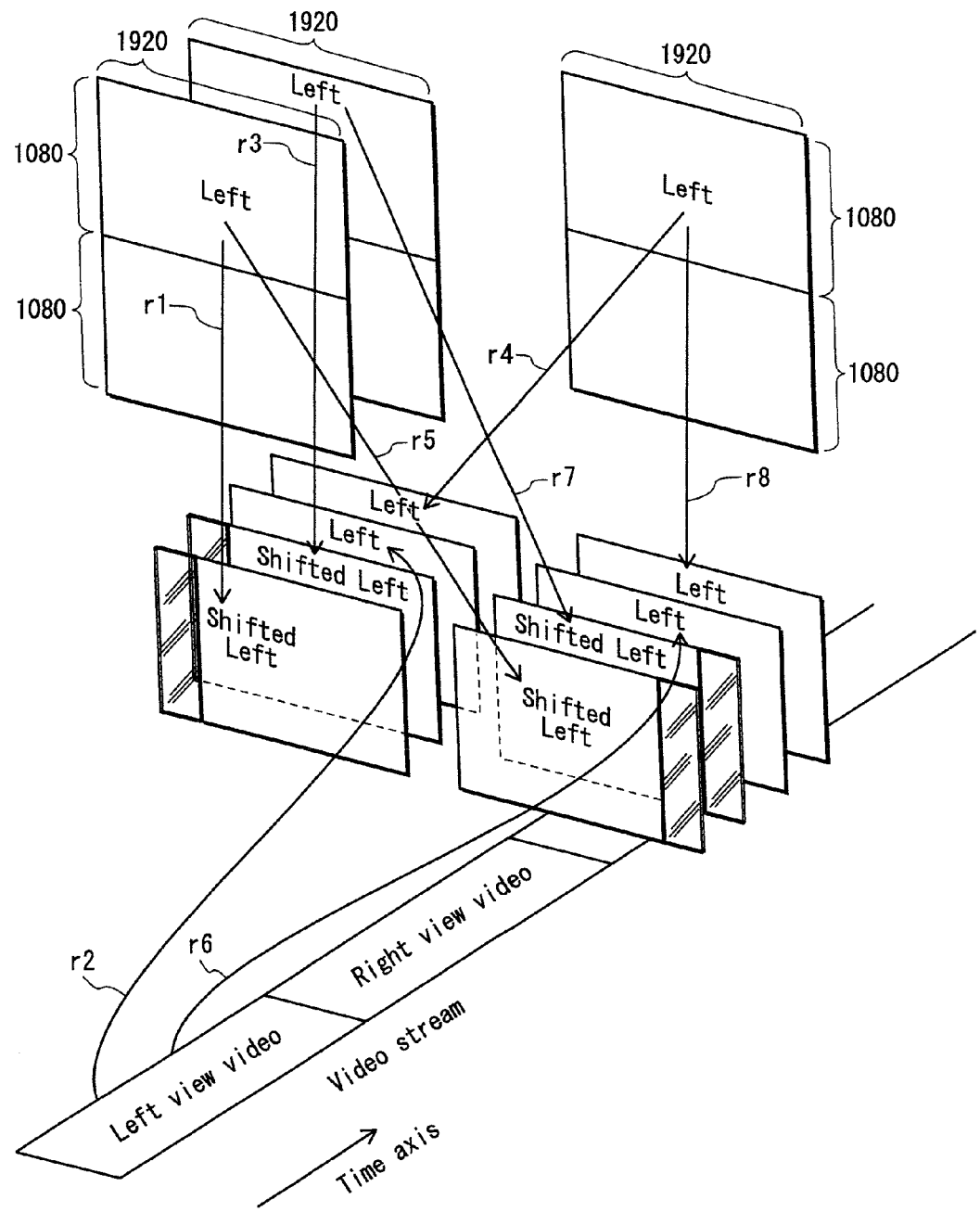
FIG. 8 shows how data in a background plane 11, data in the video plane, data in the image plane 8, and data in the interactive graphics plane 10 are overlapped when stereo modes of all the planes are OFF.

FIG. 8 shows how, when the display mode is 3D, the data held in the background plane 11, the data held in the video plane 6, the data held in the image plane 8 and the data held in the interactive graphics plane 10 are composited with one another when the stereo modes of all the planes are OFF. When the stereo modes are OFF, it can be seen that left-view background data r4, left-view video r2 read from the video stream, Shifted Left graphics r3 which is left-view graphics in the image plane 8 that has been shifted in a predetermined direction (the right direction in FIG. 8) and Shifted Left graphics r1 which is left-view graphics in the interactive graphics plane 10 that has been shifted in a predetermined direction (the right direction in FIG. 8) are composited as the right view in this order.

The following describes switching between the stereo modes in the present embodiment.

Figure 9:
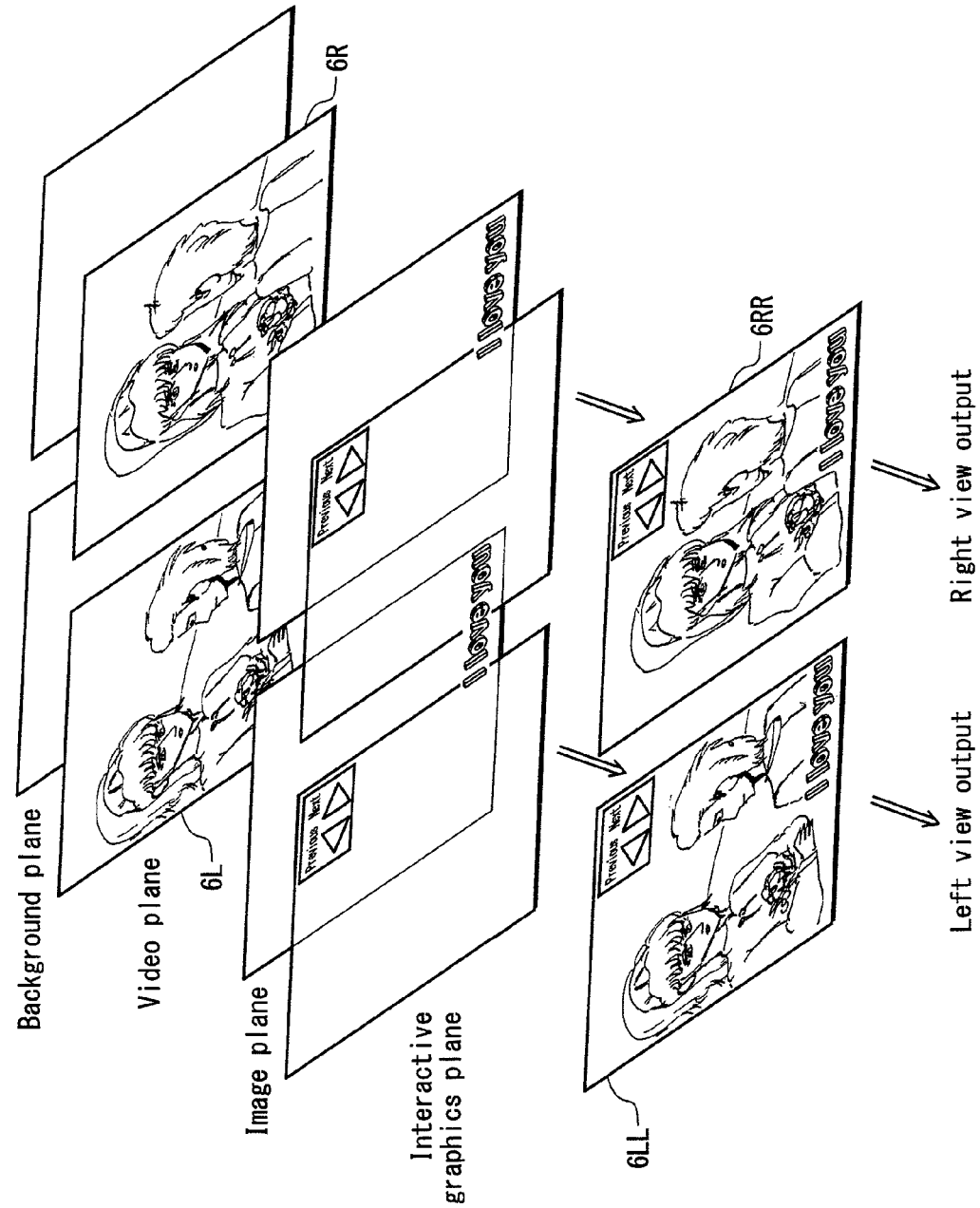
FIG. 9 shows a composition result for each plane.

FIG. 9 shows the composition result for each of the planes.

Each of 6L and 6R are examples of composition results for the video plane 6. It can be seen from a difference in direction in which a woman faces that images in a left-view stream and images a right-view stream are taken from different angles. Note that a difference in directions in which a man and the woman face and a difference in positions of the man and woman in FIG. 9 are schematic, and show neither accurate directions in which the man and woman face nor accurate positions of the man and woman for realizing the stereoscopic display. When viewing the display screen of the television 400 with the naked eye without wearing the liquid crystal shutter glasses 500, the image photographed from this different angle appears as if superimposed on the image.

Subtitles "I love you" in the image plane 8 is an image obtained by decoding the subtitle data by the image decoder.

A GUI part that receives an operation of skipping to the previous or next in the interactive graphics plane 10 is written in the interactive graphics plane 10 by the BD-J application.

6LL is outputted left-view image after the composition, and 6RR is outputted right-view image after the composition. It can be seen that the subtitles "I love you" is shifted in the right direction and composited in the left-view image of 6LL. Also, the subtitle "I love you" is shifted in the left direction in the right-view image of 6RR.

Figure 10:
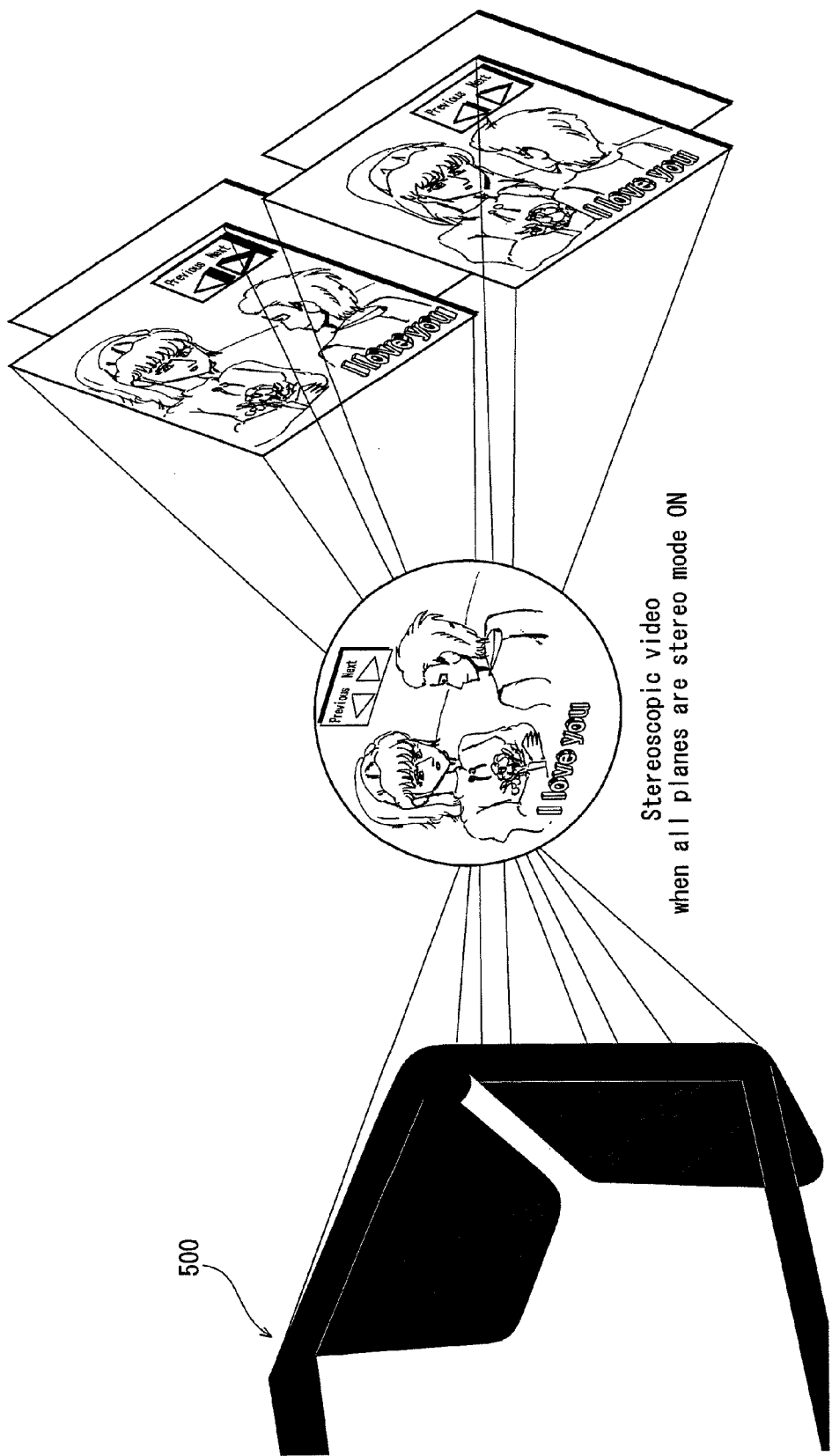
FIG. 10 shows an example where an image that is outputted when the stereo modes of all the planes are ON is viewed on a 3D display.

FIG. 10 shows one example of a case where an image output when the stereo modes of all of the planes are ON is displayed on the 3D display.

A right-view image and a left-view image are filtered through the liquid crystal shutter glasses 500, for example, and appear differently to the left and right eyes. Observe that the subtitles "I love you" and the GUI part that receives the operation of skipping to the previous or next are different in each of the right and left images in addition to the fact that the images of the video stream are made stereoscopic by compositing the left-eye and the right-eye images. Thus, it can be seen that the depths of the video, the subtitles and the GUI are maintained naturally by turning the stereo mode ON when both the right-eye and left-eye contents are prepared in advance.

FIG. 11 shows an example of stereoscopic video that appears in a case where the viewer sees, through the shutter glasses 500, an image outputted when the stereo modes of the all the planes except for the video plane 6 are OFF. The stereo mode of the graphics plane needs to be OFF for discs that do not hold stereoscopic subtitles and GUIs (separate images for both the left and right eye). The reason that a disc may not contain stereoscopic subtitle/GUI may be that 1.) The disc does not have sufficient capacity to hold data for both eyes, or 2.) The content on the disc was created for 2D viewing and stereoscopic data is not available. Since the stereo mode of the video plane 6 is ON in FIG. 11, it can be seen that images played back in the left-view stream and images played back in the right-view stream are taken of the same subject, and are taken from different angles. Meanwhile, the stereo modes of the image plane 8 and the interactive graphics plane 10 are OFF, and the same subtitle stream and same GUI images that are shifted in the right and left directions are composited with the video in the video plane 6. Therefore, since the subtitles and GUI can be displayed closer to the viewer than the stereoscopic video even if only subtitles and GUI for only one eye exists. This lessens the fatigue or stress caused to the eyes of the viewer.

Control for Realizing the Stereoscopic Effect

The following describes a direction in which the data held in the graphics plane is shifted for realizing the stereoscopic effects.

Directions to which the plane shift engine 20 shifts the data held in the graphics plane depends on whether the data held in the graphics plane should stereoscopically appear in a position farther back from the viewer than a position of the display screen or should stereoscopically appear in a position farther front than the display screen.

In the present embodiment, it is presumed that the left-view images are shifted in the right direction (i.e. the data stereoscopically appears to pop out from the screen).

A difference between coordinates of each original pixel data piece and coordinates of each pixel data piece shifted in the right or left direction is called a "shift distance". The shift distance is to be calculated according to a depth value indicating how far to the front or to the back a position of the subtitles written in the image plane 8 or the graphics image written in the interactive graphics plane 10 is than the display screen. The shift distance also can be calculated with use of one of parameters that can be adopted as the binocular disparity between both of the eyes at a time of executing the stereoscopic playback.

Also, the parameter for shifting the pixel data pieces in the graphics plane in the right and left directions by the above-stated shift distance is called "plane offset". While the shift distance is a scaling amount, the plane offset is a vector having a positive or negative polarity and size. The plane offset indicates the direction, (for example, left direction or right direction) in the horizontal direction of the display screen, and the amount of shifting in pixels from the normal position (that is, the state appearing displayed on the display screen). In the following description, the shifting is executed according to the plane offset. The plane offsets can be represented as the actual shift distance in pixels (with positive and negative value) or it can be represented as a value that can be used to calculate the actual shift distance in pixels.

The following describes the meanings of the positive and negative signs of the plane offset.

The plane offset of the graphics plane shows by how many pixels the coordinates of each of the pixel data pieces held in the right-view graphics plane and the coordinates of each of the pixel data pieces held in the left-view graphics plane are shifted.

When the viewer wants to obtain an effect that the video in the graphics plane pops out from the screen, the plane shift engine 20 shifts the data held in the left-view graphics plane in the right direction by the shift distance shown by the plane offset before the composition of data pieces in the planes. Then the plane shift engine 20 shifts the data held in the right-view graphics plane in the left direction by the shift distance shown by the plane offset. In the present embodiment, an effect that the images pops out from the screen can be obtained when the sign of the plane offset is a "positive sign".

When the viewer wants to obtain an effect that the images are displayed in a position distant from the viewer than the position of the screen, the plane shift engine 20 shifts the data held in the left-view graphics plane in the left direction by the shift distance shown by the plane offset before the composition of data pieces in the planes. Then the plane shift engine 20 shifts the data held in the right-view graphics plane in the right direction by the shift distance shown by the plane offset. In the present embodiment, an effect that the images are displayed in the position distant from the viewer than the position of the screen can be obtained when the sign of the plane offset is a "negative sign".

When the plane offset is "0", the plane shift engine 20 does not perform the shifting, which means that the image is displayed in the normal state (so as to appear displayed on the display screen).

Figures 12A, 12B:
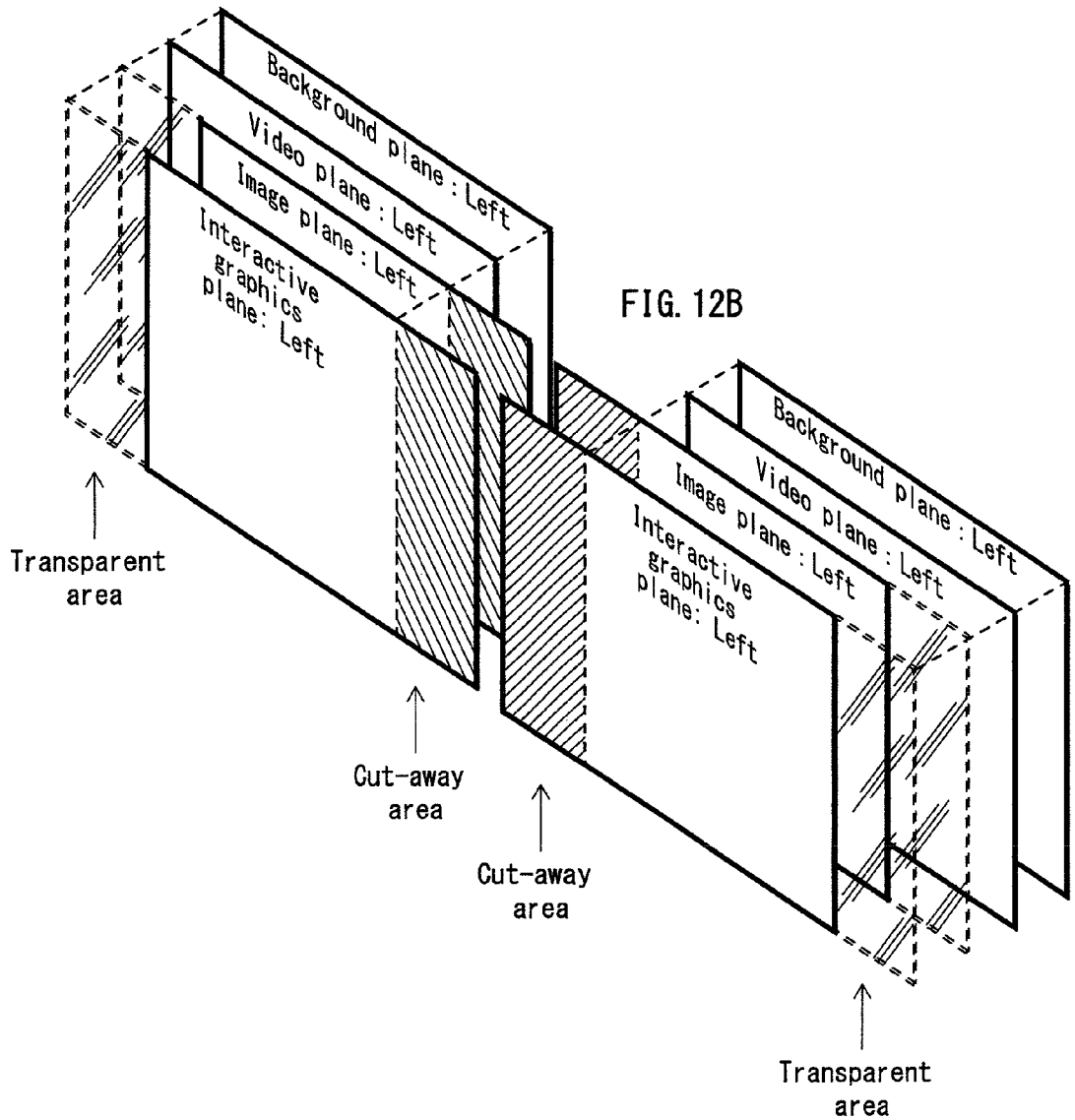
FIG. 12A and FIG. 12B show an image in a Shifted Left graphics plane shifted in a right direction, and an image in a Shifted Left graphics plane shifted in a left direction, respectively.

FIG. 12A and FIG. 12B show, respectively, an image in the Shifted Left left-view graphics plane shifted in a right direction, and the Shifted Left right-view graphics plane shifted in the left direction, in a case that the display mode is 3D, and the stereo mode of each plane is OFF, the plane offset of the background image stored in the background plane 11 is "0", the plane offset stored in the video plane is "0", the plane offset of the image plane is different from "0", and the plane offset of the interactive graphics plane is different from "0".

As shown in FIG. 12A, in the image plane 8, shifting the graphics plane in the right direction results in adding a transparent area to the left side of the shifted graphics plane and cropping the end portion on the right side. Similarly, in the interactive graphics plane 10, shifting the graphics plane in the right direction results in adding a transparent area to the left side of the shifted graphics plane, and cropping the end portion on the right side.

As shown in FIG. 12B, in the image plane 8, shifting the graphics plane in the left direction results in adding a transparent area to the right end of the shifted graphics plane and cropping the end portion on the left side. Similarly, in the interactive graphics plane 10, shifting the graphics plane in the left direction results in adding a transparent area to the right end of the shifted graphics plane and cropping the end portion on the left side.

The plane shift executed when the stereo mode is OFF causes the optical effect of causing the graphics in the image plane and the interactive graphics plane to appear in a position farther to the front than the display screen or farther back than the display screen. The following describes the principle that this plane shift is based on.

Principle of Realizing Stereoscopic View with Plane Shift

Figure 13A:
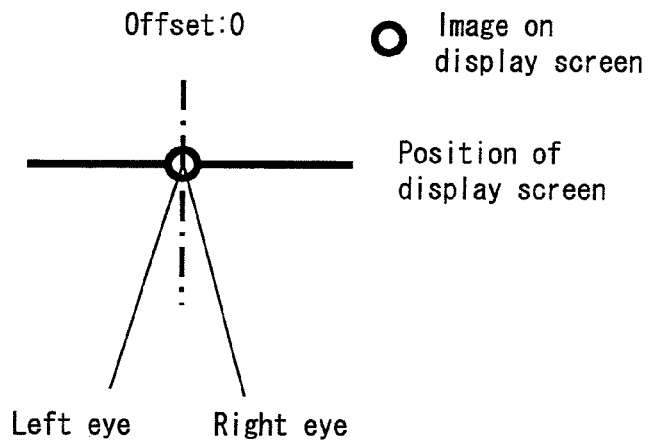
FIG. 13A, FIG. 13B, and FIG. 13C illustrate the principle of how an image appears to be closer to the viewer than the display screen when the sign of the plane offset is positive (the left-view graphics image is shifted in the right direction, and the right-view graphics image is shifted in the left direction)

FIG. 13A illustrates the principle of how the image appears farther to the front than the display screen when the sign of the plane offset is positive (the plane shift engine 20 shifts the left-view graphics image in the right direction, and shifts the right-view graphics image in the left direction).

In each of FIG. 31A, FIG. 31B and FIG. 31C, the image displayed on the display screen is indicated by a circle.

Firstly, since the image seen by the right eye and the image seen by the left eye are in the same position when there is no plane offset, the focus position at which both of the eyes see the image is on the display position (FIG. 13A). As a result, the displayed image is positioned on the display screen.

Figure 13B:
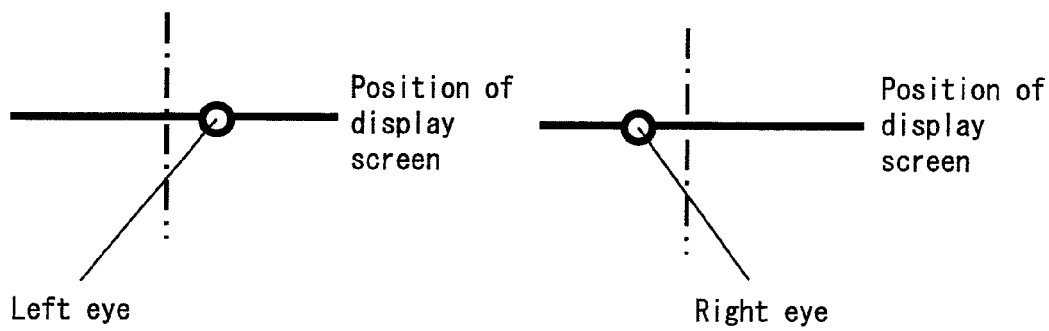

Meanwhile, when the playback apparatus 200 is in the 3D display mode, and the stereo mode is OFF, the image seen by the left eye should appear in a position shifted more to the right compared to the case where the plane offset is "0". At this time, the right eye should be covered by the crystal liquid shutter glasses 500 so that the right eye cannot see anything. The image seen by the right eye, on the other hand, should be in a position shifted more to the left compared to the case where the plane offset is "0". At this time, the left eye should be covered by the crystal liquid shutter glasses 500 so that the left eye cannot see anything (FIG. 13B).

Figure 13C:
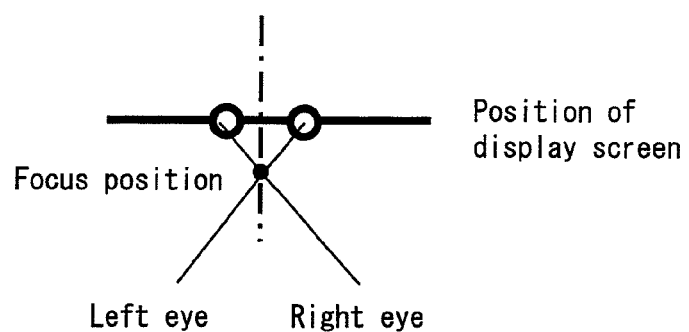

We focus on the image with use of both of the eyes to recognize the image in the focus position. Accordingly, when switching between a state in which the left eye sees the image and a state in which the right eye sees the image is performed by the crystal liquid shutter glasses 500 at a short time interval, both of our eyes try to focus on the image in a position closer to us than the position of the display screen. As a result, we have an illusion as if the image is in the focus position closer to us than the position of the display screen (FIG. 13C).

Figure 14A:
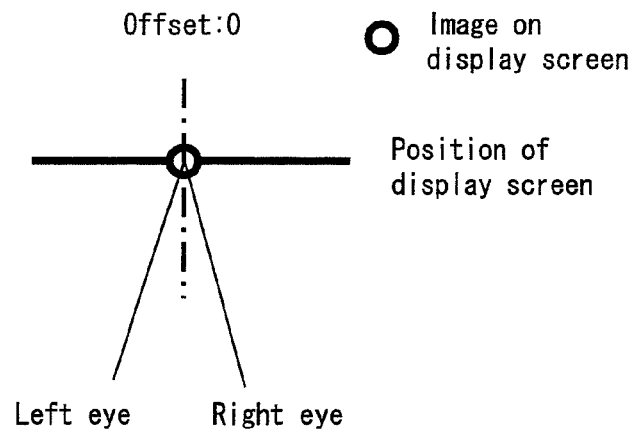
FIG. 14A, FIG. 14B, and FIG. 14C illustrate the principle of how an image appears to be farther from the viewer than the display screen when the sign of the plane offset is negative (the left-view graphics image is shifted in the left direction, and the right-view graphics image is shifted in the right direction)
Figure 14B:
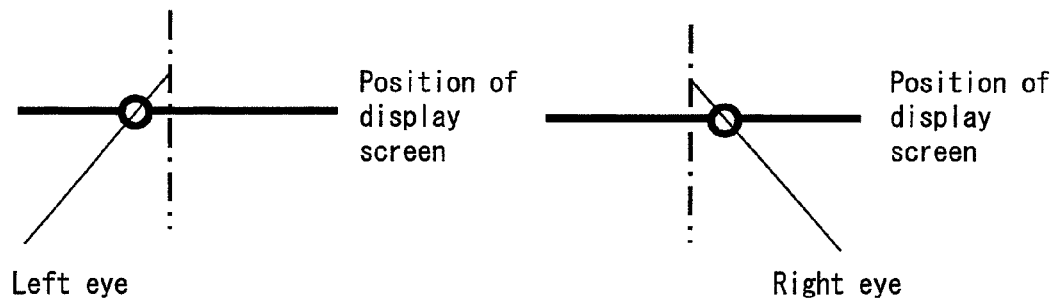
Figure 14C:
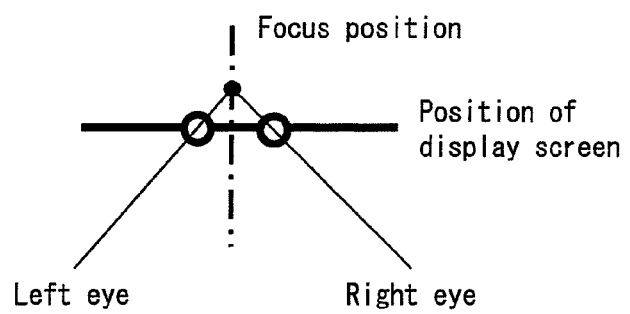

FIG. 14A, FIG. 14B and FIG. 14C describe the principles of how the image appears to be distant from the viewer than the display screen when the sign of the plane offset is negative (the plane shift engine 20 shifts the left-view graphics image in the left direction, and shifts the right-view graphics image in the right direction).

In each of FIG. 14A, FIG. 14B and FIG. 14C, the image displayed on the display screen is indicated by a circle. Firstly, since the image seen by the right eye and the image seen by the left eye are in the same position when there is no plane offset, the focus position at which both of the eyes see the image is the position of display screen (FIG. 14A). The resulting displayed image is positioned on the display screen.

Meanwhile, when the playback apparatus 200 is in the 3D display mode, and the stereo mode is OFF, the image seen by the left eye should appear in a position more to the left compared to the case where the offset is "0". At this time, the right eye should be covered by the crystal liquid shutter glasses 500 so that the right eye cannot see anything. The image seen by the right eye, on the other hand, should be in a position more to the right compared to the case where the offset is "0". At this time, the left eye should be covered by the crystal liquid shutter glasses 500 so that the left eye cannot see anything (FIG. 14B).

When switching between a state in which the left eye sees the image and a state in which the right eye sees the image is performed by the crystal liquid shutter glasses 500 at a short time interval, both of our eyes try to focus on the image in a position more distant from us than the position of the display screen. As a result, we have an illusion as if the image is in the focus position more distant from us than the position of the display screen (FIG. 14C).

This concludes the description of the graphics image written in the graphics plane. However, it is needless to say that the same concept of the above-stated offset may be applied to the interactive graphics plane 10, the video plane 6 and the background plane 11.

Creating Pop-Out Level/Depth

Figure 15A:
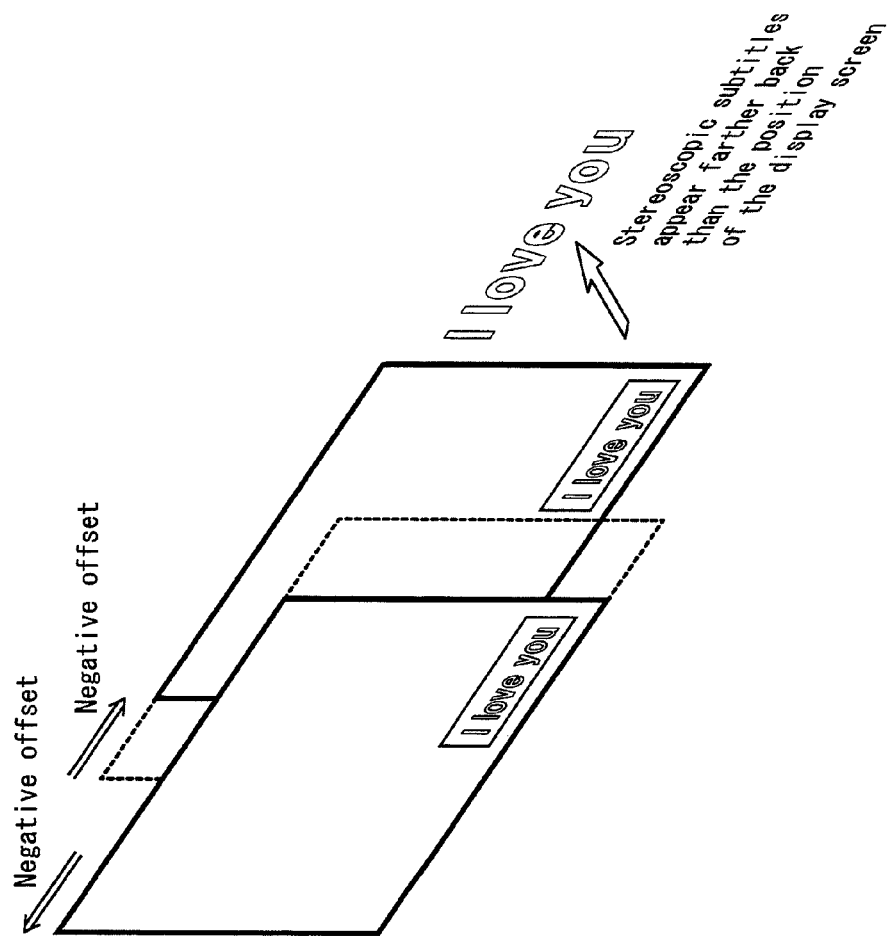
FIG. 15A and FIG. 15B show examples of differences in view between positive and negative plane offsets.
Figure 15B:
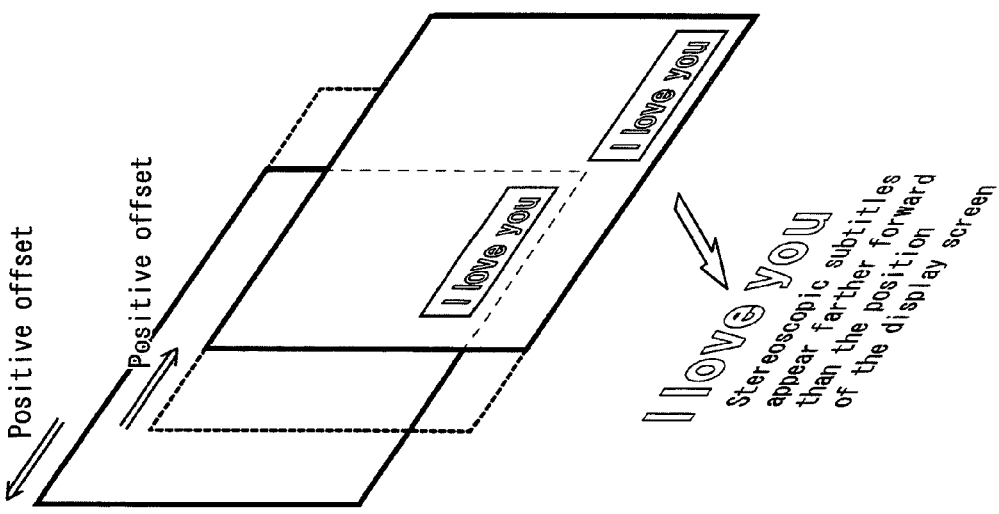

FIGS. 15A and 15B show examples of differences in view between positive and negative plane offsets.

An image depicting the graphics data that is closer to the viewer in each of FIG. 15A and FIG. 15B is a graphics image for the right view (right-view graphics image) after shifting. An image depicting the graphics data that is distant from the viewer in each of FIG. 15A and FIG. 15B is a graphics image for the left view (left-view graphics image) after shifting.

FIG. 15A shows a case where the sign of the plane offset is positive (the plane shift engine 20 shifts left-view graphics image in the right direction, and shifts the right-view graphics image in the left direction). When the sign of the plane offset is positive, as shown in FIG. 13, subtitles to be composited with the left-view video appears to be in a position more to the right than the subtitles to be composited with the right-view video. That is, since a point of convergence (focus position) is closer to the viewer than the position of the screen, the subtitles also appear to be closer to the viewer than the position of the screen.

FIG. 15B shows a case where the sign of the plane offset is negative. As shown in FIG. 14, when the sign of the plane offset id negative, subtitles to be composited with the right-view video appears to be in a position more to the left than the subtitles to be composited with the right-view video. That is, since a point of convergence (focus position) is more distant from the viewer than the position of the screen, the subtitles also appear to be distant from the viewer than the position of the screen.

This concludes the description of the method for displaying the subtitles in a position closer to the viewer than the position of the display screen or in a position more distant from the viewer than the position of the display screen by switching between the positive offset and the negative offset.

The above description illustrates that depending on the plane offset in the plane shift, a monoscopic image appears to be displayed farther in front than the display screen or farther to the back than the display screen. However, the size of the subtitle graphics targeted by the plane shift is not fixed, and generally, the size of the graphics are changed to accommodate processing such as enlarging or reducing the video, in order to improve interactivity.

In normal playback, the video is full scale, and the subtitle graphics are displayed at a size corresponding to the full scale video. In contrast, when switching to the menu screen, the video is reduced, the subtitle graphics are displayed at a size corresponding to the reduced video, and it is necessary to display a GUI necessary for the menu screen.

Figure 17:
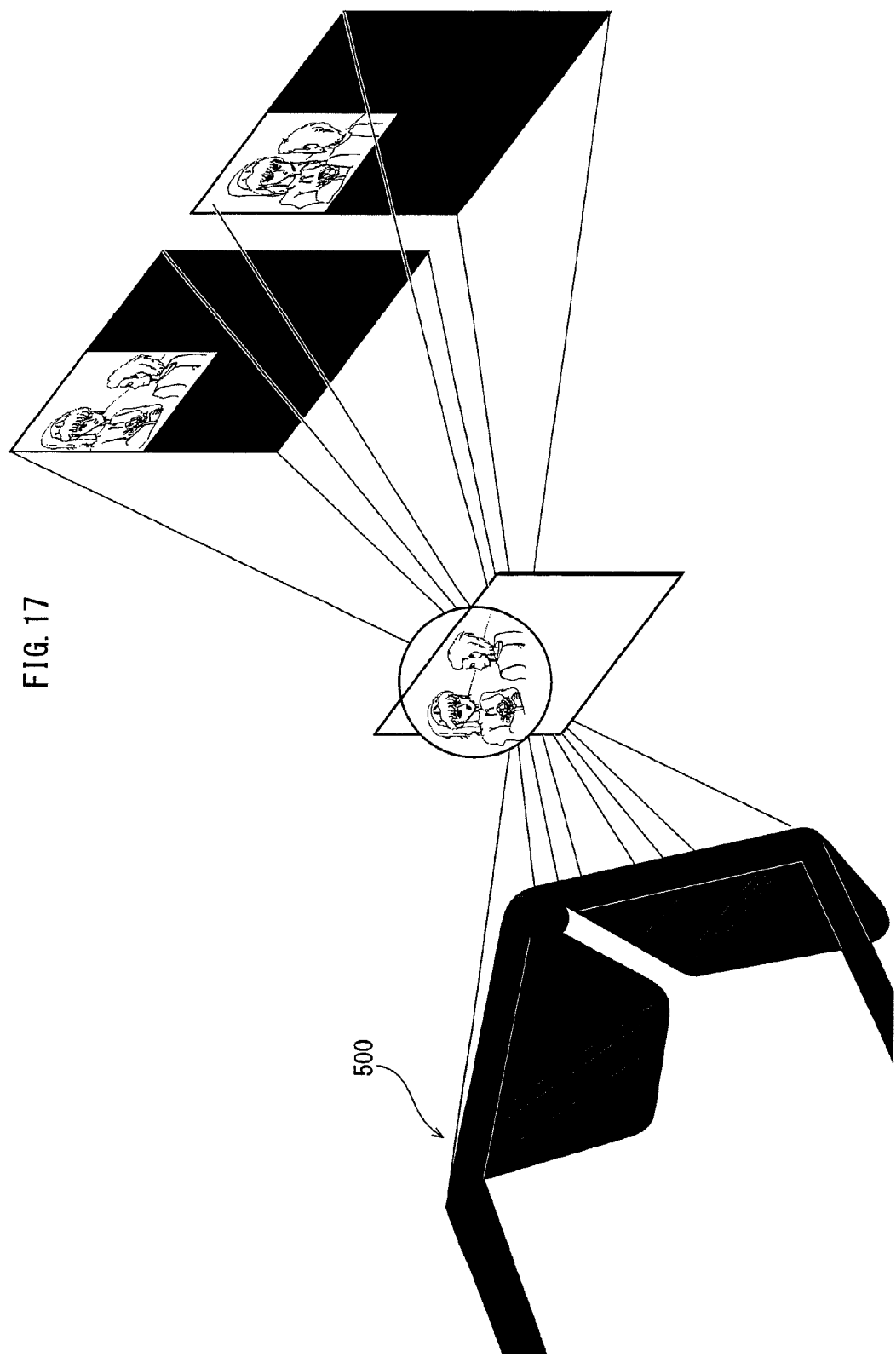
FIG. 17 shows an exemplary stereoscopic image viewed by a user when scaling has been performed on a moving image.

The following describes how to determine the plane offset in the plane shift when scaling is performed to realize interactivity of the video in this way. FIG. 17 shows a stereoscopic image viewed by a user when scaling is performed on the video.

When the display mode is 3D and the stereo mode of the video plane is ON, in the video image, if scaling is performed at a scaling factor "1/2", the horizontal and vertical width are both halved, and ultimately the stereoscopically displayed video image has 1/4 the area of the original image.

At this time, when the display mode is 3D and the stereo mode of the video plane is ON, since the images played back in the left view video stream and the right view video stream are images that differ by viewed angle, when scaling is performed according to the scaling factor, the level to which the image pops out in stereoscopic display also dynamically changes according to the scaling factor.

However, when the display mode is 3D, the stereo mode of the image plane is OFF, and scaling is performed of the image plane subtitles according to the scaling factor, if the plane offset is set to a value other than "0" in the image plane, since this plane offset does not dynamically change due to scaling, in the composited image, the viewer feels discomfort due to the strong sense that the subtitles are popping out.

The same is true when the display mode is 3D and the stereo mode of the interactive graphics plane is OFF.

This is described with use of a simple example.

Figure 18A:
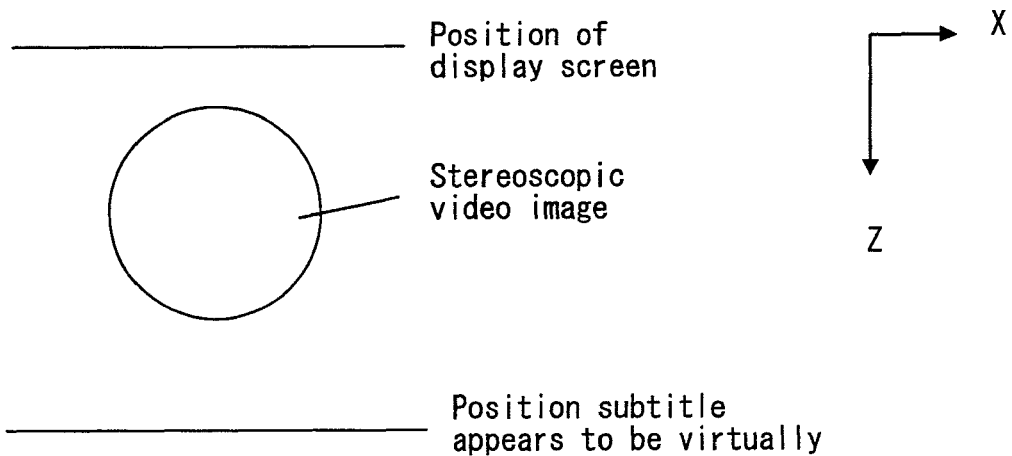
FIG. 18A, FIG. 18B and FIG. 18C show how a plane offset is determined in a plane shift when scaling is performed on a moving image.
Figure 18B:
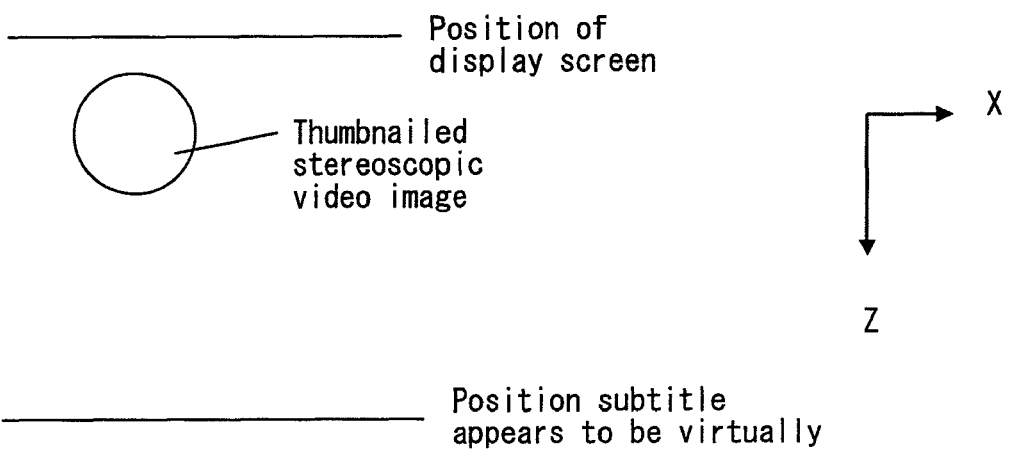
Figure 18C:
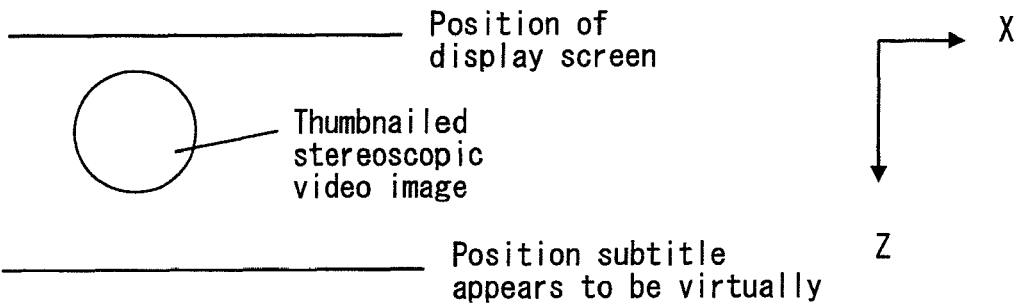

FIG. 18A, FIG. 18B and FIG. 18C illustrate what happens when a plane offset of the image plane must be changed according to scaling of the video, when the display mode is 3D, the stereo mode of the video plane is ON, and when the display mode is 3D and the stereo mode of the image plane is OFF.

In FIG. 18A, FIG. 18B and FIG. 18C, the object shown as a circle is an example of a virtual stereoscopic image visible to the human eye played back in the left view video stream and the right view video stream, viewed from the X-Z plane, and in the present example, the stereoscopic image appears farther front than the display screen.

Also, it is assumed that the offset of the image plane has been adjusted so that the position where the subtitles virtually appear is farther front than the virtual stereoscopic image.

FIG. 18A shows a case of displaying the video in full screen, and FIG. 18B shows a case of displaying a reduced video. The level of popping out of the video when the reduced video is displayed dynamically changes according to the degree of reduction. However, since the position where the subtitles virtually appear is determined by a fixed value given by the offset of the image plane, and the offset does not change due to the reduction processing, unless the offset of the image plane is changed according to scale, the position of the subtitles appears to pop out strangely.

FIG. 19 schematically shows an example of the popping-out level shown in FIG. 18.

The playback apparatus in the present embodiment provides a structure to solve this technical problem.

Specifically, the playback apparatus of the present embodiment dynamically adjusts the offset of the image plane according to the scale of the video. Specifically, when a reduced video is displayed as shown in FIG. 18C, adjusting (in this example, making smaller) the offset of the image plane brings the position where the subtitles virtually appear closer to the display screen.

FIG. 19 shows a stereoscopic image displayed when the processing of the present embodiment is not performed, that is, when content displayed when the video is reduced is displayed as-is after applying plane shift, or a plane offset specified by the user before the scaling is used.

In contrast, consider a case in which a plane offset E obtained by multiplying the scaling factor by the plane offset D used for compositing with the video before scaling is applied to the plane shift of the image plane. Since the scaling factor is multiplied by the plane offset D that has the meaning of the popping out level of the pixels in the image plane, the degree of popping out becomes less. Then the subtitle is brought up close to a vicinity of a scaled image of a person. In this way, the subtitle is close to the scaled image of the person, thus eliminating the sense of unbalance between the level of popping out of the image of the person and the subtitle.

Figure 20:
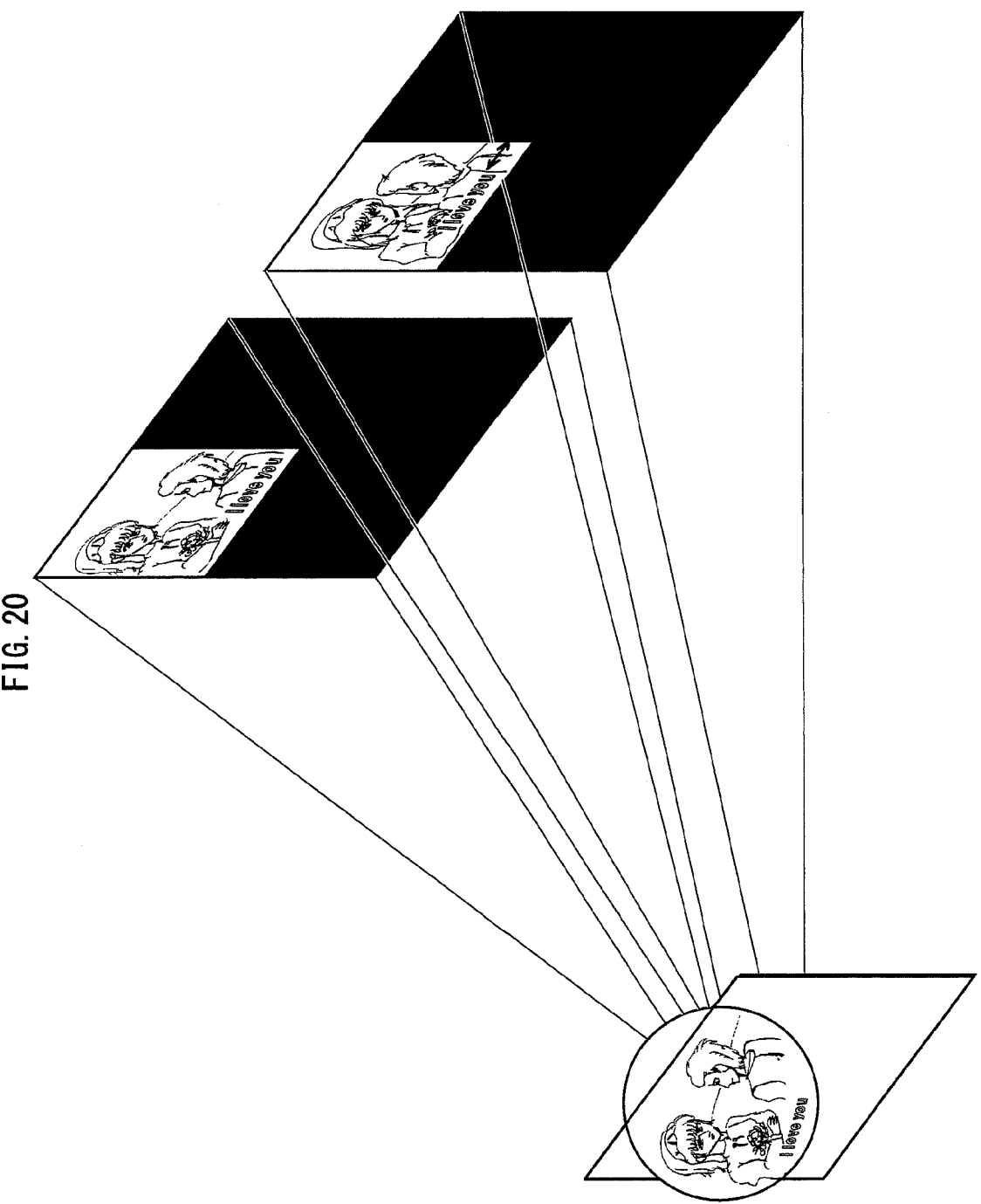
FIG. 20 shows a stereoscopic image when a plane offset used for compositing with a moving image before scaling is applied to a plane shift of an image plane.

FIG. 20 shows a stereoscopic image displayed when the processing of the present embodiment is performed, that is when a plane offset obtained by multiplying by a scaling factor is applied to the plane shift of the image plane.

In FIG. 20, unlike FIG. 19, the subtitle is close to the scaled image of the person, thus eliminating the sense of unbalance between the level of popping out of the image of the person and the subtitle.

In this way, to eliminate the sense of unbalance, it is necessary to provide a mechanism for calculating an optimal plane offset, in consideration of the scaling factor, in the plane shift engine 20. The plane shift engine 20 in FIG. 21 incorporates such a mechanism for calculating the optimal plane offset. The following describes the plane shift engine 20 with reference to FIG. 21.

Figure 21:
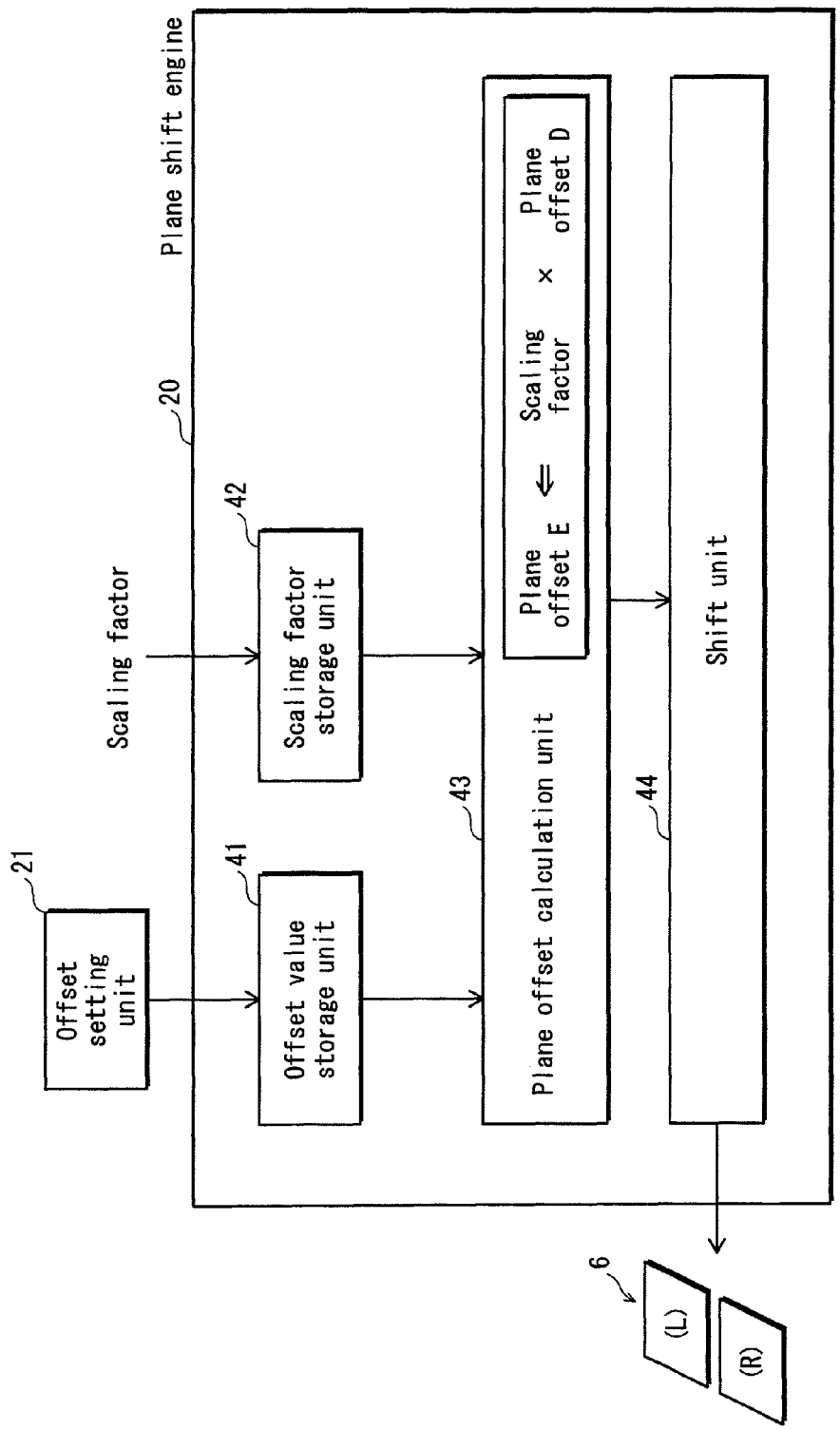
FIG. 21 shows an internal structure of a plane shift engine 20 of the playback apparatus 200 according to embodiment 1.

FIG. 21 shows an exemplary internal structure of the plane shift engine 20 of the playback apparatus 200 pertaining to the present embodiment. As shown in FIG. 21, the plane shift engine 20 includes an offset value storage unit 41, a scaling factor storage unit 42, a plane offset calculation unit 43, and a shift unit 44.

Offset Value Storage Unit 41

The offset value storage unit 41 stores content from the offset setting unit 21, or an offset value specified from the user.

Scaling Factor Storage Unit 42

The scaling factor storage unit 42 stores magnification information from before the scaling. For example, the scaling factor storage unit 42 stores information indicating "1" when the video is not scaled, indicating "1/2" when scaled to half size, and "2" when enlarged to twice the size.

Plane Offset Calculation Unit 43

The plane offset calculation unit 43 performs calculation to convert, in pixel units, a shift distance for the shift unit 44 to perform shifting in view of the screen size and the scaling based on the offset value stored in the offset value storage unit 41. To give a specific working example, when the scaling factor is specified to be "1/2", a new "plane offset E" is obtained by multiplying the scaling magnification stored in the scaling factor storage unit 42 by the offset value stored in the offset value storage unit 41.

Treatment of the Calculation Results

Next, the following describes the treatment of the calculation results following the decimal point. The calculation by the plane offset calculation unit 43 is performed along with the multiplication with the scaling factor, and in this case, the treatment of numerical values following the decimal point is a problem. The reason for this is that the shift distance must be an integer, since the shift distance indicates shifting by a number of pixel lengths. When the plane offset operation unit 43 performs the calculation, when a numerical value following the decimal point appears in the calculation unit, these numerical values following the decimal point are brought up to the next integer. For example, this means that if the result of the calculation by the plane offset calculation unit 43 is "3.2", the operation result is made to be "4".

Rounding the portion after the decimal point in the operation results up to the next integer in this way is called a "Ceil operation". In the present embodiment, when executing this operation when multiplying with the scaling factor, the Ceil operation is performed on the calculation result, and the portion after the decimal point in the calculation result is brought up to the next integer.

Influence of Demand for Resolution Maintenance

Next, the following describes the influence of demand for resolution maintenance from the application. Even during scaling when a KEEP_RESOLUTION setting is set, the plane offset calculation unit 43 executes a calculation of shift distance according to scaling factor. The KEEP_RESOLUTION setting is a function for performing enlargement/reduction only on the video plane without enlarging/reducing the interactive graphics plane at the time of the scaling instruction. Doing this enables changing the depth of the subtitles synchronously with the depth of the video at the time of KEEP_RESOLUTION.

Shift Unit 44

The shift unit 44 performs shifting toward a width axis if the image plane based on a value calculated by the plane offset calculation unit 43.

FIG. 22 shows three scaling factors of 1/1, 1/2, 1/4, and composite images of graphics including subtitles and GUI in cases when the scaling factors are applied.

The front shows a pair of a left image and a right image when the scaling factor is 1/1, the middle shows a pair of a left image and a right image when the scaling factor is 1/2, and the back shows a pair of a left image and a right image when the scaling factor is 1/4.

These drawings show examples of displaying a composite image in a position on the left top of the display screen, for example when the scaling factor is 1/2 or 1/4.

When the scaling factor is 1/2, the number of vertical pixels and number of horizontal pixels become 1/2, and the image is displayed in reduced size on the left side of the screen. When the scaling factor is 1/4, the number of vertical pixels and number of horizontal pixels become 1/4, and the image is displayed in reduced size on the left side of the screen.

Figure 22A:
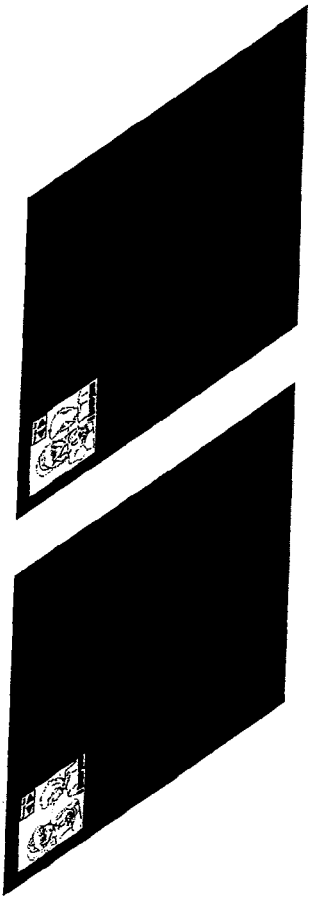
FIG. 22A, FIG. 22B, and FIG. 22C show three scaling factors of 1/1, 1/2, 1/4, and composite images of graphics including subtitles and GUI in cases when the scaling factors are applied.
Figure 22B:
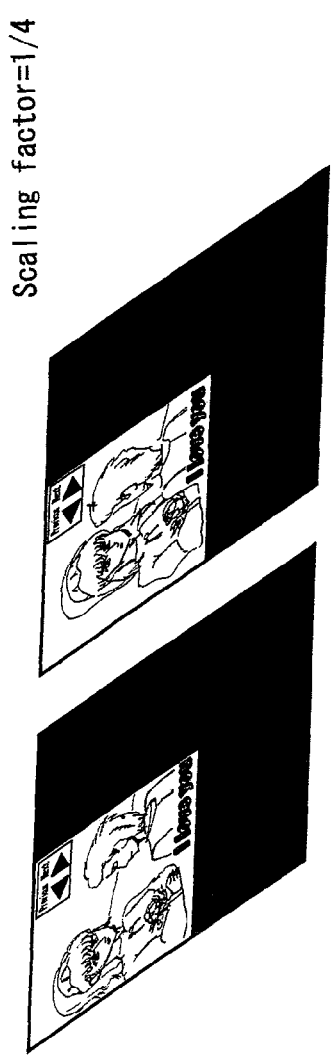
Figure 22C:
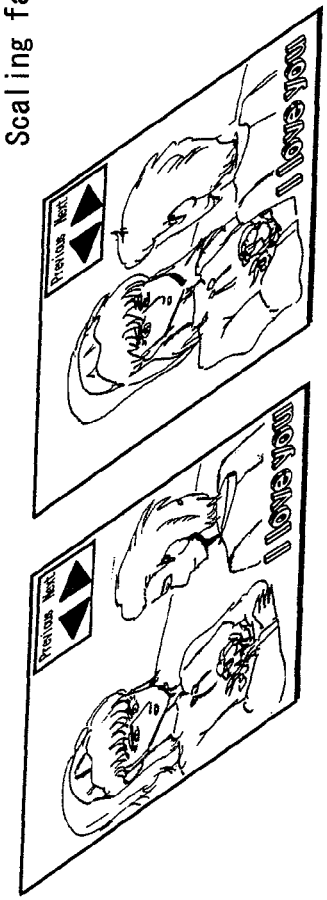

In FIGS. 22A, 22B, and 22C, a video in which subtitles and GUI are composited is targeted for scaling. However, in GUI processing performed along with scaling, the GUI is provided for full screen display, and in the full screen display of the GUI, the composite image is placed in the top left area. The GUI is meant to be removed as a target of scaling when drawn mainly in a portion other than the portion displayed in the composite image of the subtitles/video displayed on the top left area, and in this case only the composite image of the subtitles and the video is the target of scaling.

Also, GUI has been described as an example of interactive graphics data drawn by the BD-J application. However, the interactive graphics data drawn by the BD-J application also includes graphics images such as video and animation, as well as GUI.

In such cases, if the interactive graphics data drawn by the BD-J application is a target for scaling similarly to the subtitles and video, the interactive graphics data may be configured to be reduced along with the reduction of the subtitles/video. In this case, background data stored in the background plane 11 is displayed in the black portion shown in FIG. 22.

In the right eye and left eye images in FIGS. 22A, 22B, and 22C, it is apparent that after scaling, the shift distance of the subtitles is adjusted according to the size of the video plane, in contrast to the composite structure before scaling. This enables preventing a sharp difference in stereoscopic sense, reducing fatigue to the eye, and performing more natural display.

FIG. 24 shows three scaling factors of 1/1, 1/2, 1/4, and composite images of subtitle graphics in cases when the scaling factors are applied.

When the scaling factor is 1/1, GUI does not exist, but if the scaling factor is 1/2, the GUI is displayed. The right half of the screen of the television 400 shows a directors comment cm1 written by the director of a movie, and the lower half of the screen of the television 400 includes a button member bn1 for receiving next skip and previous skip operations, a button member bn2 for receiving a menu call, and a button member bn4 for receiving a network connection. These are the same as are shown in FIG. 1.

When the target of scaling is the video composited with subtitle graphics, the target of the plane shift is only the image plane, and the target of calculating the plane offset E, is also only the plane offset E in the image plane.

This completes the description of the plane shift engine 20. The following describes the details of the image plane targeted for the plane shift. First, with use of FIG. 26, the general structure of the image plane is described, and next, how pixel movement is performed in the image plane is described.

Figure 26A:
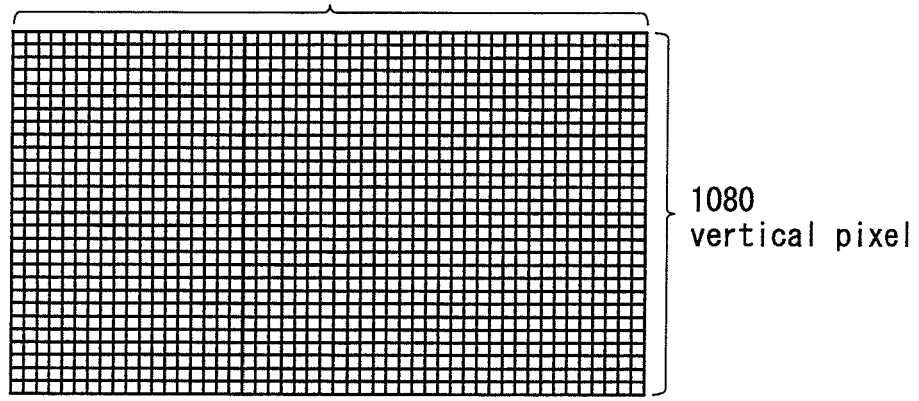
FIG. 26A and FIG. 26B show an internal structure of an image plane 8.
Figure 26B:
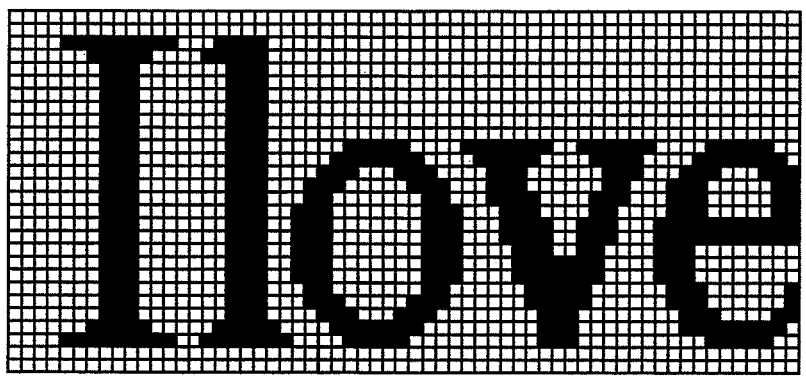

Each of FIG. 26A and FIG. 26B shows an exemplary internal structure of the image plane 8. When the resolution is set to 1920×1080, the image plane 8 is composed of 8 bit-length memory elements, and has a size of 1920 (horizontal)×1080 (vertical) as shown in FIG. 14A. This means that the image plane 8 has a resolution of 1920×1080, and has a memory allocation capable of storing an 8-bit pixel code for each pixel. The 8-bit pixel codes stored in the memory elements are converted into Y, CR and Cb values by color conversion using the color look-up table. The correspondence relationship among the pixel codes and the Y, CR and Cb values is defined by a pallet definition segment in the subtitle data.

FIG. 26B shows pixel data pieces held in the image plane 8. As shown in FIG. 14B, the graphics data held in the image plane 8 is composed of pixel data pieces that compose a foreground area (part composing the subtitles "I love you") and pixel data pieces that compose a background area. Pixel codes showing transparent colors are stored in the memory elements corresponding to the background area. In this area, the video in the video plane 6 can be seen through when the graphics data held in the image plane 8 is composited with the video in the video plane 6. Meanwhile, pixel codes showing colors except for the transparent color (non-transparent color) are stored in the memory elements corresponding to the foreground area. The subtitles are written by the Y, Cr and Cb values each showing the non-transparent color. In the area corresponding to transparent pixels, the background image stored in the background plane 11 positioned lower than the subtitles, or the content of the video stored in the video plane, appears transparent. The transparent area contributes to realizing the plane composition.

Figure 27A:
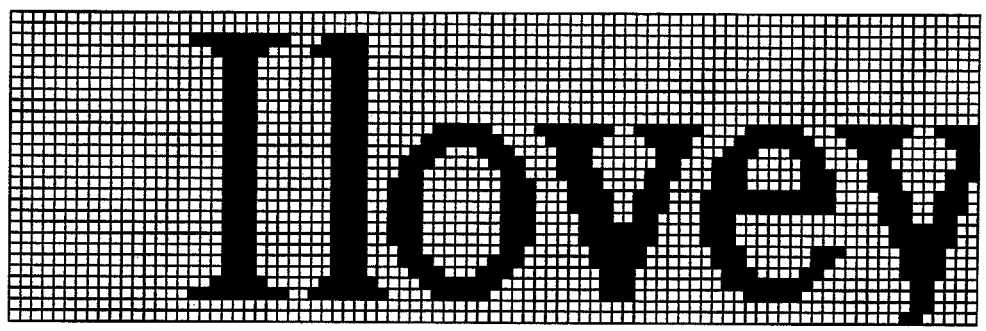
FIG. 27A, FIG. 27B, and FIG. 27C show pixel data pieces in a foreground area and pixel data pieces in a background area after a plane shift engine 20 shifts coordinates of each pixel data piece in the right direction, and shifts the coordinates of each pixel data piece in the left direction.
Figure 27B:
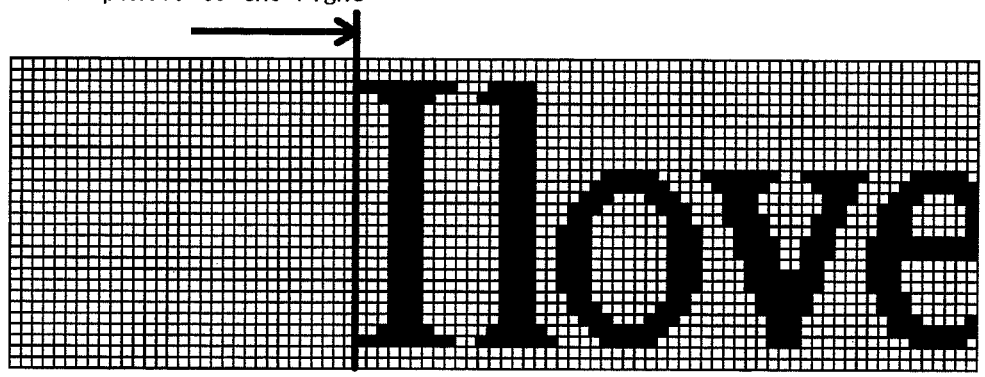
Figure 27C:
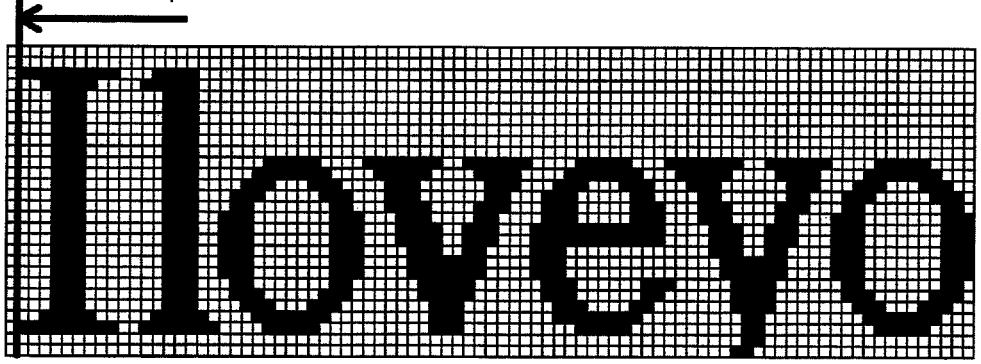

FIG. 27A, FIG. 27B and FIG. 27C show the pixel data pieces composing the foreground area and the pixel data pieces composing the background area after the shifting in the right direction or the shifting in the left direction have been performed. FIG. 27A shows the pixel data pieces before the shifting, and FIG. 27B shows the pixel data pieces after the shifting in the right direction is performed. It can be seen that a word "y" in the subtitles "I love you" disappears from the screen after the shifting when the shift distance is 15 pixels. FIG. 27C shows pixel data pieces after the shifting in the left direction is performed. It can be seen that "o" in the subtitles "you" succeeding the subtitles "I love" appears when the shift distance is 15 pixels.

This concludes the description of the internal structure of the image plane 8, and the description of the arrangements of pixel data pieces before and after the plane shift engine 20 performs the shifting in the image plane 8. The following describes the internal structure of the interactive graphics plane 10, and the arrangements of pixel data pieces held in the internal structure of the interactive graphics plane 10 before and after the shifting.

Figure 28A:
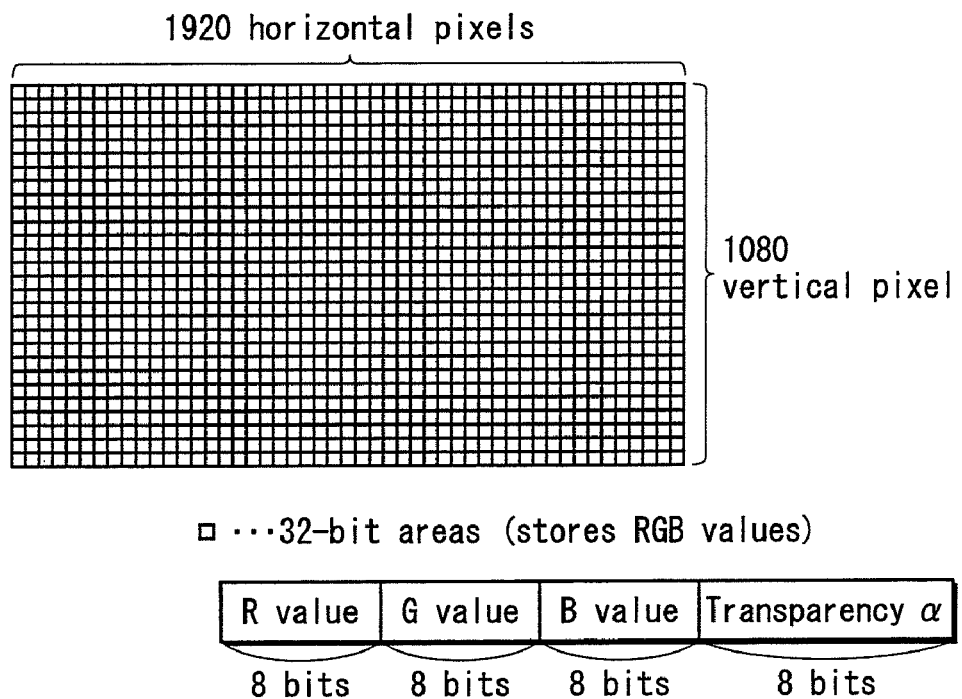
FIG. 28A and FIG. 28B shows an internal structure of the interactive graphics plane 10.
Figure 28B:
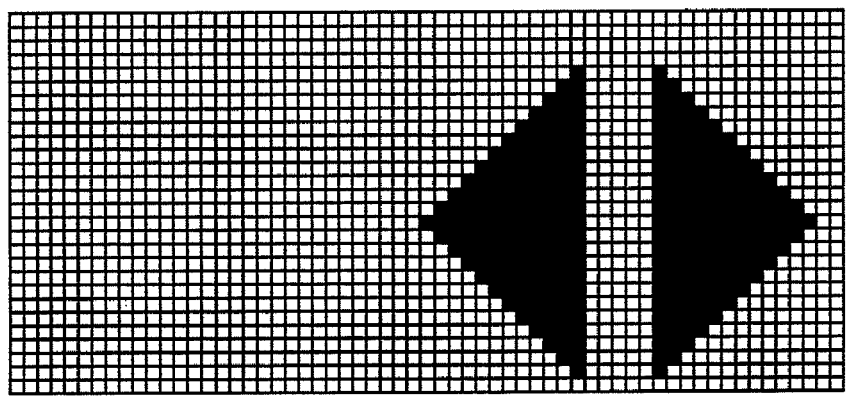

Each of FIG. 28A and FIG. 28B shows the internal structure of the interactive graphics plane 10. When the resolution is set to 1920×1080, the interactive graphics plane 10 is composed of 32 bit-length memory elements, and has a size of 1920×1080 as shown in FIG. 28A. This means that the interactive graphics plane 10 has a resolution of 1920×1080, and has a memory allocation capable of storing a 32-bit R, G, B and α values per pixel. The 32-bit R, G, B and α values are composed of an 8-bit R value, an 8-bit G value, an 8-bit B value and an 8-bit transparency α, respectively.

FIG. 28B shows pixel data held in the interactive graphics plane 10. As shown in FIG. 28B, the graphics held in the interactive graphics plane 10 are composed of pixel data corresponding to a foreground portion (GUI for receiving an operation for skipping to previous and later chapters), and pixel data corresponding to a background portion. Memory elements corresponding to the background area store R, G, B and α values showing transparent colors. In this area, the subtitles in the image plane and the video in the video plane 6 are transparent when the graphics data held in the interactive graphics plane 10 is composited with the data held in the video plane 6. Meanwhile, memory elements corresponding to the foreground area store R, G, and B values showing the non-transparent colors. The graphics are written with use of these R, G, and B values showing the non-transparent colors.

The graphics data held in the background graphics plane 10, the video in the video plane 6 and the graphics data held in the image plane 8 can be seen through when the foreground plane has a transparent pixel and the composition unit 16 composites these data pieces in the respective planes. The transparent area contributes to realizing the composition.

This concludes the description of the pixel data pieces composing the foreground area and the pixel data pieces composing the background area after the shifting in the right direction and the shifting in the left direction have been performed.

Figure 29A:
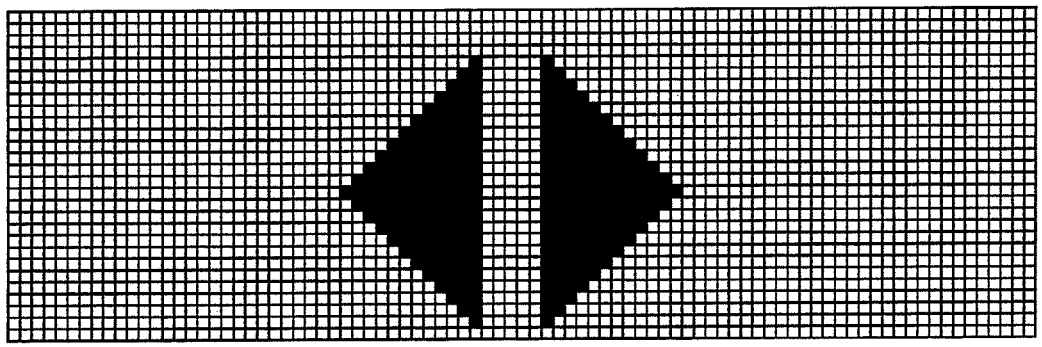
FIG. 29A, FIG. 29B and FIG. 29C show pixel data pieces in a foreground area and pixel data pieces in a background area after the plane shift engine 20 shifts the coordinates of each pixel data piece in the right direction, and shifts the coordinates of each pixel data piece in the left direction.
Figure 29B:
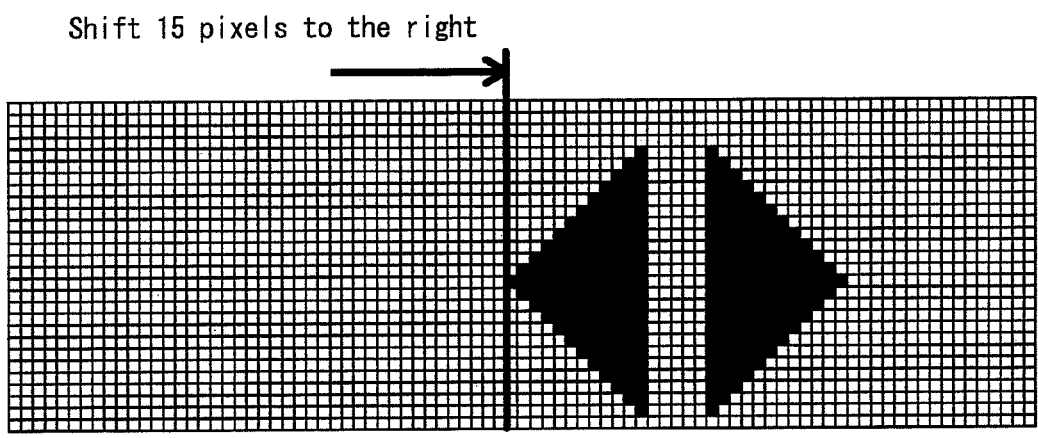
Figure 29C:
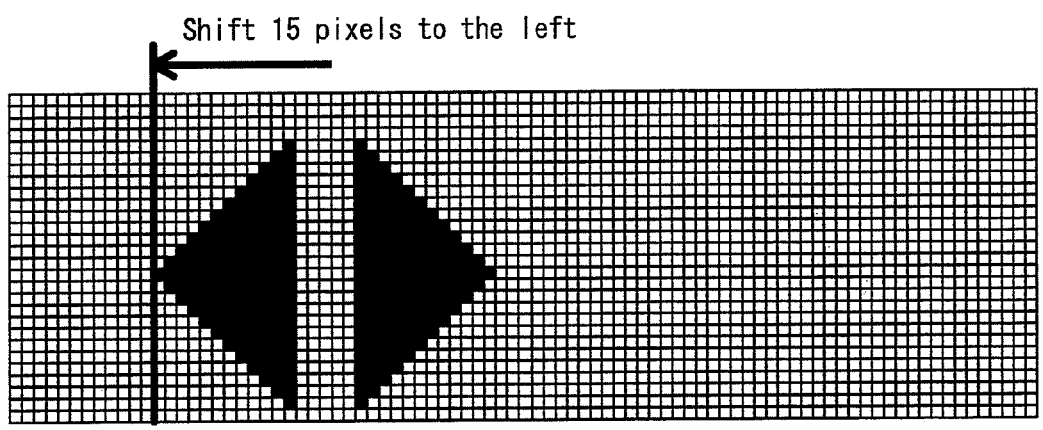

FIG. 29A, FIG. 29B and FIG. 29C show the pixel data composing the foreground area and the pixel data composing the background area after the shifting in the right direction and the shifting in the left direction have been performed. FIG. 29A shows pixel data before the shifting is performed, and FIG. 29B shows pixel data after the shifting in the right direction has been performed. In this case, it can be seen that the GUI for receiving an operation of skipping to previous and later chapters are shifted in the right direction. FIG. 29C shows pixel data after the shifting in the left direction is performed. It can be seen that the GUI for receiving an operation of skipping to previous and later chapters are shifted in the left direction.

FIG. 30A, FIG. 30B and FIG. 30C show the procedure for plane shifting process of image plane 8.

FIG. 30A shows image plane that have been shifted in the left direction and image plane that have been shifted in the right direction.

FIG. 30B shows the shifting process of image plane to the right direction. As shown in FIG. 30B, horizontal shifting of image plane to the right direction takes the following steps (1-1), (1-2) and (1-3). (1-1) The plane shift engine 20 crops a right end area of the image plane 8. (1-2) The plane shift engine 20 shifts coordinates of each of the pixel data in the image plane 8 horizontally to the right direction by a shift distance shown by the plane offset E. (1-3) The plane shift engine 20 adds a transparent area at the left end of the image plane 8.

FIG. 30C shows the shifting process of image plane to the left direction. As shown in FIG. 30C, horizontal shifting of image plane to the left direction takes the following steps (2-1), (2-2) and (2-3). (2-1) The plane shift engine 20 crops a left end area of the image plane 8. (2-2) The plane shift engine 20 shifts the coordinates of the pixel data in the image plane 8 horizontally to the left direction by a shift distance shown by the plane offset E. (2-3) The plane shift engine 20 adds a transparent area at the right end of the graphics data held in the image plane 8.

Next, meanings of the positive and negative signs of plane offsets are described.

When the playback apparatus 200 is in the 3D display mode and the stereo mode of the image plane 8 is OFF, the playback apparatus 200 perform the composition after performing the following processing in the planes based on the shift distance shown by the plane offsets E.

When the positive sign of the plane offset E is set, the plane shift engine 20 shifts coordinates of each of the pixel data in the left-view image plane 8 in the right direction by the shift distance indicated by the plane offset E. Then, the plane shift engine 20 shifts coordinates of each of the pixel data in the right-view image plane 8 in the left direction by the shift distance indicated by the plane offset E.

When the negative sign of the plane offset is set, the plane shift engine 20 shifts coordinates of each of the pixel data in the left-view image plane 8 in the left direction by the shift distance indicated by the plane offset E before the composition of the data in the respective planes. Then, the plane shift engine 20 shifts coordinates of each of the pixel data pieces in the right-view image plane 8 in the right direction by the shift distance indicated by the plane offset E.

FIG. 31A, FIG. 31B and FIG. 31C show the procedure for shifting the interactive graphics plane 10.

FIG. 31A shows the interactive graphics plane that have been shifted in the left direction and the interactive graphics plane that have been shifted in the right direction.

FIG. 31B shows the shifting process of interactive graphics plane to the right direction. As shown in FIG. 31B, horizontal shifting of interactive graphics plane to the right direction takes the following steps (1-1), (1-2) and (1-3). (1-1) The plane shift engine 20 crops a right end area of the interactive graphics plane 10. (1-2) The plane shift engine 20 shifts the coordinates of the pixel data in the interactive graphics plane 10 horizontally to the right direction by a shift distance indicated by the plane offset E. (1-3) The plane shift engine 20 adds a transparent area at the right end of the interactive graphics plane 10.

FIG. 31C shows the shifting process of interactive graphics plane to the left direction. As shown in FIG. 31C, horizontal shifting of interactive graphics plane to the left direction takes the following steps (2-1), (2-2) and (2-3). (2-1) The plane shift engine 20 crops a left end area of the interactive graphics plane 10.

(2-2) The plane shift engine 20 shifts the coordinates of each of the pixel data pieces in the interactive graphics plane 10 horizontally in the left direction by a shift distance indicated by the plane offset E. (2-3) The plane shift engine 20 adds a transparent area at the left end of the interactive graphics plane 10.

The following describes the size of the right end area and left end area of the graphics data to be cropped, and the size of the areas to be added at the right end and left end of the graphics data, in the interactive graphics plane 10, at the time of shifting the coordinates of each of the pixel data pieces in the respective planes. The plane offset E used for the above-stated shifting is a value that responds to the binocular disparity between the right eye and the left eye. This means that each of: the number of horizontal pixels composing the right end area to be cropped; the number of horizontal pixels composing the left end area of the graphics data to be cropped in the graphics plane; and the number of horizontal pixels composing the transparent area to be added at each of the right and left ends of the graphics data held in the graphics plane need to be the number of pixel lengths corresponding to the plane offset.

Therefore, the number of horizontal pixels composing the right end area to be cropped and the number of horizontal pixels composing the left end area to be cropped in the graphics plane is the number of pixel lengths corresponding to the shift distance indicated by the plane offset E. Also, the number of vertical pixels composing the transparent areas is the number of pixel lengths corresponding to the height of the graphics plane.

Similarly, the number of horizontal pixels composing the transparent areas to be added at each of the right and end ends of the graphics image held in the graphics plane is the number of pixel lengths corresponding to the shift distance indicated by the plane offset E. The number of vertical pixels composing the transparent areas is the number of pixel lengths corresponding to the height of the graphics plane.

This concludes the description of the process of shifting the image plane 8 and the interactive graphics plane 10. The following describes the meanings of the positive and negative signs of the plane offset E.

When the display mode is 3D, and the stereo mode of the interactive graphics plane 10 is OFF, the playback apparatus 200 performs the composition after performing the following process in the planes based on the plane offset E.

When the positive sign of the plane offset E is set, the plane shift engine 20 shifts the left-view graphics plane in the right direction by the shift distance shown by the plane offset E. Also, the plane shift engine 20 shifts the right-view graphics plane by the shift distance shown by the plane offset E.

When the negative sign of the plane offset E is set, the plane shift engine 20 shifts the left-view graphics plane in the left direction by the shift distance shown by the plane offset. And, the plane shift engine 20 shifts the right-view graphics plane in the right direction by the shift distance shown by the plane offset E.

Shifting of the Coordinates of the Pixel Data in the Respective Memory Elements in the Graphics Plane The following describes how the plane shift engine 20 shifts coordinates of the pixel data in the memory elements in the graphics plane due to the above-stated shifting. The graphics data is composed of pixel data pieces, and has a resolution 1920×1080 or 1280×720, for example.

FIG. 32 shows the pixel data pieces held in the graphics plane. In FIG. 32, squared frames are memory elements storing 32 bits or 8 bits of information. Hexadecimal numerical values such as 0001, 0002, 0003, 0004, 07A5, 07A6, 07A7, 07A8, 07A9, 07AA and 07AB are addresses serially allocated to these memory elements in the memory space of the MPU. Also, each of the numerical values such as (0, 0), (1, 0), (2, 0), (3, 0), (1916, 0), (1917, 0), (1918, 0) and (1919, 0) in the respective memory elements shows coordinates of which pixel data is stored in a corresponding memory element.

The pixel data in a pair of coordinates (0, 0) is stored in the memory element whose address is 0001. The pixel data whose coordinates are (1, 0) is stored in a memory element whose address is 0002. The pixel data whose coordinates are (1919, 0) is stored in a memory element whose address is 07A8. The pixel data whose coordinates are (0, 1) is stored in a memory element whose address is 07A9. That is, it can be seen that graphics data is stored such that a plurality of lines composing the graphics are composed of memory elements having serially-arranged addresses. Thus, these pixel data pieces may be read in a burst mode by sequentially performing the DMA transfer on the memory elements to which the serial addresses are given.

Figure 33A:
FIG. 33B shows what is held in the graphics plane after the plane shift engine 20 shifts the coordinates of each of the pixel data pieces.
Figure 33B:
Figure 34:
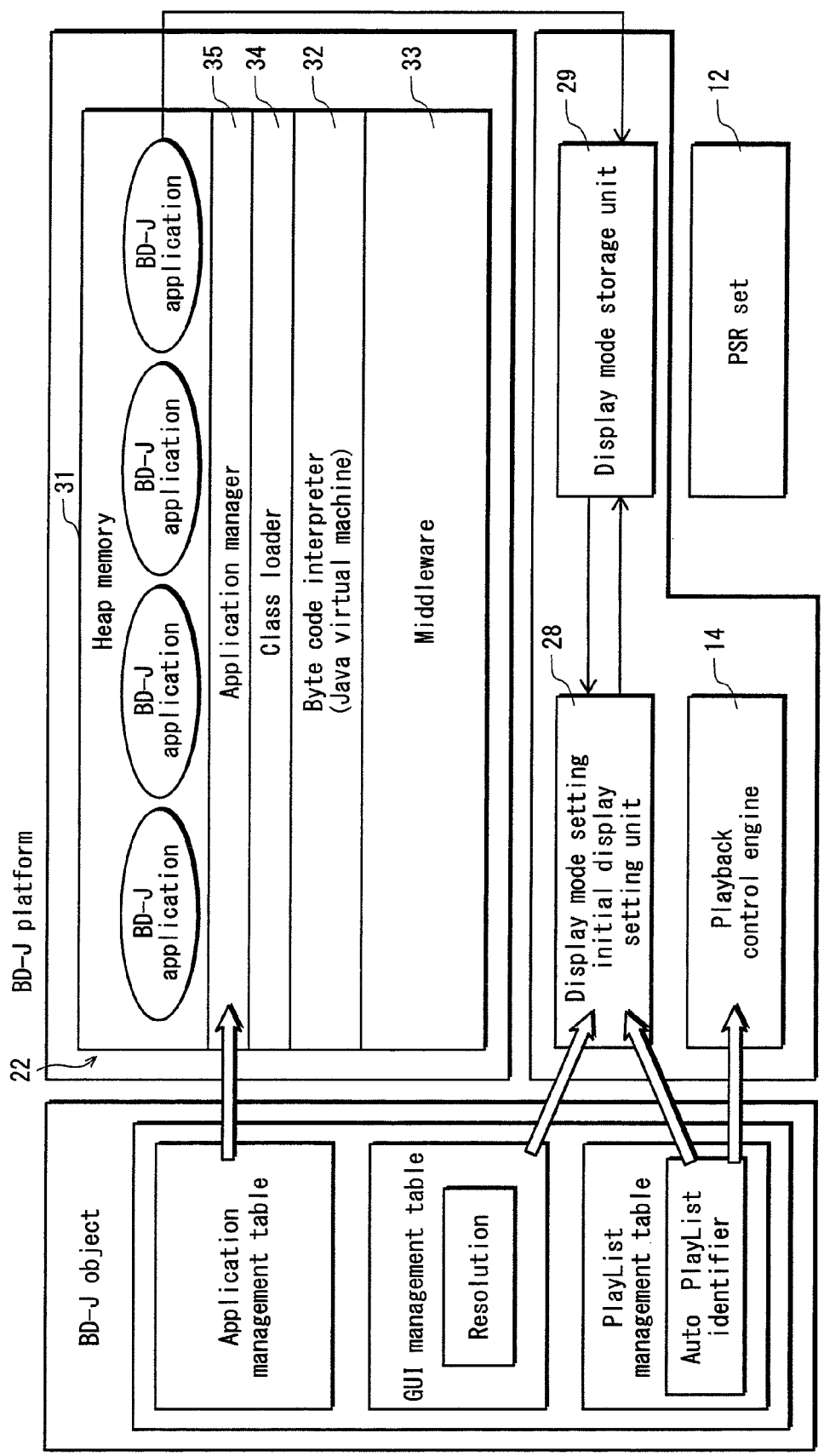
FIG. 34 shows an internal structure of a BD-J platform unit.

Each of FIG. 33A and FIG. 33B shows what is held in the graphics plane after the shifting has been performed.

FIG. 33A shows the graphics plane after the coordinates of each of the pixel data pieces have been shifted in the right direction with the plane offset E being "3". Since the plane offset E is "3", the pixel data whose coordinates are (0, 0) in a graphics plane coordinate system is stored in a memory element whose address is 0004, pixel data whose coordinates are (1, 0) in the graphics plane coordinate system is stored in a memory element whose address is 0005, and pixel data whose coordinates are (2, 0) in the graphics plane coordinate system is stored in a storage element whose address is 0006.

Also, it can be seen that pixel data whose coordinates are (0, 1) in the graphics plane coordinate system is stored in a memory element whose address is 07AC, pixel data whose coordinates are (1, 1) in the graphics plane coordinate system is stored in a memory element whose address is 07AD, and pixel data whose coordinates are (2, 1) in the graphics plane coordinate system is stored in a memory element whose address is 07AE.

FIG. 33B shows the graphics plane after the plane shift engine 20 has shifted the coordinates of the pixel data pieces in the left direction with the plane offset E being "3". Since the plane offset E is "3", it can be seen that pixel data whose coordinates are (3, 0) in the graphics plane coordinate system is stored in a memory element whose address is 0001, pixel data whose coordinates are (4, 0) in the graphics plane coordinate system is stored in a memory element whose address is 0002, and pixel data whose coordinates are (5, 0) in the graphics plane coordinate system is stored in a memory element whose address is 0003.

Also, it can be seen that pixel data whose coordinates are (3, 1) in the graphics plane coordinate system is stored in a memory element whose address is 07A9, pixel data whose coordinates are (4, 1) in the graphics plane coordinate system is stored in a memory element whose address is 07AA, and pixel data whose coordinates are (5, 1) in the graphics plane coordinate system is stored in a memory element whose address is 07AB.

As described in the above, it can be seen that, in the graphics plane after the shifting has been performed, the coordinates of each of the pixel data in the graphics plane are shifted to the right or left from the original coordinates of each of the pixel data pieces by the number of pixel lengths shown by the plane offset E.

In order to realize the shifting in the graphics plane, the plane shift engine 20 needs to shift the coordinates of each of the pixel data composing the graphics data by an amount indicated in a predetermined address, an address of a memory element on which each of the pixel data pieces composing the graphics data is positioned. It is needless to say that the plane shift engine 20 can realize the shifting in the graphics plane without changing the address of the memory element on which each of the pixel data pieces is arranged, by performing processing that corresponds to the above-stated processing.

This concludes the description of what is held in the graphics plane after the plane shift engine 20 has performed the shifting.

As described above, the plane shift is implemented to realize controlling how to move the coordinates of pixels in the memory, and is realized by software bundled in the playback apparatus, so to speak. In contrast, since a program for playback control provided from a BD-ROM is a byte code application written in Java language as described above, the executor of the byte code application exists in the playback apparatus 200. The following describes the internal structure of a BD-J platform unit 22 that executes byte code applications.

FIG. 31 shows an internal structure of the BD-J platform unit. As shown in FIG. 31, the BD-J platform 22 is composed of a heap memory 31, a byte code interpreter 32, a middleware 33, a class loader 34 and an application manager 35.

Heap Memory 31

The heap memory 31 is a stack area on which the byte code of the system application, the byte code of the BD-J application, a system parameter used by the system application and an application parameter used by the BD-J application are arranged.

Byte Code Interpreter 32

The byte code interpreter 32 converts the byte codes composing the BD-J application stored in the heap memory 31 and byte codes composing the system application into native codes, and causes the MPU to execute the converted codes.

Middleware 33

The middleware 33 is an operating system for the embedded software, and is composed of a kernel and a device driver. The kernel provides the BD-J application with functions specific to the playback apparatus 200 in accordance with calls of the application programming interface (API) from the BD-J application. Also, the kernel realizes hardware control such as starting an interrupt handler unit by an interrupt signal.

Class Loader 34

The class loader 34 is one of the system applications, and loads the BD-J application by reading the byte codes from the class files that exist in the JAR archive file, and storing the byte codes in the heap memory 31.

Application Manager 35

The application manager 35 is one of the system applications, and performs the application signaling of the BD-J application such as starting the BD-J application or ending the BD-J application, based on the application management table in the BD-J object.

This concludes the description of the internal structure of the BD-J platform unit.

In the above-stated layer model, the display mode setting initial display setting unit 28 is in the lower layer of the platform unit, which sets a display mode and a resolution based on the BD-J object in the current title used by the BD-J platform unit.

Internal Structure of the Display Mode Storage Unit 29

The display mode storage unit 29 can be referred to from the above-stated layer model. Therefore, the display mode storage unit 29 can be referred to from the layer model via the API, and includes information showing a setting and a state of each of the background graphics plane 11, the video plane 6, the image plane 8 and the interactive graphics plane 10. The following describes the structure of the display mode storage unit 29, referring to FIG. 35.

FIG. 35 shows what is stored in the display mode storage unit 29.

In FIG. 35, the display mode storage unit 29 stores information on the setting of the background plane 11, information on the setting of the video plane 6, information on the setting of the image plane 8, information on the setting of the interactive graphics plane 10, and information on the state of the display mode showing whether the playback apparatus 200 is in the 2D mode or the 3D mode. "Resolution (:YY×ZZ in FIG. 35)" and a stereo mode (:ON or OFF in FIG. 35) and a setting of THREE_D (:ON or OFF in FIG. 35) are stored as setting items of each plane. Besides the above-stated setting items, the plane offset may be set in a range of "−63" to "+63" in the setting of the image plane 8 and the setting of the interactive graphics plane 10.

As shown in FIG. 35, if different values are used for the plane offset set in the image plane and the plane offset set in the interactive graphics plane, the subtitle graphics and the GUI appear to be displayed in different positions on the Z axis. In this case, the offset value storage unit in FIG. 21 is configured to store two plane offsets, namely, the plane offset set in the image plane and the plane offset set in the interactive graphics plane.

The following describes the resolution supported by the display mode storage unit 29.

When the playback apparatus 200 is in the 2D display mode, the display mode storage unit 29 supports a resolution of 1920×1080 pixels, a resolution of 1280×720 pixels, a resolution of 720×576 pixels, and a resolution of a 720×480 pixels for the background plane 11, the video plane 6, the image plane 8 and the interactive graphics plane 10, as the initial display setting.

This concludes the description of what is stored in the display mode storage unit 29.

The following describes the initial display setting by the display mode setting initial display setting unit 28. Even during a period when one title has been selected, and the BD-J object corresponding to that title is valid in the playback apparatus, there are cases in which the currently-operating application calls a JMF player instance according to a user operation, thus starting playback of a new PlayList. If a new PlayList is started in this way, it is necessary to reset the display mode setting in the title.

As functions of the display mode setting initial display setting unit 28, support must be provided for an inter-title display mode setting used when the title changes, a display mode setting used when the PlayList changes in the title, and a display mode setting for when the application explicitly calls the API and sets the display mode. Specifically, a program can be created for causing the MPU to execute the processing procedures indicated in the flowchart described below, and this program can be implemented by incorporation in the playback apparatus.

FIG. 36 is a flowchart showing processing procedures for setting the display mode when the title is changed. In this flowchart, Step S24, Step S25 and Step S27 are selectively executed in accordance with the judgment results of Step S21, Step S22, Step S23 and Step S26.

Step S21 is a judgment of whether the auto playback PlayList exists or not, and Step S22 is a judgment of whether the immediately preceding display mode is a 3D display mode. Step S23 is a judgment of whether or not the auto playback PlayList of the selected title is a 3D PlayList with a resolution of 1920×1080 or a 3D PlayList with a resolution of 1280×720.

When the auto playback PlayList does not exist, it is judged whether the default resolution of the BD-J object is HD3D_1920×1080, or HD3D_1280×720 in Step S26. If the judgment of Step S26 is Yes, the display mode is set to a 3D display mode, and the resolution is set to 1920×1080 or 1280×720 in Step S25.

If the judgment of Step S26 is No, the display mode is set to a 2D display mode in Step S27, and the resolution is set to a default resolution in the BD-J object.

When the auto playback PlayList does exists, it is judged whether or not the immediately preceding display mode is the 2D display mode in Step S22. If Step S22 is Yes, it is judged whether or not the PlayList is a 3D PlayList in Step S23 and the resolution is 1920×1080 and 1280×720 in Step S23. If the judgment of Step S22 or Step 23 is No, the display mode is set to the 2D display mode, and a resolution is set to the resolution of the auto playback PlayList in Step S24.

If the judgment of Step S22 is Yes, and the judgment of Step S23 is also Yes, the display mode is set to a 3D display mode, and the resolution is set to 1920×1080 and 1280×720 according to the resolution of the auto playback PlayList in Step S25.

This concludes the description of processing procedures for setting the display modes in the title.

Figure 37:
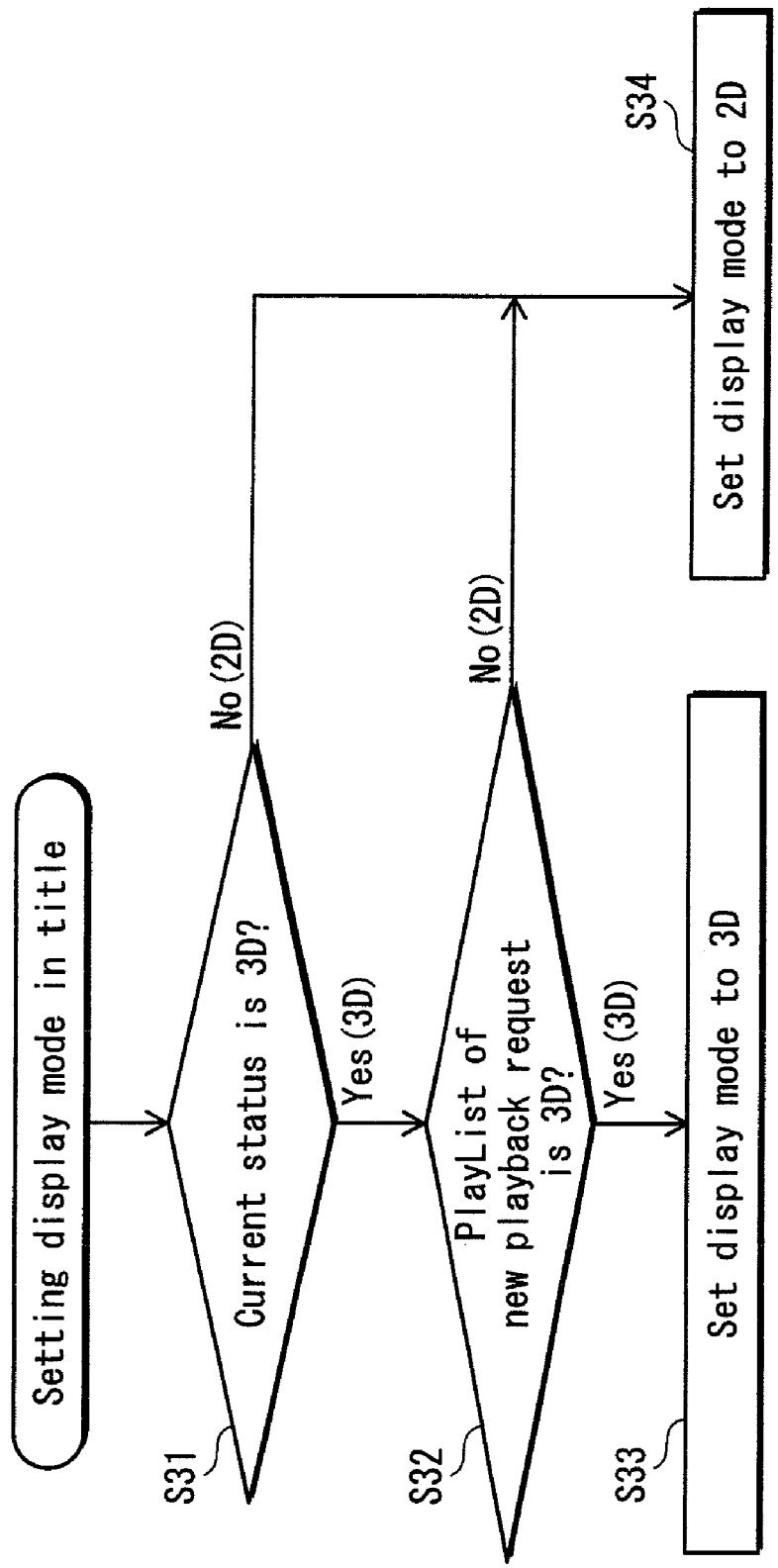
FIG. 37 shows a flowchart showing processing procedures for display mode setting in each title.

FIG. 37 is a flowchart showing the processing procedures for setting the display mode in the title. In this flowchart, Step S31 and Step S32 are serially connected to one another. Firstly, the setting of the display modes in the title starts with making request for playing back the PlayList. When receiving the request for playing back the PlayLists, Step S31 judges whether the current status is 3D or not. If the status is 2D, the display mode is set to a 2D display mode in Step S34. Step S32 is a judgment of whether or not the PlayList requested to be played back is a 3D PlayList. If the PlayList is the 3D PlayList, Step S33 is performed, and the display mode is set to the 3D display mode. If the PlayList is the 2D PlayList, Step S34 is performed, and the display mode is set to the 2D display mode.

This concludes the description of the processing procedures for setting the display mode in the title.

Implementation of the Playback Control Engine 14

When a current PlayList is selected due to some factor, the playback control engine 14 plays back the current PlayList. Specifically, the playback control engine 14 needs to realize processing of: reading PlayList information corresponding to the current PlayList in the still scenario memory 13; and playing back a 3D stream and a 2D stream referred to by the PlayItem information in the PlayList information. More specifically, it is necessary to: create a program that executes processing procedures indicated by the flowchart below; install the program in the playback apparatus 200; and cause the MPU to execute the program.

FIG. 38 is a flowchart showing main procedures for playing back the PlayList in the BD-J mode.

Step S40 is a judgment of whether the current PlayList number is set by setting of the auto start PlayList in the BD-J object that relates to the selected title, or generation of the JMF player instance. If the current PlayList number is set, a PlayList information file indicated by the current PlayList number is loaded in the still scenario memory in Step S41. If a plane offset exists in the PlayList information in Step S42, the offset setting unit sets the plane offset as the plane offset value in the plane shift engine 20. Then, the display mode in the title is set in Step S43.

In Step S44, the first PlayItem number in the loaded PlayList information is set to the current PlayItem number. In Step S45, the current stream is selected from among PES streams permitted to be played back in the current PlayList information.

In Step S46, what number of a stream is used is decided based on the PlayItem information.

In Step S47, it is judged whether the display mode determined in the Step S43 is the 2D display mode or the 3D display mode. If the display mode is the 3D display mode, the playback control engine 14 executes the playback of the 3D video stream in the 3D display mode in Step S49. If the display mode is the 2D display mode, Step S48 is performed.

Step S48 is judgments of whether the video stream indicated by the current stream number and whether the subtitles are 2D or 3D. If it is judged that the video stream and the subtitles are 2D in Step S48, the playback control engine 14 executes the playback of a 2D AV stream in the 2D display mode in Step S51. If it is judged that the video stream and the subtitles are 3D, the playback control engine 14 executes the playback of the 3D video stream in the 2D display mode in Step S50. Lastly, when the procedure reaches "end" in FIG. 38, the playback of the PlayList starts.

Figure 39:
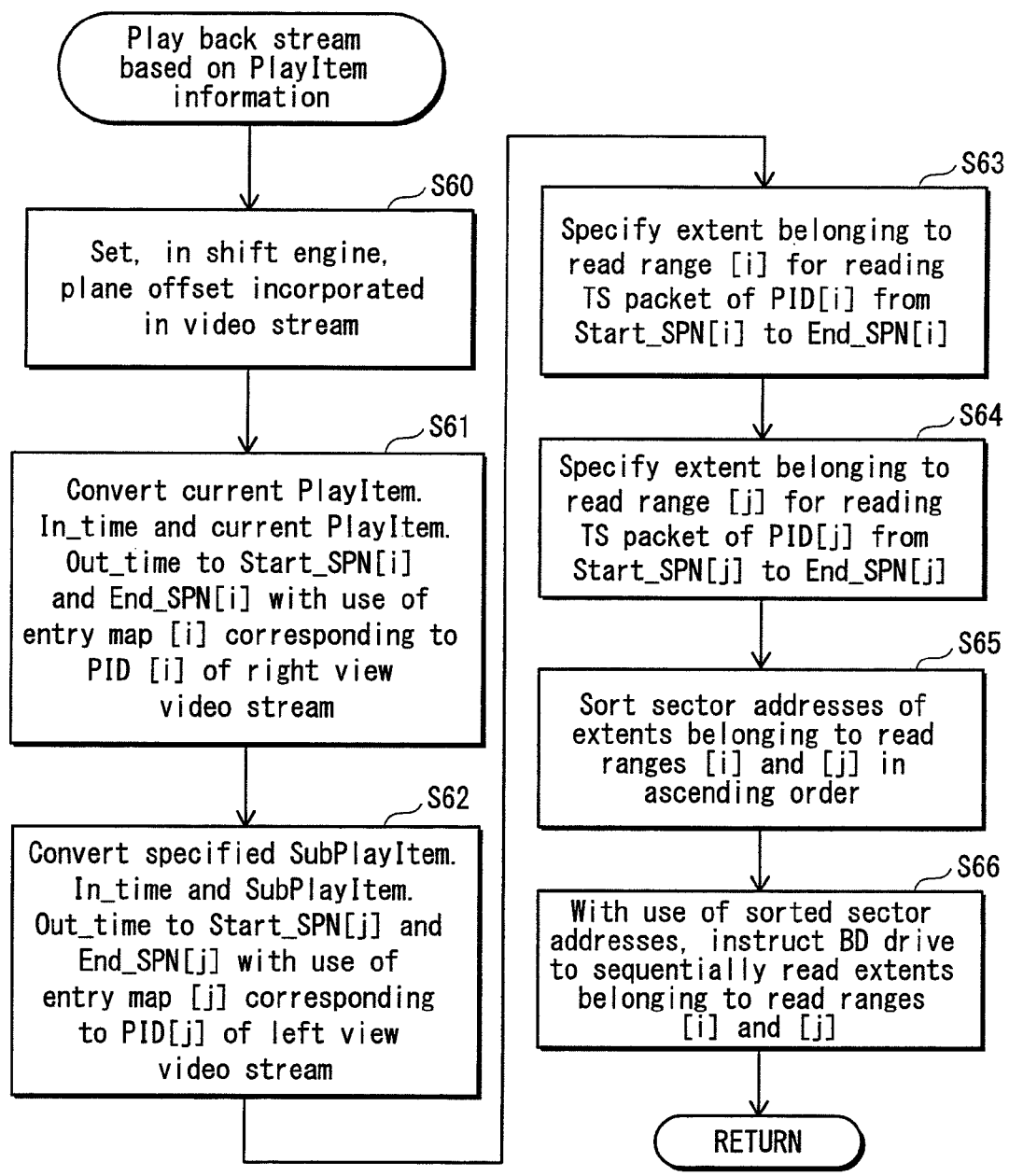
FIG. 39 shows a flowchart showing main procedures for playing back a PlayList.

FIG. 39 is a flowchart showing playback procedures based on the PlayItem information.

In Step S60, the plane offset D embedded in the video stream is set in the plane shift engine 20. In Step S61, a current PlayItem. In_Time and a current PlayItem. Out_Time are converted into a Start_SPN[i] and End_SPN[i] respectively, with use of an entry map corresponding to the a packet ID of the left view stream.

The SubPlatItemIn_Time and SubPlayItemOut_Time specified with use of an entry map [j] corresponding to a packet ID [j] of the right view stream are converted into Start_SPN[j] and End_SPN[j], respectively (Step S62).

The playback control engine 14 specifies an extent that falls in a read range [i] for reading Start_SPN[i] to End_SPN [i] of a TS packet [i] of the packet ID [i] (Step S63). The playback control engine 14 specifies an extent that belongs to a read range for reading Start_SPN[j] to End_SPN[j] of a TS packet [j] of the packet ID [j] (Step S64). The playback control engine 14 instructs the drive to sorts addresses of the extents that belong to the read ranges [i] and [j] in an ascending order in Step S65, and to sequentially read these extents that belong to the read ranges [i] and [j] with use of the sorted addresses in Step S66.

This concludes the description of the playback control engine 14.

Figure 40:
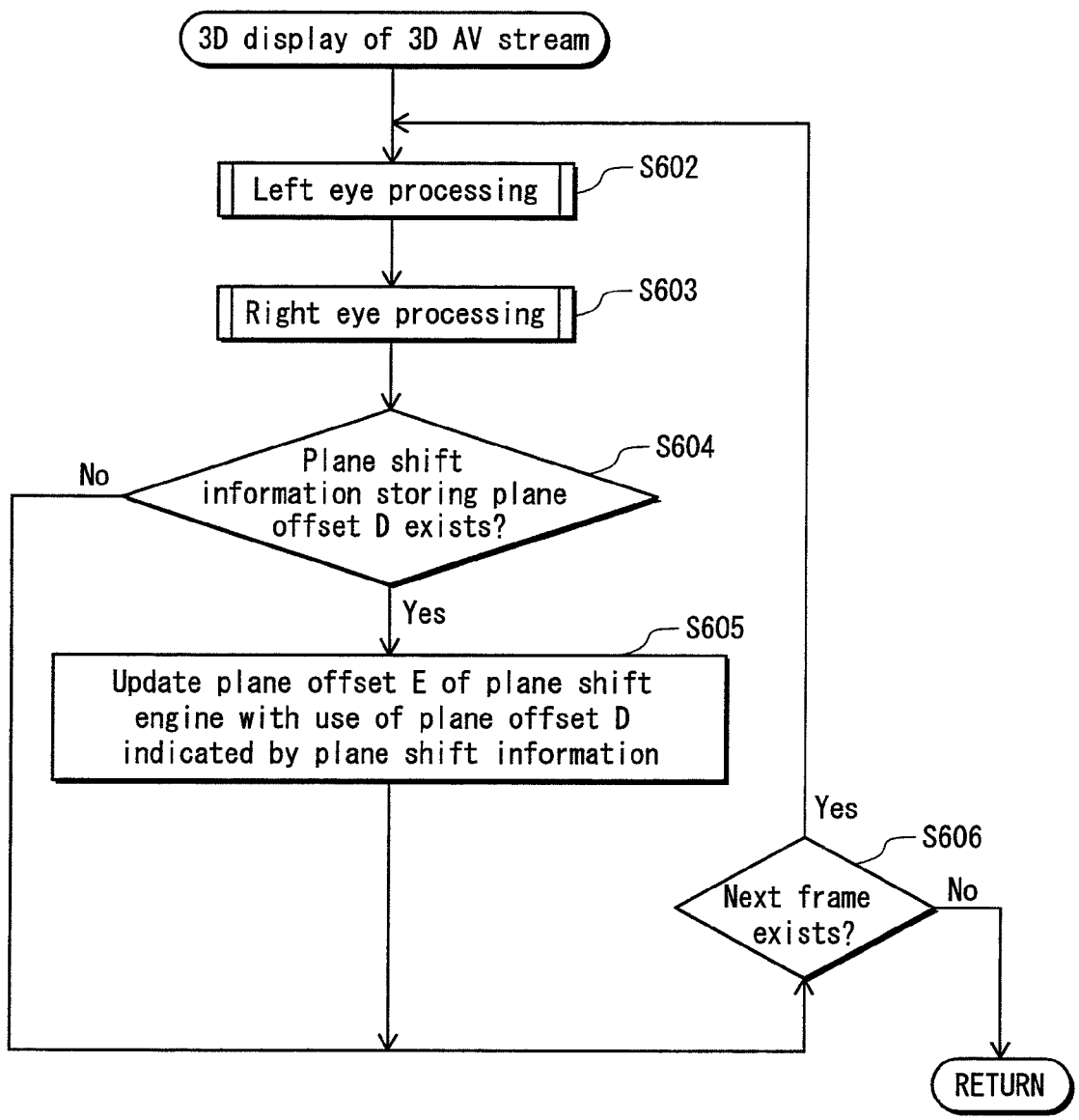
FIG. 40 shows a flowchart showing playback procedures based on PlayItem information.

FIG. 40 is a flowchart showing processing procedures of 3D display of a 3DAV stream. The present flowchart is for executing a loop made up of steps S602 to S606. This loop continues sequentially executing the processing of left eye processing (step S602) and right eye processing (step S603) until frame output ends (step S606: NO).

Note that the processing for extracting the plane offset D from the current PlayList information and storing the plane offset D in the plane shift engine has already been performed in step S42 of FIG. 38.

In the present loop, step S604 is a judgment regarding whether the plane offset D is set in the offset value storage unit 41, and if the plane offset D is not set, processing skips to step S605, but if the plane offset D is set, step S605 is executed. Step S605 is processing for offset calculation performed by the offset calculation unit 43 shown in FIG. 21, with use of the plane offset D stored in the offset value storage unit 41, and updating the plane offset E in the plane shift engine 20.

Figure 41:
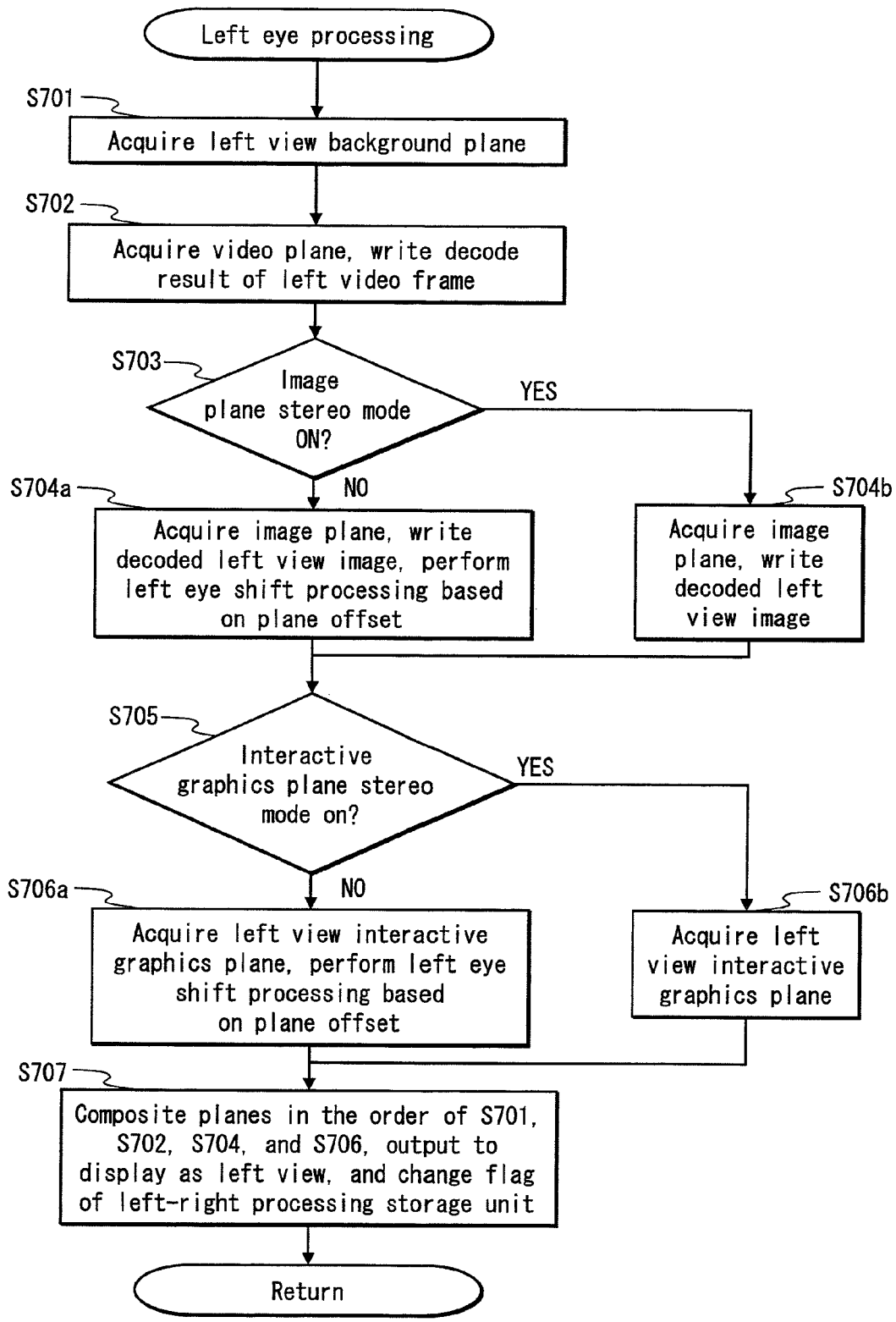
FIG. 41 shows a flowchart showing playback procedures for left-eye processing in 3D display mode.

Processing Procedures for the 3D Video Stream at the Time of the 3D Display Mode When the current display mode is the 3D display mode, and the playback targets are the 3D PlayList and the 3D stream, the processing procedures shown in FIG. 41 and FIG. 42 are executed.

FIG. 41 is a specific example of step S602 (left eye processing) shown in FIG. 40, for example, and specifically, is a flowchart showing a procedure of left eye processing when the display mode is 3D.

Steps S701 to S707 in FIG. 41 are for left eye processing.

Firstly, the composition unit 16 acquires background data written in the left-view background plane 11 (the area to which "L" is given in FIG. 4) for the left view. The left-view background plane stores the background data that has been written through the still image decoder 27*b* according to the rendering instruction by the BD-J application.

Next, after the video decoder 5*a* decodes the left-view video stream with use of the video decoder 5*a*, and writes the decoded left-view video stream in the video plane 6 (to which (L) is given in FIG. 4), the composition unit 16 acquires the left-view video data written in the video plane 6 (Step S702).

Then, the composition unit 16 in step S703 checks whether the stereo mode in the image plane settings in the display mode storage unit 29 is ON or OFF (hereinafter, checking whether the stereo mode is ON or OFF is called checking the stereo mode flag). If the stereo mode is OFF, the composition unit 16 uses the image decoder 7*a* to decode the left-view image, and writes the decoded left-view image in the image plane 8 (area to which (L) is given in FIG. 4), then the plane shift engine 20 performs the shift processing for the left view (Step S704*a*).

When the stereo mode is ON, the composition unit 16 uses the image decoder 7*a* to decode the left-view image, and writes the decoded left-view image in the image plane 8 (area to which the code (L) is given in FIG. 4). When the stereo mode is ON, the plane shift engine 20 does not perform the shift processing for the left view on the decoded left-view image in the image plane 8 (area to which the code (L) is given in FIG. 4). This is because, when the stereo mode is ON, the composition unit 16 writes, in the image plane (area to which an (R) is given in FIG. 4) via the image decoder 7*b*, the right-view image which is seen from the different angle from the left-view image (Step S704*b*).

The image plane 8 to which the code (L) is given in Step S704*a* or in Step S704*b* holds therein the image data which is stored in the image memory 7, and is decoded by the image decoder 7*a*.

Next, the composition unit 16 checks a flag of the stereo mode in the interactive graphics plane 10 setting in the mode storage unit 29 in Step S705. When the stereo mode is OFF, the BD-J application writes the left-view interactive graphics 10 in the left-eye plane (to which the code (L) is given in the interactive graphics plane 10 in FIG. 4) with use of the rendering engine 22*a*, and acquires the left-view interactive graphics from the left-eye plane (to which the code (L) is given in the interactive graphics plane 10 in FIG. 4). The plane shift engine 20 performs shift processing for the left-eye on the acquired left-view interactive graphics (Step S706*a*).

When the stereo mode is ON, the BD-J application writes the left-view interactive graphics in the left-eye plane (to which the code (L) is given in the interactive graphics plane 10 in FIG. 4) with use of the rendering engine 22*a*. After that, although the BD-J application acquires left-view interactive graphics from the left-eye plane (to which the code (L) is given in the interactive graphics plane 10 in FIG. 4) for display, the plane shift engine 20 does not perform the shift processing for the left eye on the left-view interactive graphics (Step S706*b*).

The left-view interactive graphics plane from which the left-view interactive graphics is acquired in Step S706*a* and Step S706*b* stores therein the data that has been written through the rendering engine 22*a* according to the rendering instruction by the BD-J application in the BD-J mode.

Also, in HDMV mode, the left-view interactive graphics plane stores therein the decoding result of the graphics data extracted from a graphics stream instead of graphics data drawn by the BD-J application.

In Step S707, the composition unit 16 composites: the background data written in the background plane 11 to which the code (L) is given in Step S701; video data written in the video plane 6 to which the code (L) is given in Step S702; the subtitle data written in the image plane 8 to which the code (L) is given in Step S704; and the GUI data written in the interactive graphics plane 10 to which the code (L) is given in Step S706 in order. Then, the resultant composited data is outputted to the display as left-view data.

If the stereo mode is judged to be OFF in Step S703 and Step S705, data obtained as a result of the shift processing performed in the corresponding planes are used for composition. As the final process of Step S707, the flag in the left-right processing storage unit is changed when the data is outputted to the display. Note that each process in Step S701 to 707 is processed as process for the left eye. Which eye to process is determined by referring to the left-right processing storage unit 17.

Next, the processing for the right eye is performed after the processing for the left eye in Step S701 to S707 is completed.

FIG. 42 is a specific example of the processing of step S603 (right eye processing) shown in, for example, FIG. 40. Specifically, FIG. 42 is a flowchart showing an example of processing procedures for right eye processing when the display mode is 3D. Steps S801 to S809 in FIG. 42 are right eye processing. In step S801, the composition unit 16 checks the flag of the stereo mode in the background plane 11 setting in the display mode storage unit 29 in Step S801. When the stereo mode is OFF, the composition unit 16 writes the left-view background data held in the background plane 11 to which the code (R) is given, and acquires the background data from the background plane 11 to which the code (R) is given (Step S802*a*). When the stereo mode is ON, the composition unit writes the right-view background data held in the background plane 11 to which the code (R) is given, and acquires the right-view background data held in the background plane 11 to which the code (R) is given (Step S802*b*).

Next, the composition unit 16 checks the flag of the stereo mode in the video plane 6 setting in the display mode storage unit 29 in Step S803. When the stereo mode is OFF, the composition unit 16 uses the video decoder 5*a* to decode the left-view video stream, writes the decoded image in the video plane 6 (to which the code (R) is given in FIG. 4), and acquires the left-view video data from the video plane 6 (to which the code (R) is given in FIG. 4) (Step S804*a*). When the stereo mode is ON, the composition unit 16 uses the video decoder 5*b* to decode the right-view video stream, writes the decoded right-view video stream in the video plane 6 (to which the code (R) is given in FIG. 4), and acquires the right-view video data from the video plane 6 the video plane 6 (to which the code (R) is given in FIG. 4) (Step S804*b*).

Then, the composition unit checks the flag of the stereo mode in the image plane 8 setting in the display mode storage unit 29 in Step S805. When the stereo mode is OFF, the composition unit 16 writes the left-view image decoded by the image decoder 7*a* in the image plane 8 (area to which the code (R) is given). After that, the plane shift engine 20 performs processing for the right eye on the left-view image written in the image plane 8 (to which the code (R) is given) (Step S806*a*). When the stereo mode is ON, the composition unit 16 writes, in the image plane 8 (to which the code (R) is given), the right-view image decoded by the image decoder 7*a*. However, when the stereo mode is ON, the plane shift engine 20 does not perform the shift processing. This is because when the stereo mode is ON, a right view image that is different in viewed angle from the left view image is written via the image decoder 7*b* in the image plane 8 (area to which (R) is given in FIG. 4) (Step S806*b*).

The image plane 8 from which the images are acquired in Step S806*a* and Step S806*b* stores therein the subtitle data that has been stored in the image memory 7, and decoded by the image decoder 7 (image decoders 7a or 7b in FIG. 4).

Next, the composition unit 16 checks the flag of the stereo mode in the interactive graphics plane 10 setting in the display mode storage unit 29 in Step S807. When the stereo mode is OFF, the right-eye plane (area to which the code (R) is given in the interactive graphics plane 10 in FIG. 4) contains left-view interactive graphics written by the BD-J application using the rendering engine 22a. Then the plane shift engine 20 performs the shift processing for the right eye on the left-view interactive graphics written in the right-eye plane (area to which the code (R) is given in the interactive graphics plane 10 in FIG. 4) (Step S808a).

When the stereo mode is ON, the BD-J application uses the rendering engine 22a to write the right-view interactive graphics in the right-eye plane (area to which the code (R) is given in the interactive graphics plane 10 in FIG. 4). However, the plane shift engine 20 does not perform the shift processing on the right-view interactive graphics written in the right-eye plane (area to which the code (R) is given in the interactive graphics plane 10 in FIG. 4) (Step S808b).

In Step S809, the composition unit 16 composites: the background data written in the background plane 11 (to which the code (R) is given) in Step S802; the video data written in the video plane 6 (to which the code (R) is given) in Step S804; the image data written in the image plane 8 (to which the code (R) is given) in Step S806; and the GUI data written in the interactive graphics plane 10 in Step S808 in order.

In case the stereo mode is OFF in Step S805 and Step S807, data obtained as a result of the shift processing performed in the corresponding plane are targeted for the composition. The resultant composited data is outputted to the display as the right-view data in step S806b and step S808b. When lastly in step S809 the composited data is outputted to the display, the flag in the left-right processing storage unit 17 is changed. Note that Step S801 to Step S809 is processed for the right eye. Whether or not the current process is for the right eye is judged by referring to the left-right processing storage unit 19.

As long as frames are continuously inputted, the processing of steps S602, S603, S604, and S605 (if YES in S604) in FIG. 40 is repeated (Step S606).

This concludes the description of stream processing when the display mode is 3D.

Note that when the method for acquiring the plane offset D from the header area of the AV stream is adopted in the playback apparatus, and the update of each frame is implemented, it is necessary to update an offset value in the plane shift engine 20 to a value corresponding to the next frame by the offset setting unit 21 during Step S810.

Figure 43A:
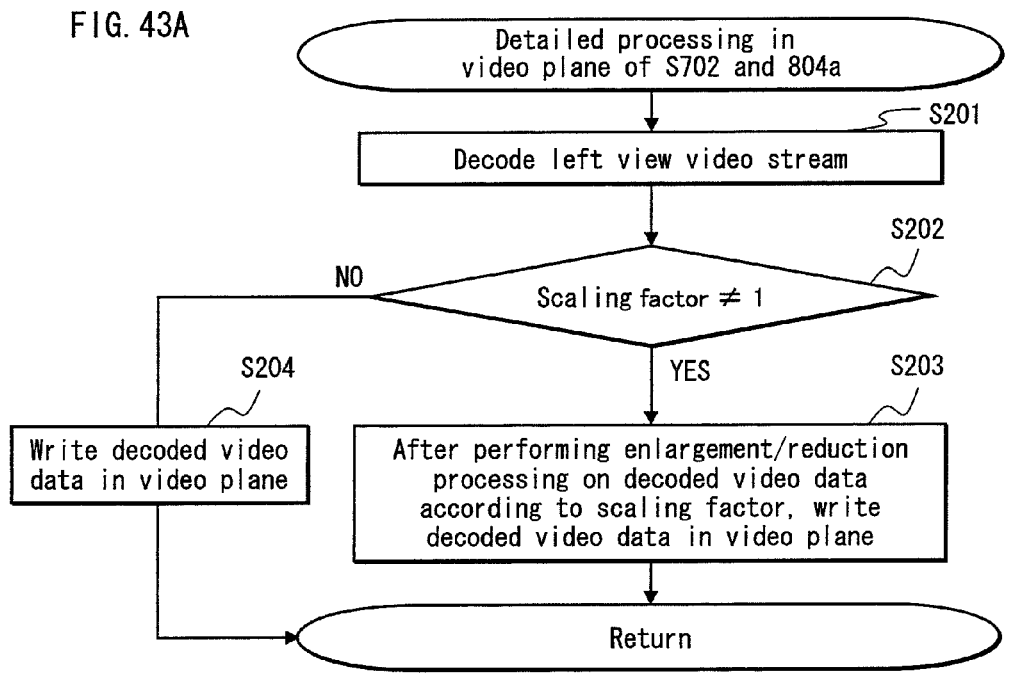
FIG. 43A and FIG. 43B are flowcharts showing detailed procedures for decoding image data, writing image data to the image plane, decoding video data, and writing video data to the video plane 6.

FIG. 43A is a flowchart for illustrating a specific example of step S702 in FIG. 41 and step S804a shown in FIG. 42.

First, the left view video stream is decoded with use of the video decoder 5a, and output as video data (step S201).

Next, a judgment is made as to whether the scaling factor is "1" (step S202).

For example a scaling factor specified by the BD-J platform 22 is referenced, and the judgment is realized based on the referenced value.

In the present embodiment, the scaling factor value stored in the scaling factor storage unit 42 in the plane shift engine 20 may be referenced. However, the present invention is not limited to this. The scaling engine 15 may include a scaling factor storage unit (not depicted in the drawings) that stores a scaling factor specified by the BD-J platform 22. Also, the scaling factor storage unit 42 in the plane shift engine 20 may be provided in the playback apparatus but outside the scaling engine 15. The scaling engine 15 and the plane shift engine 20 may be provided in the playback apparatus, and may reference the scaling factor stored in the scaling factor storage unit 42 that is provided externally to the plane shift engine 20.

Next, in step S202, when a judgment is made that the scaling factor is not "1" (when "Yes" is judged in step S202), the number of horizontal pixels in the decoded video data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the video data is written, according to the converted number of horizontal pixels and converted number of vertical pixels, in the video plane 6 so that the video data is displayed in a predetermined position on the display screen (step S203).

Here, as specific processing of step S702, in step S203, in contrast to writing the data in the area given the code (L) in the video plane 6 in step S203, in the specific processing of step S804, in step S203, the data is written in the area given the code (R) in the video plane 6.

For example, this means that when the scaling factor is 1/2, the data is written in the video plane so that the video data is displayed in the top left portion of the display screen as shown in FIG. 22, and when the scaling factor is 1/4, the data is written in the video plane so that the video data is displayed in the top left of the display screen as shown in FIG. 22. Also, although in the above description, the data is written in the video plane so that the video data is displayed in a predetermined position on the display screen according to the converted horizontal and vertical pixels, the apparatus may also be configured to determine the display position according to a specification from the BD-J application.

Known technology for enlargement/reduction processing may be applied to the above processing.

In step S202, when the scaling factor has been judged to be "1", (when "No" is judged in step S202), the video data of the decoded left view video stream is written in the video plane 6 with use of the video decoder 5a (step S204).

Here, in the specific processing of step S702, in contrast to step S204 in which the data is written in the area given the code (L) in the video plane 6, in the specific processing of step S804a, in step S204, the data is written in the area given the code (R) in the video plane 6.

Step S204 means that, for example if the scaling factor is 1/1, writing is performed in the video plane so that the video data is displayed in full screen, as shown in FIG. 22.

Figure 43B:
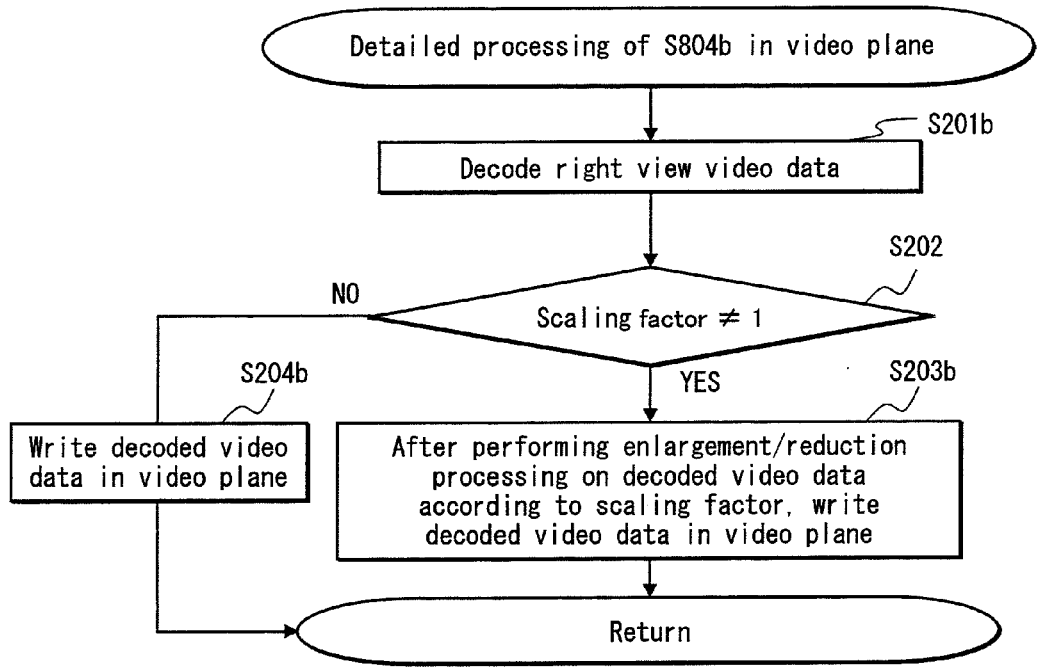

FIG. 43B is a flowchart showing a specific example of step S804 in FIG. 42.

First, with use of the video decoder 5b, the right view video stream is decoded and the video stream is output (step S201b).

Next, a judgment is made that the scaling factor is not "1" (step S202).

In step S202, when a judgment is made that the scaling factor is not "1" (when "Yes" is judged in step S202), the video decoder that decoded the data performs a conversion from the horizontal pixel number (the number of pixel lengths in the horizontal direction of the display screen) and the number of vertical pixels (the number of pixel lengths in the vertical direction of the display screen) to a number of horizontal pixels and a number of vertical pixels corresponding to the scaling factor (that is, performs enlargement/reduction processing), and writes the video data for which the number of horizontal pixels and the number of vertical pixels have been converted in the video plane 8 (area given the code (R)) so that the video data is displayed in a predetermined position of the display screen (step S203b).

In step S202, when a judgment is made that the scaling factor is "1" (when "No" is judged in step S202), with use of the video decoder 5b, the video data of the decoded right view video stream is written in the video plane 6 (area given the code (R)) (S204b).

Figure 16A:
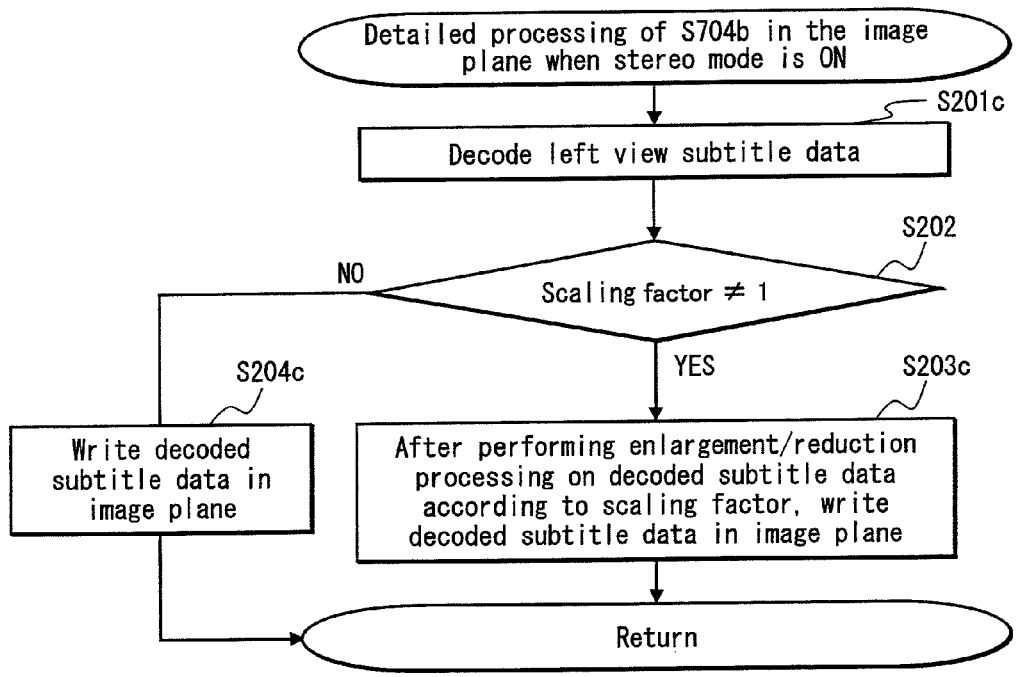
FIG. 16A illustrates a specific processing example in step S704*b*.

FIG. 16A is a flowchart illustrating a specific processing example in step S704b in FIG. 41. In FIG. 16A, first, with use of the image decoder 7A, the left view subtitle stream is decoded (step S201c).

Next, a judgment is made as to whether the scaling factor is not "1" (step S202).

In the next step S202, when a judgment is made that the scaling factor is not "1" (when "Yes" is judged in step S202), the video decoder 5a or 5b that decoded the data performs a conversion from the horizontal pixel number (the number of pixel lengths in the horizontal direction of the display screen) and the number of vertical pixels (the number of pixel lengths in the vertical direction of the display screen) to a number of horizontal pixels and a number of vertical pixels corresponding to the scaling factor (that is, performs enlargement/reduction processing), and writes the video data for which the number of horizontal pixels and the number of vertical pixels have been converted in the video plane 8 (area given (L) in FIG. 4) so that the video data is displayed in a predetermined position of the display screen (step S203c).

For example when the scaling factor is 1/2, as shown on the left side of FIG. 22B, the video data is brought to the left top of the display screen, and the subtitle data is written in the image plane so as to be displayed at the size corresponding to the subtitle. When the scaling factor is 1/4, as shown on the left side of FIG. 22A, the video data is brought to the left top of the display screen, and the subtitle data is written in the image plane so as to be displayed at the size corresponding to the subtitle. Also, although in the above description, conversion to the number of vertical pixels is performed, and the video data is displayed in a predetermined position on the display screen according to the converted number of horizontal pixels and converted number of vertical pixels, the display position of the subtitle data may instead be determined according to a specification from the BD-J application.

Known technology for enlargement/reduction processing may be applied to the above processing.

In step S202, when a judgment is made that the scaling factor is "1" (when "No" is judged in step S202), with use of the image decoder 7a, the video data of the decoded left view video stream is written in the image plane 8 (area given (L) in FIG. 4) (S204c).

For example the scaling factor is 1/1, and as shown on the left side of FIG. 22C, the subtitle data is written in the image plane 8 so as to be displayed in a corresponding size when the video data is displayed in full screen.

Figure 23A:
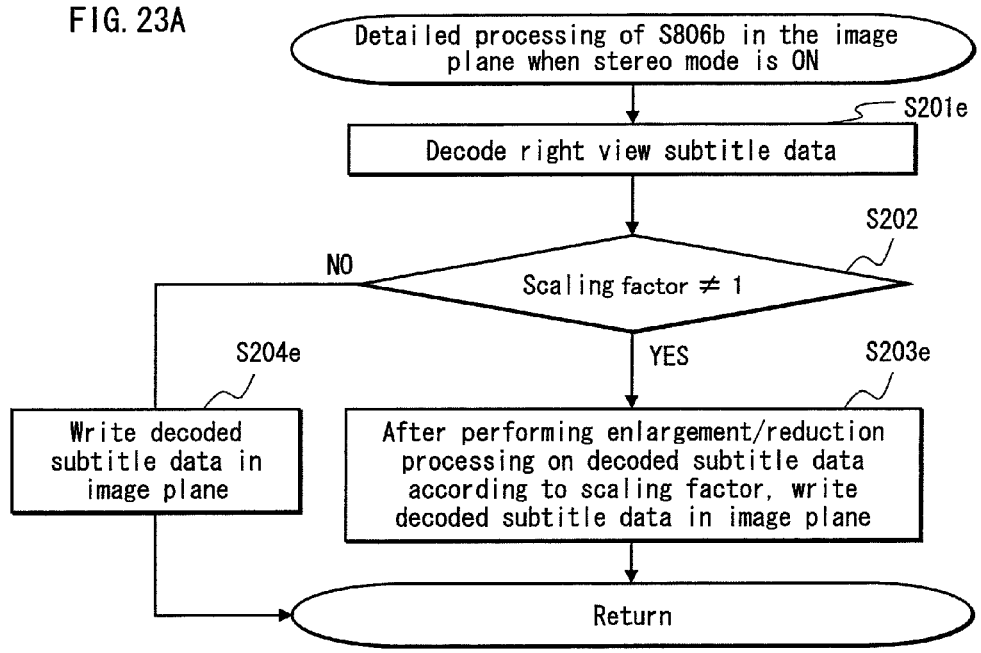
FIG. 23A and FIG. 23B show how offsets are calculated when the scaling factors are set as 1/1, 1/2, and 1/4.

FIG. 23A is a flowchart illustrating a specific example of step S806 shown in FIG. 42. In FIG. 23A, first, with use of the image decoder 7b, the right view subtitle stream is decoded (step S201e).

Next, a judgment is made as to whether the scaling factor is not "1" (step S202).

In step S202, when a judgment is made that the scaling factor is not "1" (when "Yes" is judged in step S202), the number of horizontal pixels in the decoded video data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the converted number of horizontal pixels and converted number of vertical pixels are written in the image plane 8 (area given (R) in FIG. 4) so that the video data is displayed in a predetermined position on the display screen (step S203e).

For example when the scaling factor is 1/2, the subtitle data is written in the image plane to be displayed in the size corresponding to the subtitle when the video data is brought to the left top of the display screen as shown on the right side of FIG. 22B. When the scaling factor is 1/4, the subtitle data is written in the image plane to be displayed in the size corresponding to the subtitle when the video data is brought to the left top of the display screen as shown on the right side of FIG. 22A.

Also, although in the above description, conversion to the number of vertical pixels is performed, and the video data is displayed in a predetermined position on the display screen according to the converted number of horizontal pixels and converted number of vertical pixels, the display position of the subtitle data may instead be determined according to a specification from the BD-J application.

Known technology for enlargement/reduction processing may be applied to the above processing.

In step S202, when a judgment is made that the scaling factor is "1" (when "No" is judged in step S202), with use of the image decoder 7b, the subtitle data of the decoded right view subtitle stream is written in the image plane 8 (area given the code (R)) (S204e).

This means that for example, if the scaling factor is 1/1, the subtitle data is written in the image plane 8 at a corresponding size when the video data is displayed in full screen as shown on the right side of FIG. 22C.

Figure 16B:
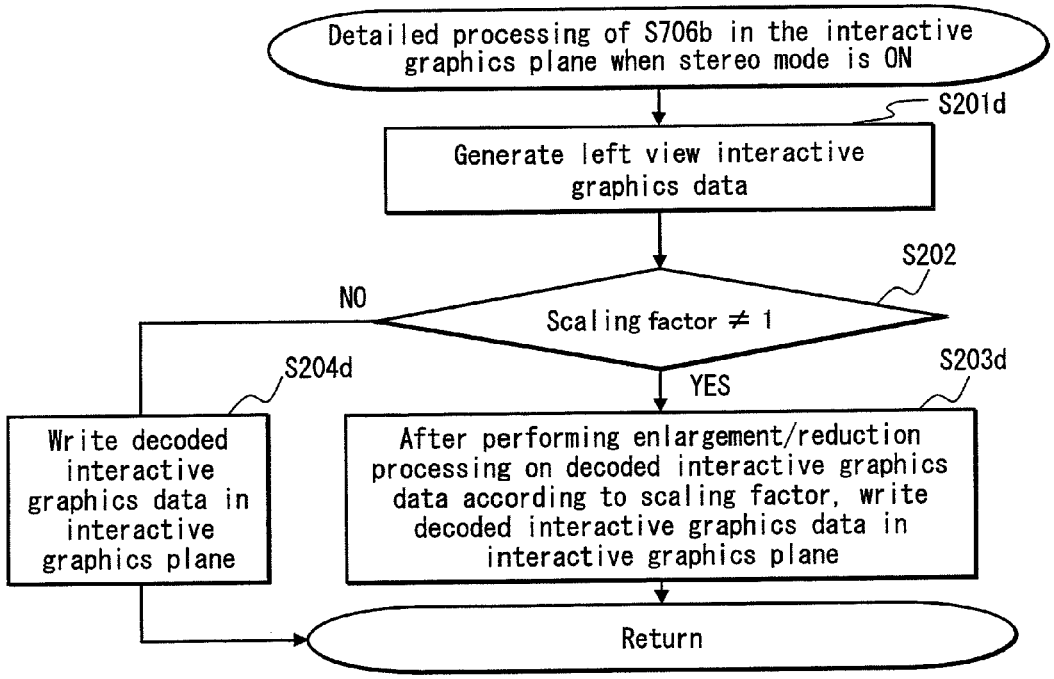
FIG. 16B illustrates a specific processing example in step S706*b*.

FIG. 16B is a flowchart illustrating a specific example of step S704b shown in FIG. 41. In FIG. 16, first, left view interactive graphics data is generated (step S201d).

The left view interactive graphics data may be generated, for example, according to a drawing program included in the BD-J application. More specifically, the pixel values may be calculated according to program code, or the apparatus may be configured to record, in advance, corresponding left view JPEG graphics image data on a virtual BD-ROM (the BD-ROM 100 or the local storage 1b) that can be read via the virtual file system 3, and the apparatus may be configured so that the BD-J application reads the left view JPEG graphics image data. At this time, when the JPEG graphics image data is encoded and recorded, the JPEG graphics may be decoded by a decoder not depicted in the drawings or the image decoder 7a, then read.

Next, a judgment is made as to whether the scaling factor of the interactive graphics plane is not "1" (step S202).

Next in step S202, when a judgment is made that the scaling factor is not "1" (when "Yes" is judged in step S202), the number of horizontal pixels in the generated interactive graphics data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the converted number of horizontal pixels and converted number of vertical pixels are written in the interactive graphics plane 10 (area given (L) in FIG. 4) so that the interactive graphics data is displayed in a predetermined position on the display screen (step S203d).

For example when the scaling factor is 1/2, the graphics data corresponding to the GUI parts is written in the interactive graphics plane to be displayed in a size that has been reduced by 1/2. When the scaling factor is 1/4, the graphics data corresponding to the GUI parts is written in the interactive graphics plane to be displayed in a size that has been reduced by 1/4.

Also, although in the above description, conversion to the number of vertical pixels is performed, and the interactive graphics data is displayed in a predetermined position on the display screen according to the converted number of horizontal pixels and converted number of vertical pixels, the display position of the interactive graphics data may instead be determined according to a specification from the BD-J application.

Known technology for enlargement/reduction processing may be applied to the above processing.

Also, in step S202, when a judgment is made that the scaling factor is "1" (when "No" is judged in step S202), the generated left view interactive graphics data is written in the interactive graphics plane 10 (area given the code (L)) (S204d).

For example, when the scaling factor is 1/1, this corresponds to the case of displaying the interactive graphics data in full screen.

When the scaling factor of the interactive graphics plane is not given consideration (that is, when the scaling factor of the interactive graphics plane is always set as "1"), step S204d is to be performed after step S201d, and steps S202 and S203d may be deleted.

For example, when the interactive graphics images are graphics images corresponding to the GUI parts, in the processing of step S203d, the interactive graphics images can be written in the interactive graphics plane 10 (area given the code (L)) so that the interactive graphics images corresponding to the GUI parts are displayed in the portion of the display screen other than the portion where the composite image of the reduced video/subtitles when full screen display is performed.

Figures 24A, 24B:
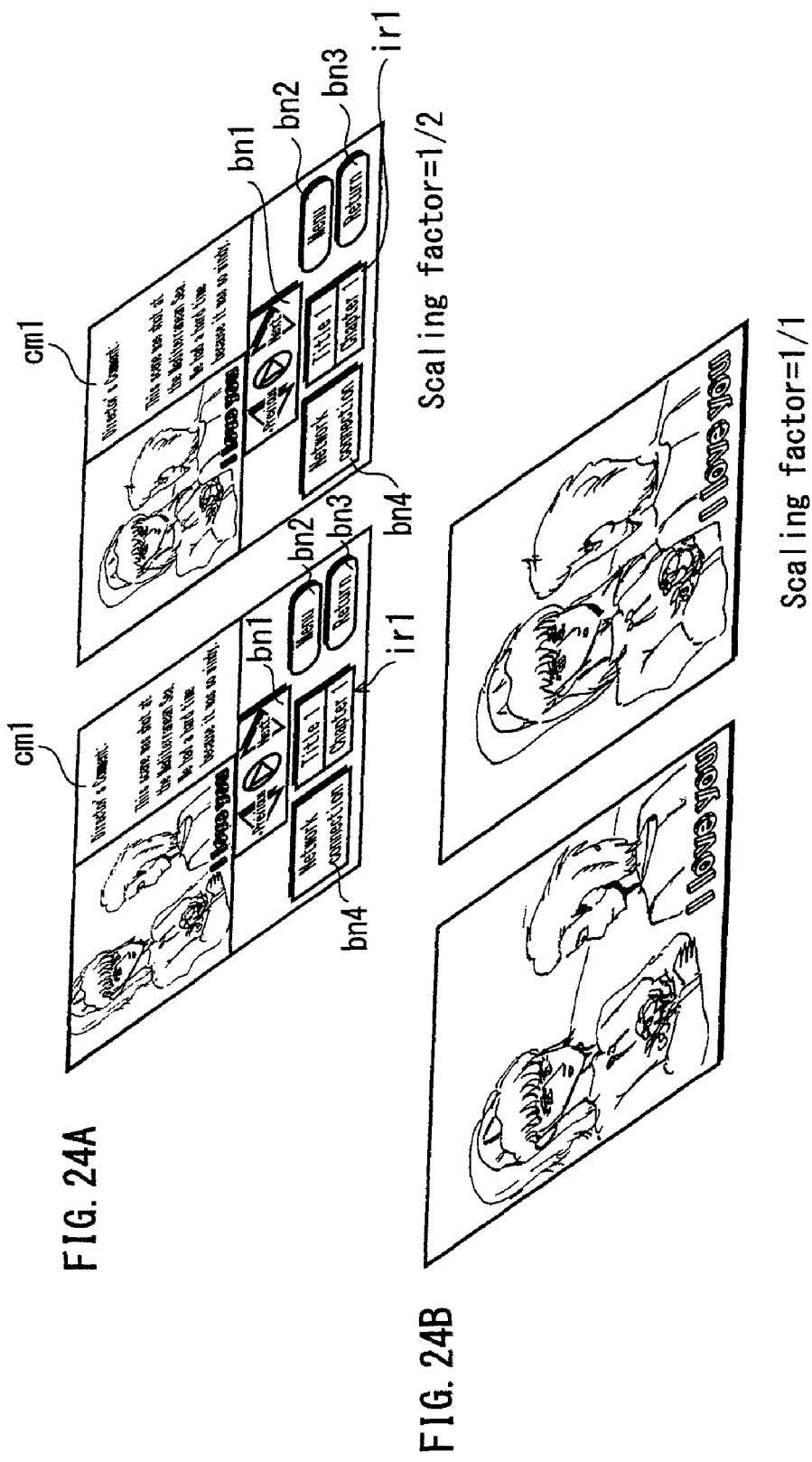
FIG. 24A and FIG. 24B show three scaling factors of 1/1, 1/2, 1/4, and composite images of subtitle graphics in cases when the scaling factors are applied.

Specifically, in FIG. 24B, in a state of the scaling factor being 1/1 and the subtitle and video composite image being displayed as an image seen from the left eye (the left side of FIG. 24B), for example when an input is received for switching to a menu screen, as shown in FIG. 24B, the scaling factor of the video and subtitle composite image becomes 1/2, the composite image is displayed in the top left of the display screen, the GUI image corresponding with the graphics image and the director's comment are written in the interactive graphics plane (area given the code (L)), and the images written to this interactive graphics plane (area given the code (L)) is further composited, and becomes the composite image for the left eye (see the left side of FIG. 24A).

Figure 23B:
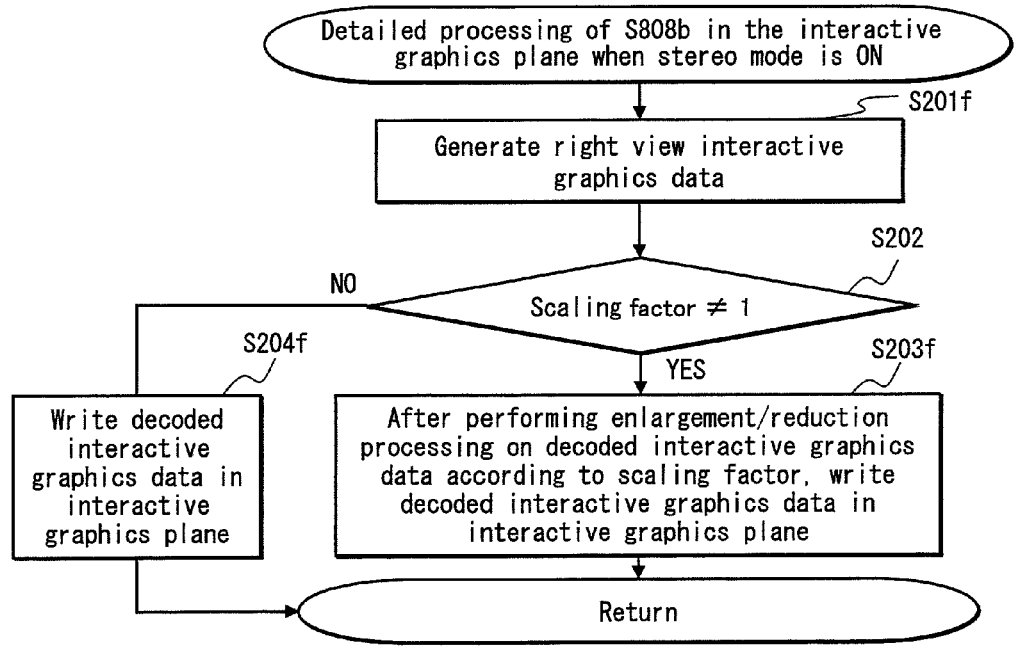

FIG. 23B is a flowchart illustrating a specific example of step S808b shown in FIG. 42. In FIG. 23B, first, the right view interactive graphics data is generated (step S201f).

The right view interactive graphics data may be generated, for example, according to a drawing program included in the BD-J application. More specifically, the pixel values may be calculated according to program code, or the apparatus may be configured to record, in advance, corresponding right view JPEG graphics image data on a virtual BD-ROM (the BD-ROM 100 or the local storage 1b) that can be read via the virtual file system 3, and the apparatus may be configured so that the BD-J application reads the right view JPEG graphics image data. At this time, when the JPEG graphics image data is encoded and recorded, the JPEG graphics may be decoded by a decoder not depicted in the drawings or the image decoder 7b, then read.

Next, a judgment is made as to whether the scaling factor is not "1" (step S202). In step S202, when a judgment is made that the scaling factor is not "1" (when "Yes" is judged in step S202), the number of horizontal pixels in the generated interactive graphics data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the interactive graphics data is written in the interactive graphics plane 10 (area given the code (R) in FIG. 4) so as to be displayed in a predetermined position on the display screen (step S203f).

For example, when the scaling factor is 1/2, the graphics data corresponding to the GUI parts is written in the interactive graphics plane to be displayed in a size that has been reduced by 1/2. When the scaling factor is 1/4, the graphics data corresponding to the GUI parts is written in the interactive graphics plane to be displayed in a size that has been reduced by 1/4.

Also, although in the above description, conversion to the number of vertical pixels is performed, and the interactive graphics data is displayed in a predetermined position on the display screen according to the converted number of horizontal pixels and converted number of vertical pixels, the display position of the interactive graphics data may instead be determined according to a specification from the BD-J application, or according to a predetermined reduction ratio.

Known technology for enlargement/reduction processing may be applied to the above processing.

Next in step S202, when a judgment is made that the scaling factor is "1" (when "No" is judged in step S202), the generated right view interactive graphics data is written in the interactive graphics plane 10 (area given the code (R) in FIG. 4) (S204f).

For example, when the scaling factor is 1/1, this corresponds to the case of displaying the interactive graphics data in full screen.

When the scaling factor of the interactive graphics plane is not given consideration (that is, when the scaling factor of the interactive graphics plane is always set as "1"), step S204f is to be performed after step S201f, and steps S202 and S203f may be deleted.

For example, when the interactive graphics images are graphics images corresponding to the GUI parts, in the processing of step S203f, the interactive graphics images can be written in the interactive graphics plane 10 (area given the code (R)) so that the interactive graphics images corresponding to the GUI parts are displayed in the portion of the display screen other than the portion where the composite image of the reduced video/subtitles when full screen display is performed.

Specifically, in FIG. 24B, in a state of the scaling factor being 1/1 and the subtitle and video composite image being displayed as an image seen from the right eye (the right side of FIG. 24B), for example when an input is received for switching to a menu screen, as shown in FIG. 24B, the scaling factor of the video and subtitle composite image becomes 1/2, the composite image is displayed in the top left of the display screen, the GUI image corresponding with the graphics image and the director's comment are written in the interactive graphics plane (area given the code (R)), and the images written to this interactive graphics plane (area given the code (R)) is further composited, and becomes the composite image for the right eye (see the right side of FIG. 24A).

Figure 44A:
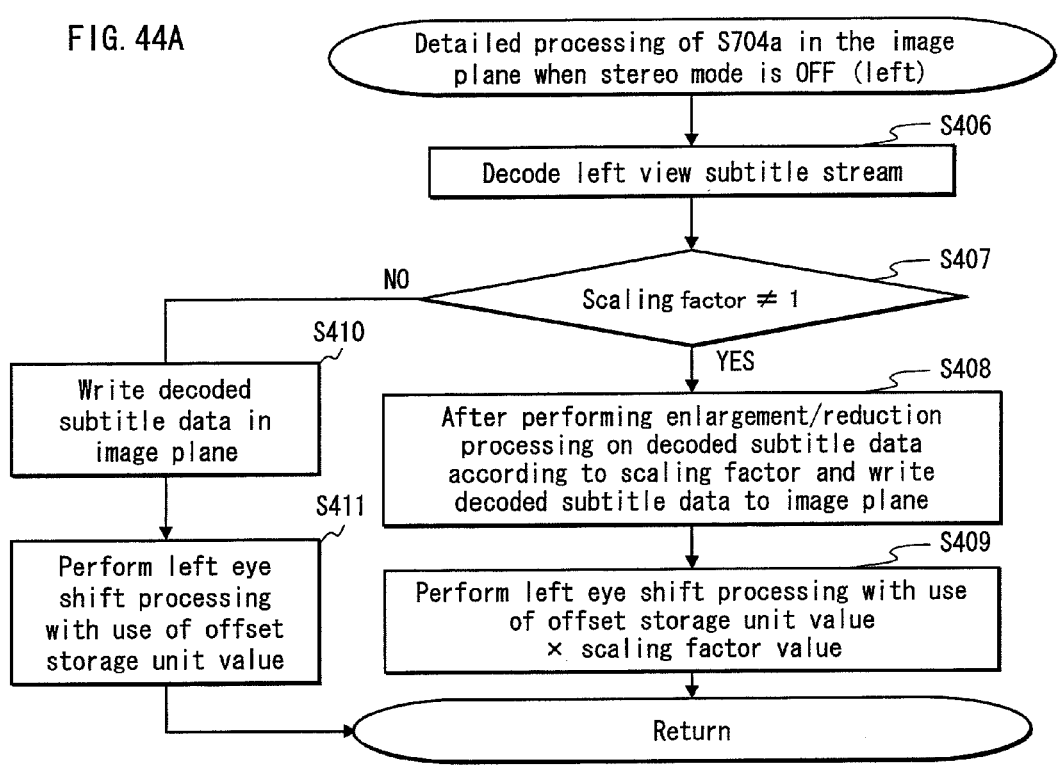
FIG. 44A and FIG. 44B are flowcharts showing a state of display, and processing procedures for a plane shift in an image plane in a case of re-calculating a plane offset, and a plane shift of interactive graphics plane.

FIG. 44A is a flowchart illustrating a specific example of step S704a shown in FIG. 41.

First, with use of the image decoder 7a, the left view subtitle stream is decoded, and the decoded subtitle data is output (step S406).

Although in step S406, a structure is described of decoding the left view subtitle stream, alternatively, when the apparatus is configured so that the same subtitle stream is shared between right and left display, the shared left and right display subtitle stream may be read.

A judgment is made as to whether the scaling factor is not "1" (step S407). This judgment is performed, for example, by referencing a scaling factor specified by the BD-J platform 22, and judging according to this referenced value.

In the present embodiment, the scaling factor value stored in the scaling factor storage unit 42 in the plane shift engine 20 may be referenced. However, the present invention is not limited to this. The scaling engine 15 may include a scaling factor storage unit (not depicted in the drawings) that stores a scaling factor specified by the BD-J platform 22. Also, the scaling factor storage unit 42 in the plane shift engine 20 may be provided in the playback apparatus but outside the scaling engine 15. The scaling engine 15 and the plane shift engine 20 may be provided in the playback apparatus, and may reference the scaling factor stored in the scaling factor storage unit 42 that is provided externally to the plane shift engine 20.

In step S407, when a judgment is made that the scaling factor is not "1" (when "Yes" is judged in step S407), the number of horizontal pixels in the decoded subtitle data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the image data is written, according to the converted number of horizontal pixels and converted number of vertical pixels, in the image plane 8 (area given the code (L) in FIG. 4) so that the image data is displayed in a predetermined position on the display screen (step S408).

For example, this means that when the scaling factor is 1/2, the subtitle data is written in the image plane so as to be displayed at a size corresponding to the subtitle when the video data is brought up to the left top of the display screen as shown on the left side of FIG. 22B, and when the scaling factor is 1/4, the subtitle data is written in the image plane so as to be displayed at a size corresponding to the subtitle when the video data is brought up to the left top of the display screen as shown on the left side of FIG. 22A. Also, although in the above description, the data is written in the video plane so that the video data is displayed in a predetermined position on the display screen according to the converted horizontal and vertical pixels, the apparatus may also be configured to determine the display position according to a specification from the BD-J application.

Known technology for enlargement/reduction processing may be applied to the above processing.

Next, the offset value stored in the offset value storage unit 41 of the plane shift engine 20 and the scaling factor referenced in step S408 are referenced, and left eye shift processing is performed on the subtitle data stored in the image plane 8 (specifically, the area given (L) in FIG. 4). This corresponds to performing shift processing with use of an offset value corresponding to the result of performing the calculation "value in offset storage unit (offset value)×scaling factor" (cutting off the numbers after the decimal point) (step S409).

Next, in step S407, when a judgment is made that the scaling factor is "1" (when "No" is judged in step S407), with use of the image decoder 7a, the subtitle data of the decoded left view subtitle stream is written in the image plane 8 (area given the code (L) in FIG. 4) (step S410).

For example when the scaling factor is 1/1, and the video data is displayed in full screen on the display screen as shown on the left side of FIG. 22C, the subtitle data is written in the image plane 8 (area given (L) in FIG. 4) in a corresponding size.

Next, left eye shift processing is performed on the subtitle data stored in the image plane 8 (specifically the area to which (L) is given in FIG. 4), with reference to the offset value stored in the offset value storage unit 41 of the plane shift engine 20. Since the scaling factor is 1, this means performing the calculation in step S409, "value in offset storage unit (offset value)×scaling factor", with "1" as the scaling factor value, that is, shifting an amount corresponding to the offset value (step S411).

Figure 44B:
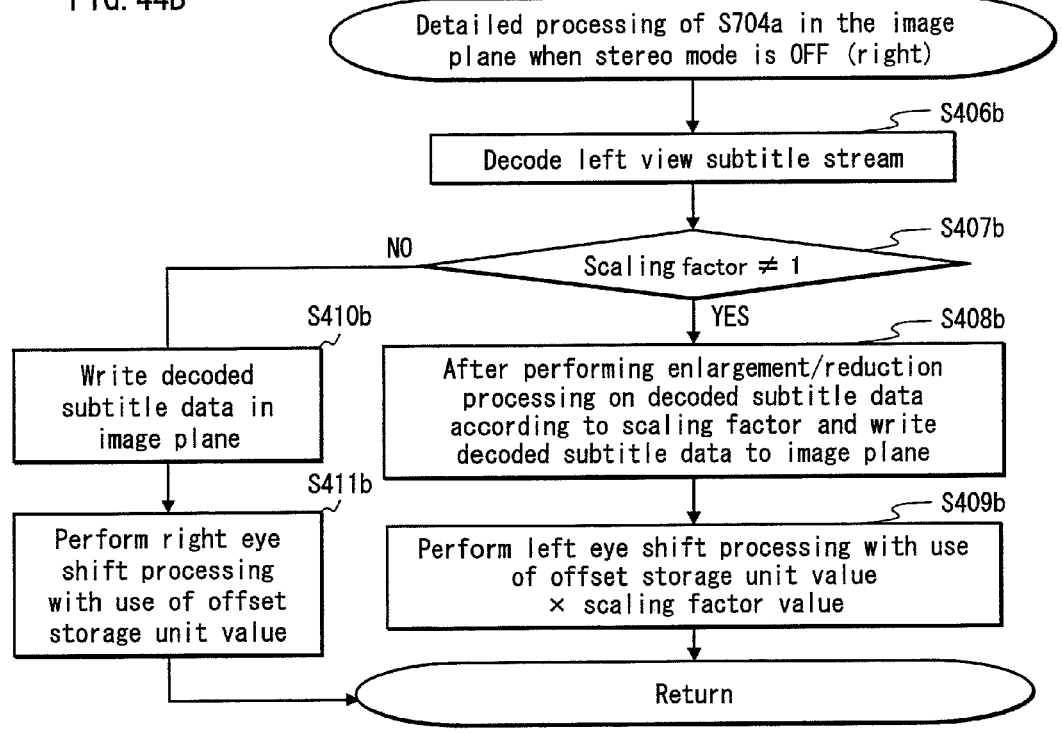

FIG. 44B is a flowchart illustrating a specific example of step S806A shown in FIG. 42.

First, with use of the image decoder 7a, the left view subtitle stream is decoded and the decoded subtitle data is output (step S406).

Next, a judgment is made as to whether the scaling factor is "1" (step S407B).

This judgment is made by referencing a scaling factor specified by, for example, the BD-J platform 22, and judging according to the referenced value.

In the present embodiment, the scaling factor value stored in the scaling factor storage unit 42 in the plane shift engine 20 may be referenced. However, the present invention is not limited to this. The scaling engine 15 may include a scaling factor storage unit (not depicted in the drawings) that stores a scaling factor specified by the BD-J platform 22. Also, the scaling factor storage unit 42 in the plane shift engine 20 may be provided in the playback apparatus but outside the scaling engine 15. The scaling engine 15 and the plane shift engine 20 may be provided in the playback apparatus, and may reference the scaling factor stored in the scaling factor storage unit 42 that is provided externally to the plane shift engine 20.

In step S407b, when a judgment is made that the scaling factor is not "1" (when "Yes" is judged in step S407b), the number of horizontal pixels in the decoded video data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the video data is written, according to the converted number of horizontal pixels and converted number of vertical pixels, in the image plane 8 (area given (R) in FIG. 4) so that the video data is displayed in a predetermined position on the display screen (step S408b).

For example, this means that when the scaling factor is 1/2, the subtitle data is written in the image plane so as to be displayed at a same size as the subtitle when the video data is brought up to the left top of the display screen as shown on the right side of FIG. 22B, and when the scaling factor is 1/4, the subtitle data is written in the image plane so as to be displayed at same size as the subtitle when the video data is brought up to the left top of the display screen as shown on the right side of FIG. 22A. Also, although in the above description, the data is written in the video plane so that the video data is displayed in a predetermined position on the display screen according to the converted horizontal and vertical pixels, the apparatus may also be configured to determine the display position according to a specification from the BD-J application.

Known technology for enlargement/reduction processing may be applied to the above processing.

Next, the offset value stored in the offset value storage unit 41 of the plane shift engine 20 and the scaling factor referenced in step S408b are referenced, and right eye shift processing is performed on the subtitle data stored in the image plane 8 (specifically, the area given (R) in FIG. 4). This corresponds to performing shift processing with use of an offset value corresponding to the result of performing the calculation "value in offset storage unit (offset value)×scaling factor) (step S409b).

Next, in step S407b, when a judgment is made that the scaling factor is "1" (when "No" is judged in step S407b), with use of the image decoder 7a, the subtitle data of the decoded left view subtitle stream is written in the image plane 8 (area given the code (R) in FIG. 4) (step S410).

For example when the scaling factor is 1/1, and the video data is displayed in full screen on the display screen as shown on the right side of FIG. 22C, the subtitle data is written in the image plane 8 in a corresponding size.

Next, shift processing is performed on the subtitle data stored in the image plane 8 (specifically the area to which (R) is given in FIG. 4), with reference to the offset value stored in the offset value storage unit 41 of the plane shift engine 20. Since the scaling factor is 1, this means performing the calculation in step S409, "value in offset storage unit (offset value)×scaling factor", with "1" as the scaling factor value (step S411b).

Figure 25A:
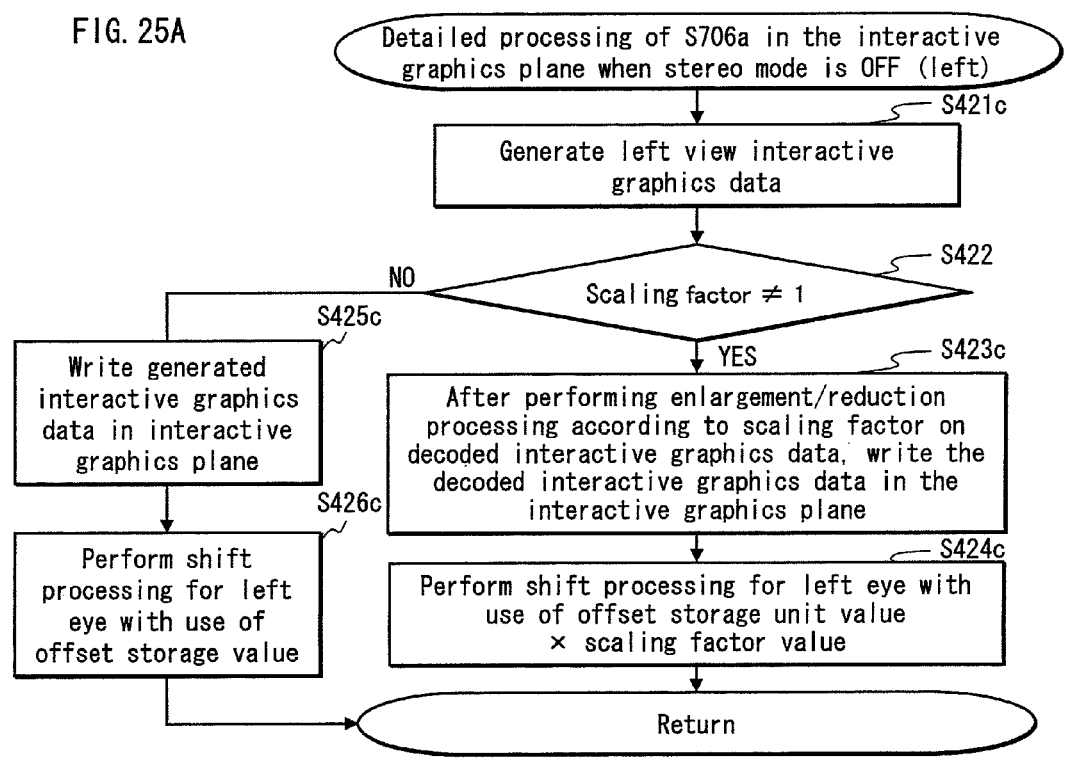
FIG. 25A and FIG. 25B show how offsets in an image plane are calculated when the scaling factors are set as 1/1, 1/2, and 1/4.

FIG. 25A is a flowchart illustrating a specific example of step S706A in FIG. 41. In FIG. 25A, first, the left view interactive graphics data is generated (step S421C). Since the generation of the left view interactive graphics data has already been described in the description pertaining to step S201d, detailed description thereof is omitted here.

Since the stereo mode is in the OFF state, other than left view JPEG graphics image data corresponding to the GUI parts, in a structure in which the same JPEG graphics image data corresponding to the GUI parts is shared as the left view/right view JPEG graphics image data, this shared JPEG graphics image data is read in step S421.

Next, a judgment is made as to whether the scaling factor is not "1" (step S422). Since a specific example of the judgment has already been described in the description of step S202, detailed description thereof is omitted here.

Next, in step S422, when a judgment is made that the scaling factor is not "1" (when "Yes" is judged in step S422), the number of horizontal pixels in the generated interactive video data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the interactive video data is written, according to the converted number of horizontal pixels and converted number of vertical pixels, in the image plane 10 (area given the code (L) in FIG. 4) so that the image data is displayed in a predetermined position on the display screen (step S423C).

Since a specific example has already been described in the description of step S203D, detailed description thereof is omitted here.

The offset value stored in the offset value storage unit 41 of the plane shift engine 20 and the scaling factor referenced in step S423C are referenced, and left eye shift processing is performed on the subtitle data stored in the interactive graphics plane 10 (specifically, the area given (L) in FIG. 4). This corresponds to performing shift processing with use of an offset value corresponding to the result of performing the calculation "value in offset storage unit (offset value)×scaling factor" (cutting off the numbers after the decimal point) (step S424C).

Next, in step S422, when a judgment is made that the scaling factor is "1" (when "No" is judged in step S422), the generated left view interactive graphics data is written in the interactive graphics plane 10 (area given the code (L) in FIG. 4) (step S425C).

Left eye shift processing is performed on the interactive graphics data stored in the interactive graphics plane 10 (specifically the area to which (L) is given in FIG. 4), with reference to the offset value stored in the offset value storage unit 41 of the plane shift engine 20. Since the scaling factor is 1, this means performing the calculation in step S424C, "value in offset storage unit (offset value)×scaling factor", with "1" as the scaling factor value, that is, shifting an amount corresponding to the offset value (step S426C).

When the scaling factor of the interactive graphics plane is not given consideration (that is, when the scaling factor of the interactive graphics plane is always set as "1"), step S425c is to be performed after step S421d, step S426c is to be performed after step S425c, and steps S422c, S423c, and S424c may be deleted.

For example, when the interactive graphics images are graphics images corresponding to the GUI parts, in the processing of step S203d, the interactive graphics images can be written in the interactive graphics plane 10 (area given the code (L)) so that the interactive graphics images corresponding to the GUI parts are displayed in the portion of the display screen other than the portion where the composite image of the reduced video/subtitles when full screen display is performed.

Specifically, in FIG. 24B, in a state of the scaling factor being 1/1 and the subtitle and video composite image being displayed as an image seen from the left eye (the left side of FIG. 24B), for example when an input is received for switching to a menu screen, as shown in FIG. 24B, the scaling factor of the video and subtitle composite image becomes 1/2, the composite image is displayed in the top left of the display screen, the GUI image corresponding with the graphics image and the director's comment are written in the interactive graphics plane (area given the code (L)), and the images written to this interactive graphics plane (area given the code (L)) is further composited, and becomes the composite image for the left eye (see the left side of FIG. 24A).

Figure 25B:
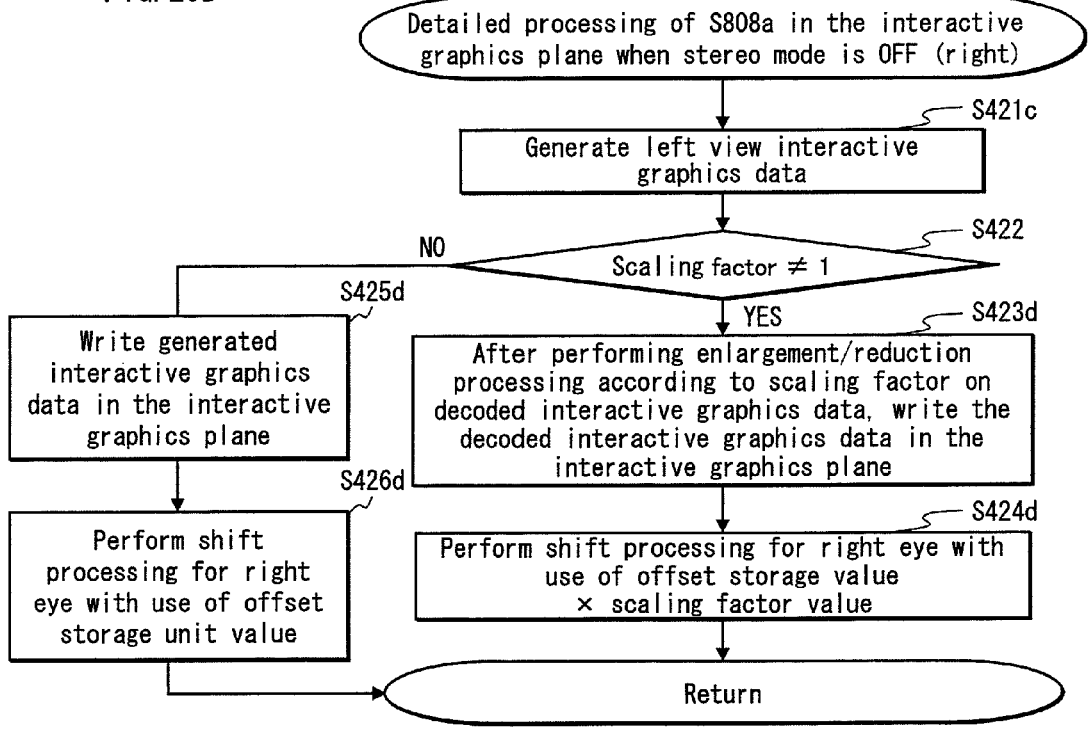

FIG. 25B is a flowchart illustrating a specific example of step S808a shown in FIG. 42. In FIG. 23B, since structural elements having the same reference symbols as the example of specific operations described in step S706A are identical or corresponding, detailed description thereof is omitted here. In other words, the descriptions of steps S421c and S422 are omitted here.

Next, in step S422, when a judgment is made that the scaling factor is not "1" (when "Yes" is judged in step S222), the number of horizontal pixels in the generated interactive graphics data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the interactive graphics data is written in the interactive graphics plane 10 (area given (R) in FIG. 4) according to the converted number of horizontal pixels and converted number of vertical pixels so that the interactive graphics data is displayed in a predetermined position on the display screen (step S423d).

Next, the offset value stored in the offset value storage unit 41 of the plane shift engine 20 and the scaling factor referenced in step S408 are referenced, and left eye shift processing is performed on the subtitle data stored in the interactive graphics plane 10 (specifically, the area given (R) in FIG. 4). This corresponds to performing shift processing with use of an offset value corresponding to the result of performing the calculation "value in offset storage unit (offset value)×scaling factor" (cutting off the numbers after the decimal point) (step S424d).

Also, in step S422, when a judgment is made that the scaling factor is "1" (when "No" is judged in step S422), the generated left view interactive graphics data is written in the interactive graphics plane 10 (area given the code (R) in FIG. 4) (step S425d).

Next, the offset value stored in the offset value storage unit 41 of the plane shift engine 20 is referenced, and right eye shift processing is performed on the interactive graphics data stored in the interactive graphics plane 10 (specifically, the area given (R) in FIG. 4). Since the scaling factor is 1, this corresponds to performing the calculation in step S424C, "value in offset storage unit (offset value)×scaling factor", with "1" as the scaling factor value, that is, shifting an amount corresponding to the offset value (step S426d).

Although calculation of the shift distance is performed each time the above flowchart is displayed, when scaling is performed by the application, at the time of the call, it is reasonable to update the plane offset E, and exchange the plane offset in the offset value storage unit for a new one, since this enables reducing the number of calculations for the shift distance.

To enable this type of processing, it is necessary for the BD-J platform 22 of the playback apparatus to include a scaling API. The scaling API is, for example, an interface for specifying and calling up a parameter from an application, and as a parameter, for example, the scaling factor is specified.

When the scaling factor is called up as a parameter from the application by the scaling API, the BD-J platform 22 updates the scaling factor stored in the scaling factor storage unit, for example.

Also, according to the above implementation, even if a scaling instruction arrives during the output processing, the shift distance between the right eye and the left eye can always be reliably synchronized without performing processing based on immediately updating the scaling factor.

Embodiment 2

Unlike embodiment 1, in which subtitle data and interactive graphics data are made to be dependent on the depth of the video stream, the present embodiment presents a variation that reduces eye fatigue in the viewers when subtitled video is being scaled, by causing the video stream to be dependent on the depth of the subtitles and GUI.

To prevent the positional relationship between a subtitle or graphic and a video image from becoming out of kilter, when executing a plane shift of a video plane, the plane offset for the video plane must be calculated in consideration of the type of value of the plane offset of the graphics plane.

To realize this type of structure, in the present embodiment, an offset value of an image plane setting stored in the display mode storage unit 29, for example, is read, and the apparatus is configured to be able to use this offset value as the video offset value. Also, with use of the video data stored in the video plane 6, the plane shift engine 20 performs right eye shift processing and left eye shift processing.

Furthermore, in FIG. 4, it is necessary to add, to the plane shift engine 20, a constituent element that calculates this plane offset for the video plane. FIG. 46 shows the internal structure of the plane shift engine 20 with this constituent element added.

Although in embodiment 1, the plane offset stored in the offset storage unit is referred to as the "plane offset D", and the plane offset calculated for scaling is referred to as the plane offset E, the actual parameter used for the plane shift of the video plane in the present embodiment is referred to as "plane offset V".

FIG. 46 is a block diagram showing the internal structure of the plane shift engine 20 of the playback apparatus in embodiment 2. It is apparent that a video plane offset calculation unit 45 has been added to the inner structure of the plane shift engine 20 of embodiment 1 shown in FIG. 24.

The video plane offset calculation unit 45 is a module for calculating the plane offset V of the video plane during scaling of a subtitled video.

The plane shifting in embodiment 1 is considered to be only of the graphics plane, but in the present embodiment, since the video plane is also a target of plane shifting, a processing procedure for the plane shifting of the video plane is necessary. The flowchart of FIG. 47 shows the processing procedures for the plane offset of the video plane.

Figure 47A:
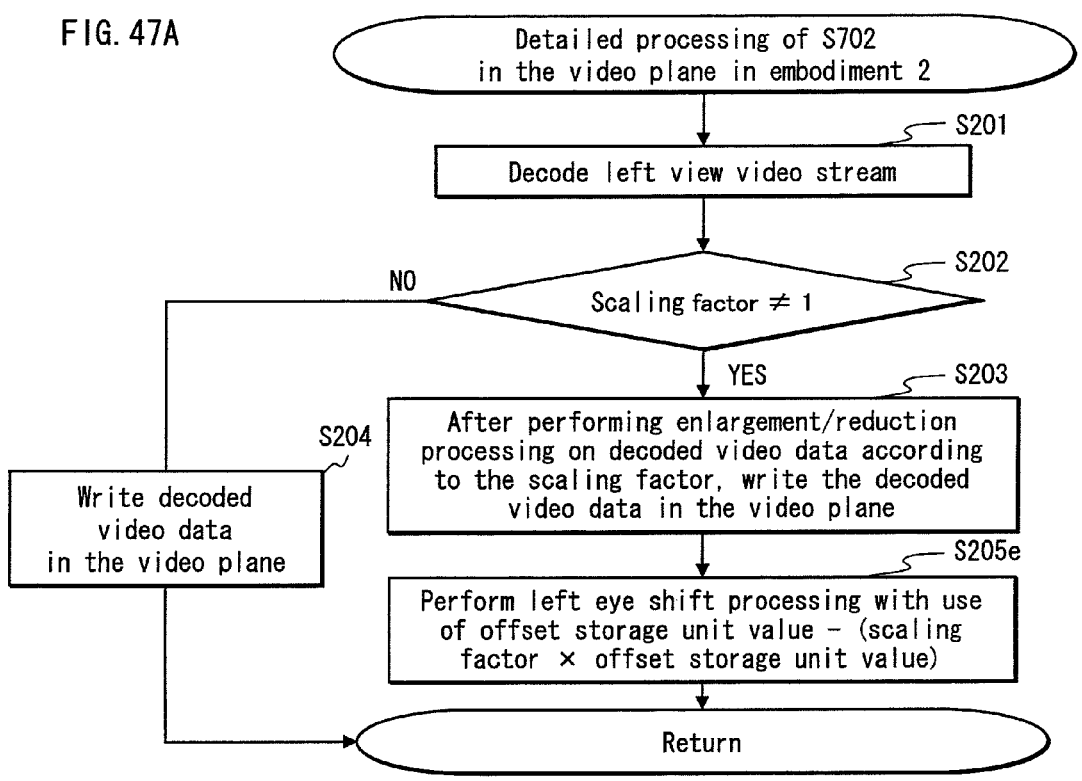
FIG. 47A and FIG. 47B are flowcharts showing a playback procedure for shift processing of the video plane 6.

FIG. 47A is a flowchart illustrating a specific example of step S702 shown in FIG. 41.

Since structural elements given the identical codes in FIG. 47A as the codes in FIG. 43A are identical or corresponding elements, duplicated description thereof is omitted here.

In step S202, when a judgment is made that the scaling factor is not "1" (when "Yes" is judged in step S202), step S203 is performed.

Next, with use of the plane offset D for the image plane, calculation of the following expression is performed, thus calculating the plane offset V for the pixels of the video plane. Expression $$\text{Video plane pixel plane offset } V = \text{Ceil}(D-(\text{scaling factor} \times D))$$

Then, shift processing is performed on the left eye video based on the plane offset V for the video plane, calculated according to the formula above (step S205e).

The description of the shift processing with reference to FIGS. 30 and 31 can be applied to the current processing, with the video plane substituted for the interactive graphics plane or the image plane, and offset V substituted for offset E.

Also, in the next step S202, when the scaling factor is judged to be "1" (when "No" is judged in step S202), step S204 is performed.

Video offset processing cannot be performed when the scaling factor is 1, since in the above expression, when "1" is substituted for the scaling factor, the offset V becomes 0.

Figure 47B:
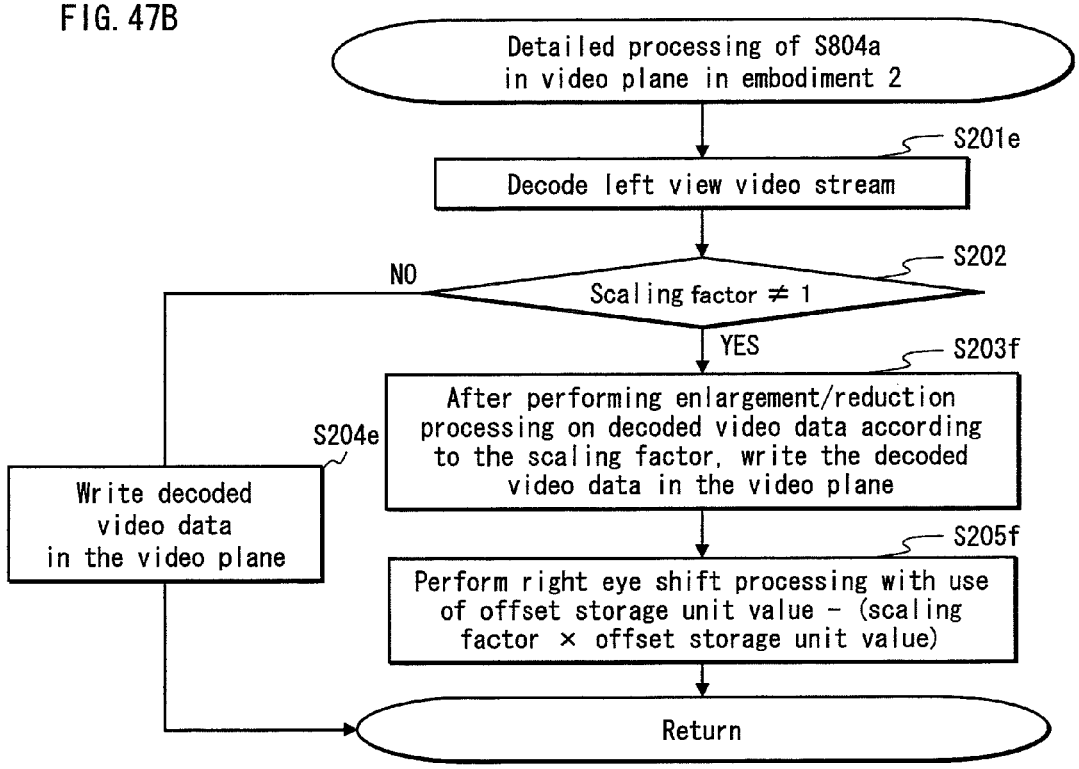

FIG. 47B is a flowchart illustrating a specific example of step S804A of FIG. 42.

Since structural elements given the identical codes in FIG. 47B as the codes in FIG. 43A and FIG. 47A are identical or corresponding elements, duplicated description thereof is omitted here.

In step S202, when a judgment is made that the scaling factor is not "1" (when "Yes" is judged in step S202), the number of horizontal pixels in the decoded video data (number of pixel lengths in the horizontal direction on the display screen), the number of vertical pixels (number of pixel lengths in the vertical direction on the display screen) are converted to a number of horizontal pixels and a number of vertical pixels corresponding to the scaling factor (that is, enlargement/reduction processing is performed), and the video data is written, according to the converted number of horizontal pixels and converted number of vertical pixels, in the video plane 6 (area given the code (R)) so that the video data is displayed in a predetermined position on the display screen (step S203f).

Next, the plane offset V for the video plane is calculated by performing the calculation of the following expression with use of the plane offset D for the image plane.

Expression

Plane offset $V$ for the video plane=Ceil($D$-scaling factor×$D$))

Then, shift processing is performed on the left eye video based on the plane offset V for the video plane, calculated according to the formula above (step S205f).

Figure 45:
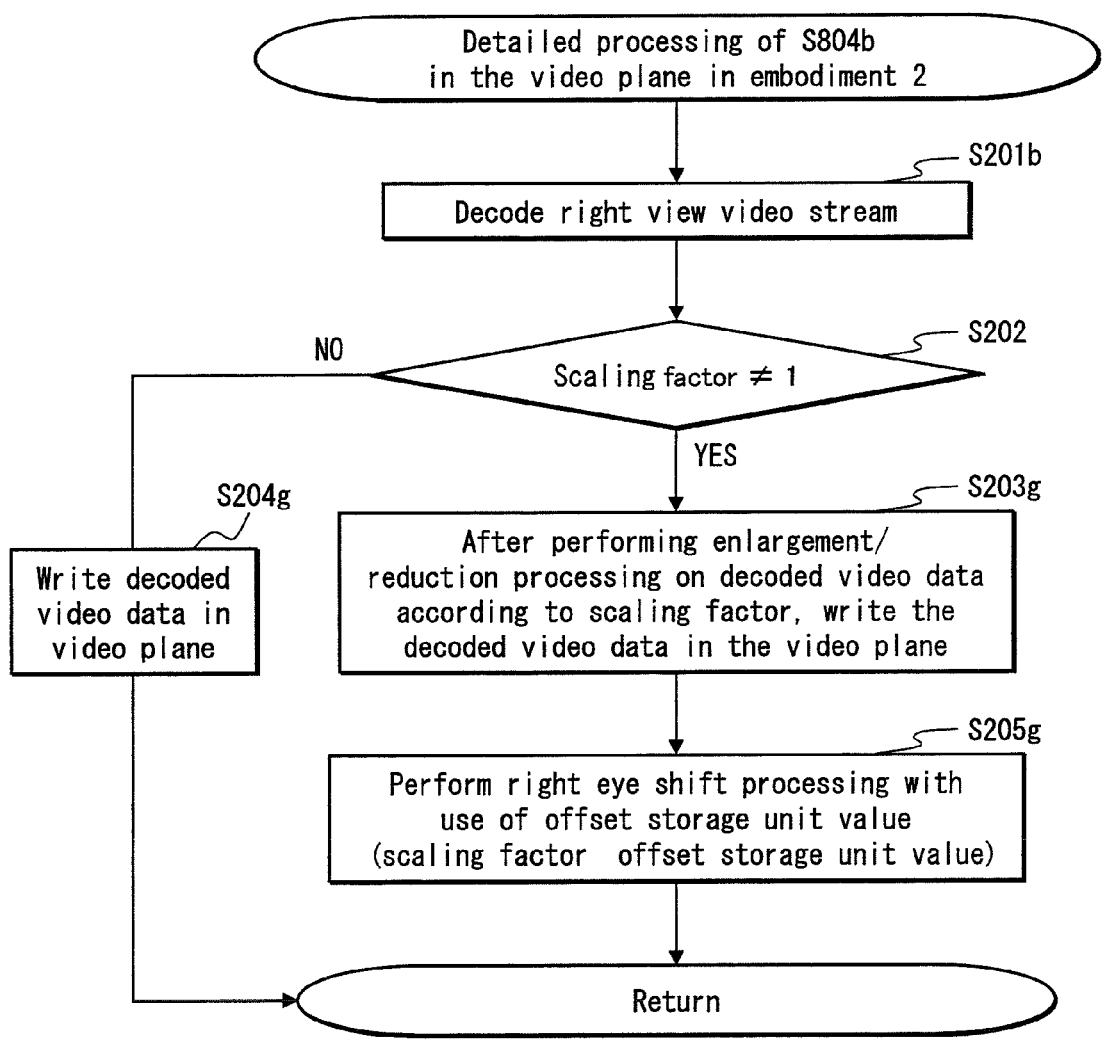
FIG. 45 is a flowchart showing processing procedures in a case when a scaling API call has been performed.

FIG. 45 is a flowchart illustrating an example of the step S804b shown in FIG. 42. Since structural elements given the identical codes in FIG. 45 as the codes in FIG. 43B are identical or corresponding elements, duplicated description thereof is omitted here.

In FIG. 45, when a judgment is made that the scaling factor is not "1" (when "Yes" is judged in step S202b), step S302b is performed.

Next, the plane offset V for the video plane is calculated by performing the calculation of the following expression with use of the plane offset D for the image plane.

Expression

Plane offset $V$ for the video plane=Ceil($D$-scaling factor×$D$))

Then, shift processing is performed on the right eye video based on the plane offset V for the video plane, calculated according to the formula above (step S205g).

Also, in the next step S202b, when the scaling factor is judged to be "1" (when "No" is judged in step S202b), step S204b is performed.

Giving an offset to the video plane in this way during right eye processing and left eye processing eliminates the need to always perform shift processing of the image plane and the interactive graphics plane. Therefore, since the offset of the video is changed without changing the offsets of the image plane and the interactive graphics plane according to the scaling of the video, this structure enables making the video stream dependent on the depth of the subtitles/GUI, thus enabling reducing eye fatigue in the viewers during scaling of a subtitled video.

The above processing does not mean that shift processing is not performed in right eye processing and left eye processing on the image plane and the interactive graphics plane when an offset is given to the video plane.

In the above flowchart, since a plane offset for the video plane is calculated, in the present embodiment, in both the video plane and the image plane, plane shifting is executed. Here, the following describes specifically, with reference to FIG. 48, how the positional relationship between the subtitles and moving images changes in a case that plane shifting is performed on the graphics plane, and in a case that plane shifting is performed on the video plane and the graphics plane.

The following describes a situation in which shifting is applied to both the video plane and the graphics plane.

Figures 48A, 48B:
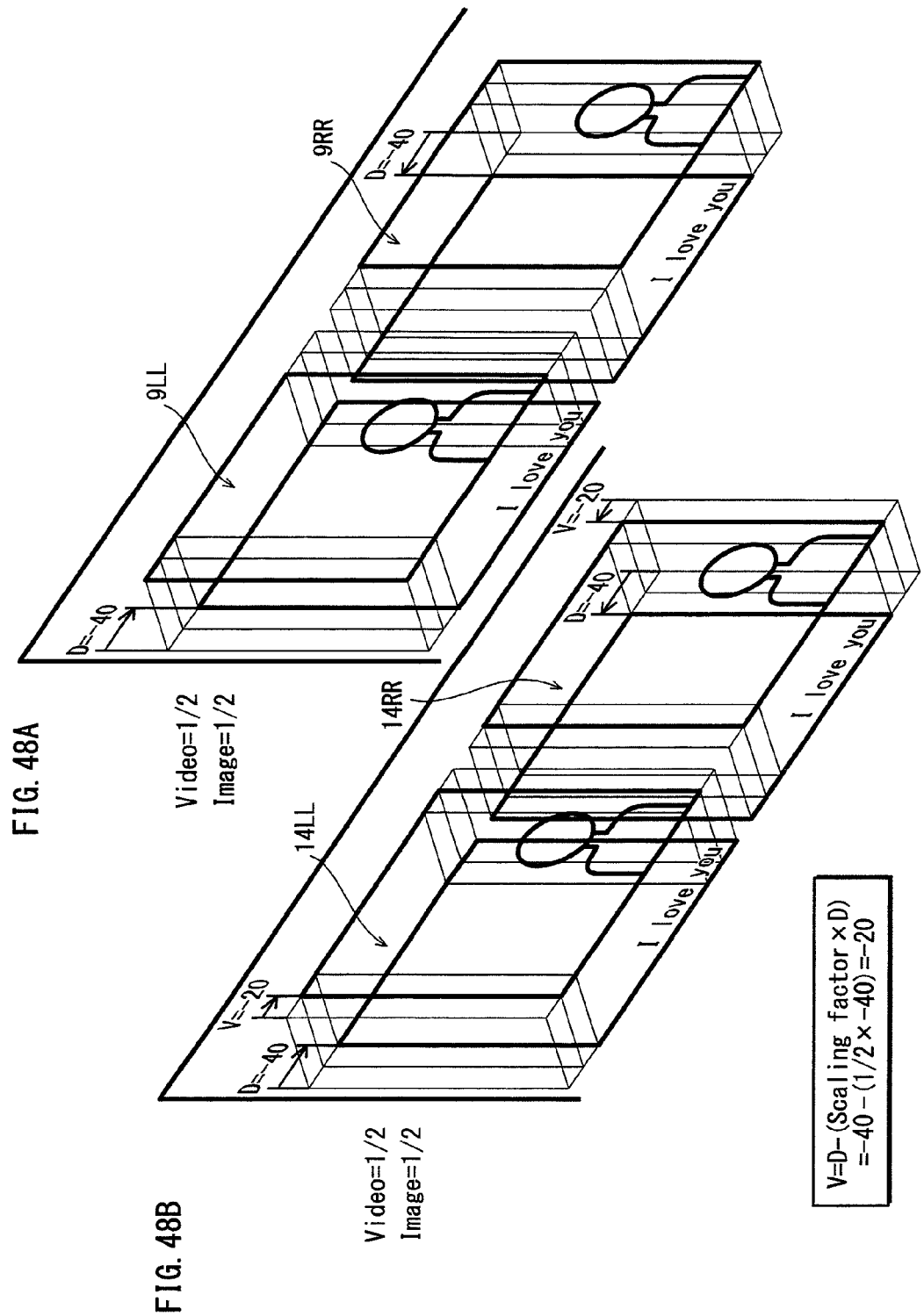
FIG. 48A and FIG. 48B show circumstances in which it is intended to move coordinates of moving images and graphics that have been scaled by a predetermined number of pixel lengths.

FIG. 48A shows a state in which, of scaled video images and graphics, only moving the coordinates of the graphics by a predetermined number of pixel lengths is intended. This shows the output screen when scaling is performed and the processing of the present embodiment has not been performed. FIG. 48A illustrates that, since the frame offset is set to −40, in the left view, the coordinates are moved 40 pixels in the right direction as shown in 9RR, and in the right view, the coordinates are moved 40 pixels in the left direction as shown in 9LL.

When a subtitle having a same shift distance (40 pixels) as before scaling on a video on which scaling has been performed is composited with a video image, in comparison with the image before scaling, the position of the subtitle is greatly displaced, and the structure of the video and the subtitle is not maintained. There is a risk of this causing the difference in stereoscopic sense to be sharp and for the eyes not to be able to follow.

In view of this, the plane offset calculation 43 performs the above calculation, and calculates a shift distance of the video plane.

Specifically, the plane offset is set as −40 pixels, and the scaling factor is set as 1/2. When this is applied to calculating the shift distance of the video plane, the plane offset of the video plane according to the following calculation is calculated as "−20".

$V=D-$(Scaling factor×$D$)=40−(1/2×−40)=−20

Since the actual parameter for the video plane, the plane offset V, is calculated to be −20, the coordinates of the pixels in the video plane are moved 20 pixels in the right direction in the left view, and 20 pixels in the left direction in the right view. When scaling has been performed on the moving images and the graphics, video on which scaling has been performed is shifted 20 pixels, and in addition, the video is composited with subtitles that have been shifted 40 pixels.

Since a relative change amount between the video plane and the graphics plane is 20 pixels in the right direction in the left view, and 20 pixels in a left direction in the right view, compared to FIG. 48A, the change amount of the coordinates of the video plane and the graphics plane is made smaller and suppressed.

FIG. 48B illustrates that by doing this, the structural ratio between video and subtitles before scaling is preserved in 14LL and 14RR that are the output images after scaling. This prevents the difference in stereoscopic sense from becoming sharp, reduces eye fatigue, and causes more natural display.

According to the present embodiment as described above, together with a reduction in the video, a reduction of sense of depth due to a natural shrinking of a parallax between the left eye and the right eye can be prevented by plane shift.

Embodiment 3

The present embodiment is an expanded example of embodiment 1. When scaling is performed and there is a high rate of enlargement/reduction, there is a sharp difference in changes in depth compared to before scaling. In embodiment 1, when performing scaling, a next frame after a scaling request reflects a depth change according to the scaling factor. When the depth of the image suddenly changes sharply, this change leads to eye fatigue in the user. The present embodiment describes a variation that aims to prevent eye fatigue in the user by causing the depth to change gradually when there is a scaling request, instead of causing the next frame to suddenly change the depth at once.

Figure 49:
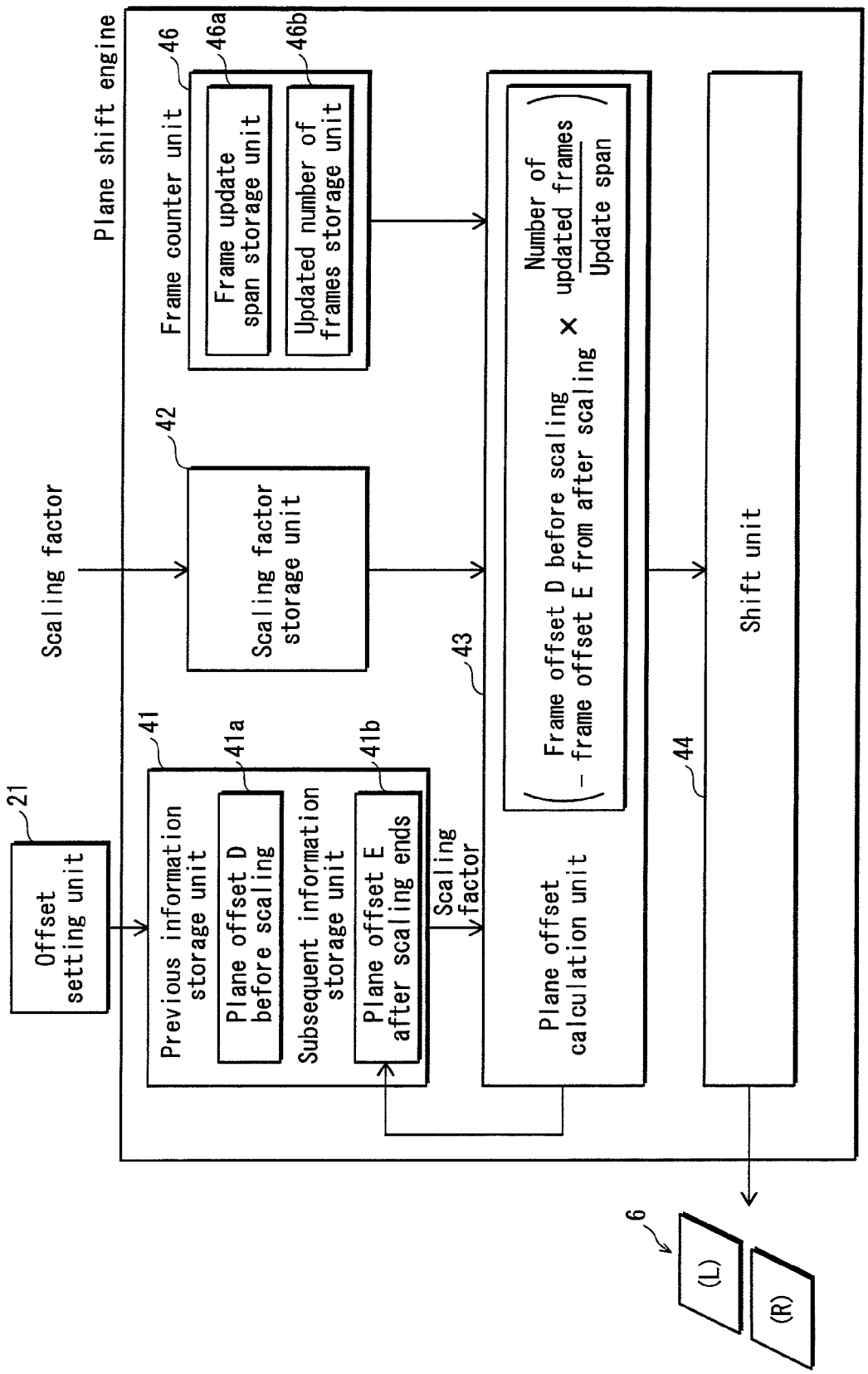
FIG. 49 is a block diagram showing an internal structure of a plane shift engine 20 of the playback apparatus in embodiment 3.

To change the depth gradually, it is necessary to store both an initial plane offset and a final plane offset as plane offsets in the plane shift engine 20, and midway through depth change processing, it is necessary to recalculate a midway level plane offset. FIG. 49 shows the internal structure of the plane shift engine 20 with these changes added.

FIG. 49 is a block diagram showing an internal structure of the plane shift engine 20 of the playback apparatus in embodiment 3. This structure is based on the internal structure of the plane shift engine 20 of embodiment 1 shown in FIG. 4, with the further addition of a previous information storage unit 41a and a subsequent information storage unit 41b to the plane offset value storage unit 41. Also, a frame counter unit 46 has been added, and a frame update span storage unit 46a and an updated number of frames storage unit 46b have been added to the frame update span storage unit 46a. The following describes the constituent elements newly added in the present embodiment.

Previous Information Storage Unit 41a

The previous information storage unit 41a stores a plane offset D specified from the offset setting 21, as a plane offset previous to scaling.

Subsequent Information Storage Unit 41b

The subsequent information storage unit 41b stores a plane offset E subsequent to the completion of scaling, that is, a value obtained by multiplying the plane offset D by the scaling factor. Also, the when a value obtained by multiplying the plane offset D by the scaling factor is updated in the offset value storage unit, the updated offset is stored in the subsequent information storage unit 41b.

The timing of performing this update is after updating the value of the scaling factor storage unit 42 when a scaling instruction (for example, when video or subtitles are shown in reduced display due to a scaling instruction from a BD-J application) has been issued.

Plane Offset Calculation Unit 43

The plane offset calculation unit 43 converts the plane offset D indicating the plane offset stored in the previous information storage unit 41a and the plane offset E stored in the subsequent information storage unit 41b, respectively, to pixel coordinates. Then the difference between these two sets of pixel coordinates is calculated, a plane offset necessary at the time of scaling is calculated, and the value in the updated number of frames storage unit 46b is divided by the value in the frame update span storage unit 46a.

Then, the updated number of frames in the updated number of frames storage unit 46b is divided by a frame update span in the frame update span storage unit 46a, and the resulting quotient is multiplied by the calculated final plane offset.

In embodiment 1, the plane offset provided from the offset setting unit 21 is referred to as "plane offset D", and the plane offset calculated according to scaling is referred to as "plane offset E". However, in the present embodiment, at a time point after a number of frames i has elapsed, a plane offset used for shifting the image plane is referred to as a plane offset P(i).

The following expression is used for calculating the plane offset P(i) in the frame (i).

Expression

"Plane offset $P(i)$=(Plane offset $D$ before completion of scaling−plane offset after completion of scaling)×(updated frame number $i$÷frame update span)".

Also, when the plane offset P(i) would be a decimal value, the plane offset P(i) is made to be an integer value by rounding up one decimal place.

Shift Unit 44

The shift unit 44, when performing processing for the right eye, shifts graphics to the left when the graphics pop out to the front of the screen, and shifts graphics to the right when the graphics appear to be pulled to the back. When performing left eye processing, the shift unit 44 shifts graphics to the right when the graphics pop out to the front of the screen, and shifts graphics to the left when the graphics appear to be pulled to the back.

Frame Counter Unit 46

The frame counter unit 46 fulfills a function of counting how many frames have elapsed, in frame units, after a scaling request, from a value stored in the previous information storage unit 41a, bringing the value closer to the value stored in the subsequent information storage unit 41b.

Specifically, the frame counter unit 46 includes a frame update span storage unit 46a that stores therein a frame update span indicating how close a frame count has become to the value stored in the subsequent information storage unit 41b from the value stored in the previous information storage unit 41a, using frames, and an updated number of frames storage unit 46b showing how many times frame processing has been performed after the scaling request.

The value in the frame update span storage unit 46a is set in the playback apparatus by the manufacturer of the playback apparatus, and is not updated.

When the value in the updated number of frame storage unit 46b is lower than the value in the frame update span storage unit 46a, the value of the updated number of frames storage unit 46b is incremented by 1.

This completes the description of the internal structure of the plane shift engine. The following describes the internal structure of the plane shift engine pertaining to embodiment 3.

Figure 50:
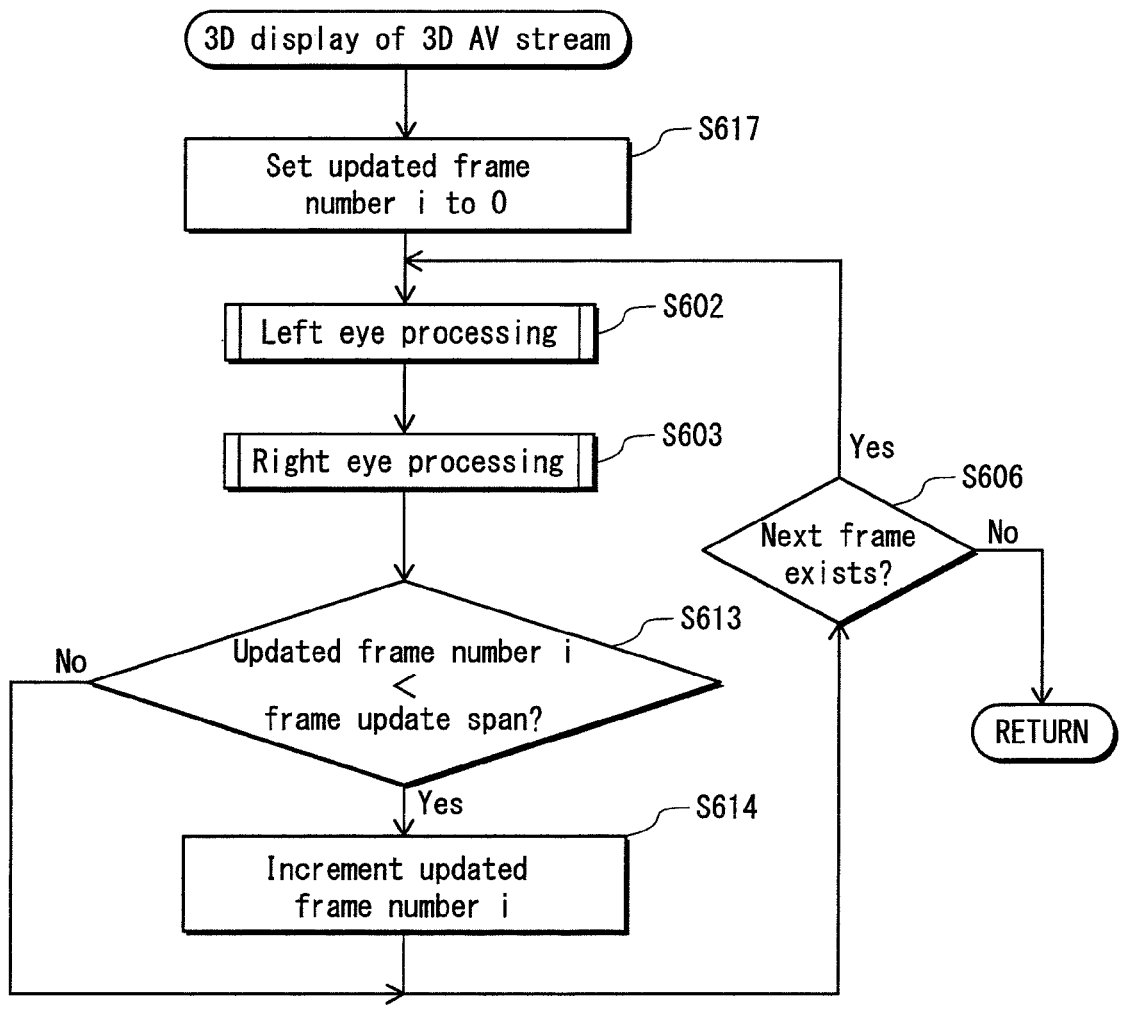
FIG. 50 is a flowchart showing processing procedures of a 3D display of a 3 DAV stream.

Since the updated number of frames continues changing according to the changes in the video frames targeted for playback, to implement a playback apparatus that performs the processing of the present embodiment, processing pertaining to the updated number of frames must be added to the processing procedures of the playback apparatus of the 3DAV stream described in embodiment 1. This type of processing pertaining to the updated number of frames includes processing to reset the updated number of frames, and processing to increment the updated number of frames. FIG. 50 shows the processing procedures for 3D display of a 3DAV stream after adding these types of processing pertaining to the updated number of frames.

FIG. 50 is a flowchart showing processing procedures for 3D display of a 3DAV stream.

In FIG. 50, please note that as a difference from FIG. 40, steps S611 to S614 have been added.

Structural elements that have been given identical codes as in FIG. 40 are identical or corresponding to the structural elements in FIG. 40.

The present flowchart is for executing the steps of S602, S613, S614, S615, S616, S617, and S606.

In the above steps, the processing of sequentially executing left eye processing (step S602) and right eye processing (step S603) is continued until frame output ends ("No" in step S606). In the left eye processing of this loop, the coordinates of the pixels are moved in the image plane by the shift distance P(i) of the pixels corresponding to the number of frames i. Also, in the right eye processing, the coordinates of the pixels are moved in the image plane by the shift distance P(i) of the pixels corresponding to number of frames i. At this time, the shift distance P(i) corresponding to the left eye processing and the shift distance P(i) corresponding to the right eye processing are the same, but the direction of the shift is different.

First, the updated number of frames i is set to 0 (step S617).

Next, left eye processing is performed (step S602).

At this time, in the left eye processing, when calculating the image plane offset (shift distance), P(i) is calculated with use of the plane offset D from before scaling described later, the plane offset E from after completion of the scaling, and the update span.

Next, right eye processing is performed (step S603).

At this time, when calculating the image plane offset (shift distance) in right eye processing, the above-described P(i) is used.

Step S613 is a judgment as to whether the updated frame number (i) is smaller than the frame updated span, and if the updated frame number (i) is smaller, the updated number of frames i is incremented in step S614. If the updated frame number (i) is equal or larger (that is, if "No" is judged in step S613), processing advances to step S606.

In step S606, a judgment is made as to whether a next frame exists.

If a next frame does not exist, that is, if "No" is judged in step S606, the 3D display processing for the 3DAV stream ends.

If the next frame does not exist, that is, if "Yes" is judged in step S606, another calculation is made with use of the updated number of frames P(i) in the processing of steps S602 and S603.

The updated number of frames i increases by one each time the judgment of step S613 is made until arriving at the update span, and after arriving at the updated span, the value becomes constant.

The updated frame (i) is continuously updated as the playback of the video stream advances, and accordingly, since the plane offset E is also updated, it is necessary to execute the plane shift in the present embodiment each time the updated frame number is updated. Along with this update of the updated number of frames, the plane offset is recalculated, and FIG. 51 shows the procedures for executing the platform based on the recalculated plane offset.

Figure 51:
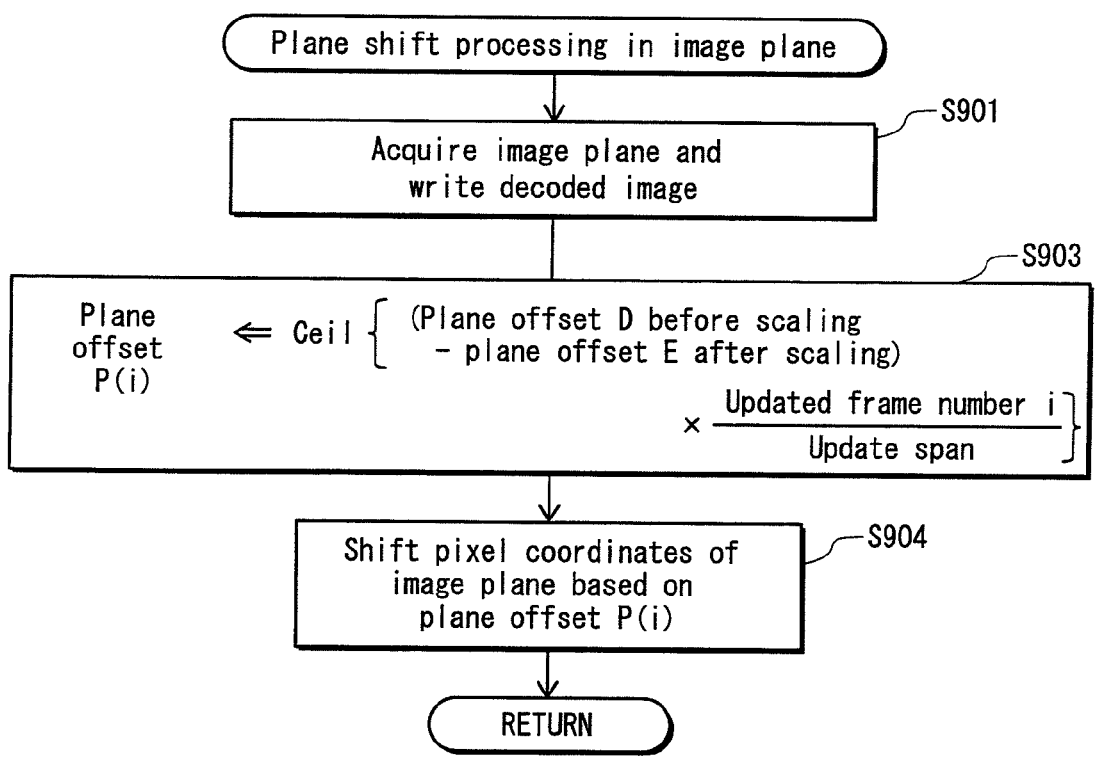
FIG. 51 is a flowchart showing processing procedures of a plane shift of an image plane.

FIG. 51 is a flowchart showing processing procedures for performing plane shift on the image plane.

Since there are many common portions between left eye processing and right eye processing in the processing procedures for performing plane shift on the image plane in FIG. 51, such processing is described using the same flowchart. Note that when performing shift processing for the left eye, the target of shift processing is the subtitle data stored in the area given the code (L) in the image plane, and when performing shift processing for the right eye, the target of shift processing is the subtitle data stored in the area given the code (R) in the image plane.

The image plane is acquired, and the decoded images are written in the image plane (step S901).

Then, the plane offset P(i) for the frame (i) is calculated according to the following calculation.

The plane offset P(i):

Plane offset $P(i)$=(plane offset $D$ from before completion of scaling–plane offset $E$ from after completion of scaling)×updated number of frames $i$÷frame update span)

The pixel coordinates in the image plane are shifted according to the plane offset P(i) calculated thus (step S904). Note that in step S904, the shifting is performed in opposite directions for the left eye shift processing and the right eye shift processing.

Since each time the loop shown in FIG. 51 is performed once, the updated number of frames i is incremented and the plane offset P(i) is calculated based on the updated number of frames i in step S809, it is apparent that the larger the updated number of frames i becomes, the larger the change in the plane offset P(i). It is apparent also that if the updated number of frames i reaches the frame update span, the updated number of frames i is reset to "0".

Figure 52:
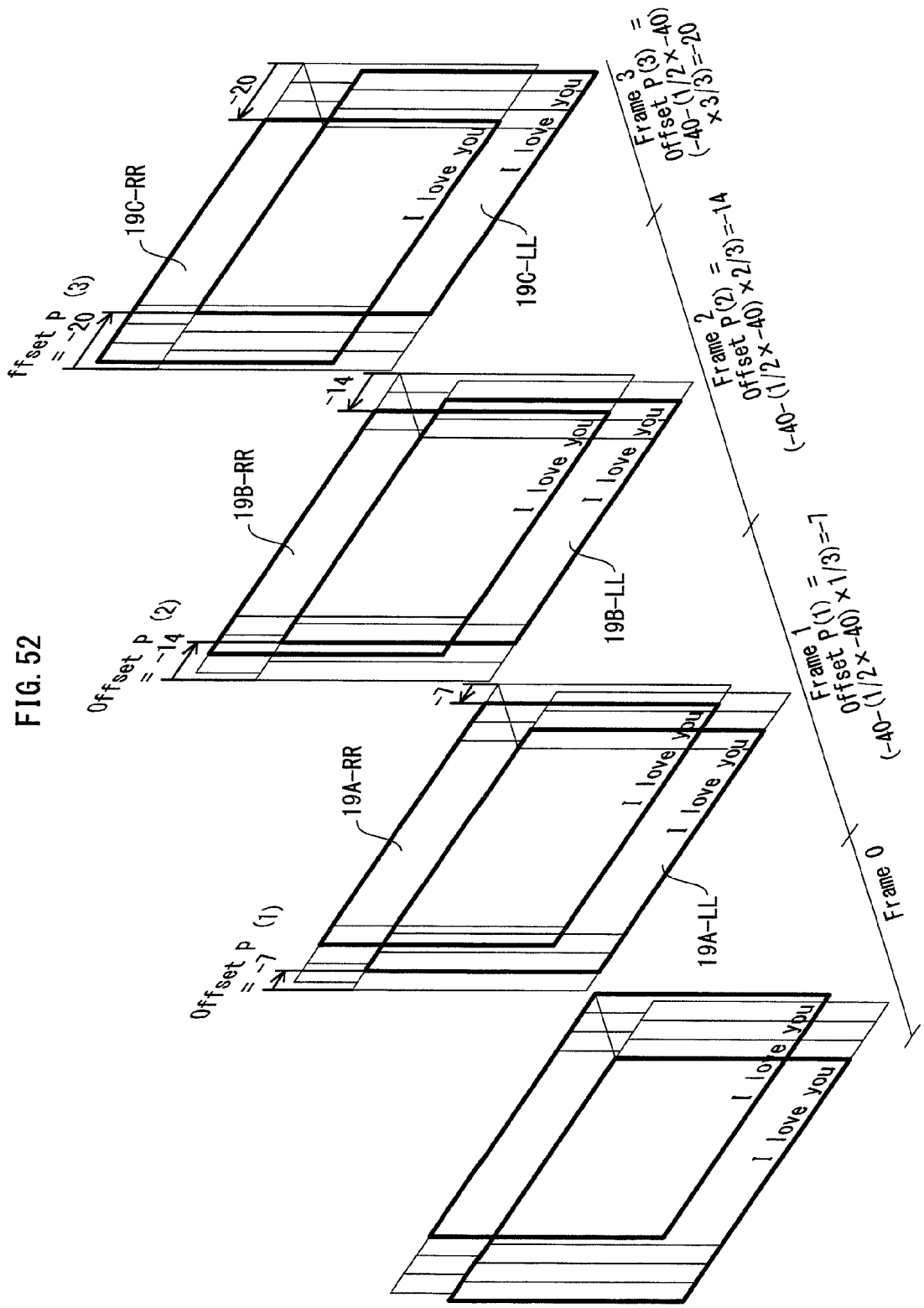
FIG. 52 shows how a frame offset changes when an updated number of frames i is updated to "1", "2", and "3", respectively.

As described above, the updated number of frames i is updated along with the progress of playing back the video stream, and it is apparent that the plane offset P(i) is also updated along with this. FIG. 52 shows how the updated number of frames and the frame offset P(i) changes temporally. The following describes, with reference to the specific example of FIG. 52, the temporal phases of the plane offset P(i).

FIG. 52 shows how the frame offset P(i) changes when an updated number of frames i is updated to "1", "2", and "3", respectively. In FIG. 52, the time axis is drawn to slant to the right, and frames 0, 1, 2, and 3 are written on this time axis. The contents of the image plane in these frames 0, 1, 2, 3 are drawn on this time axis.

The expressions for each frame indicate what value the frame offset P(i) will be when the updated number of frames i has been given the values "1", "2", and "3" for identifying the frames 0, 1, 2, and 3.

In this specific example, assume that the values −40 and −20 are stored in the previous information storage unit and the subsequent information storage unit. −40 is the plane offset D, and −20 is the plane offset P(i) obtained after adding a pixel change calculation to the plane offset. In the present example, the depth gradually changes over three frames, and the value "3" is stored in the frame update span storage unit 46a. The value "1" is stored in the updated number of frames storage unit 46b. This indicates that processing on a first frame is performed after a scaling instruction. This stored value is incremented to "2" and "3" as the frames elapse. Then, since the scaling request was for the scaling factor 1/2, the value 1/2 is set in the scaling factor storage unit 41.

In the specific example, based on the information in the plane shift engine and the difference between the previous information storage unit and the subsequent information storage unit, it is apparent that over 3 frames, it is necessary to move the coordinates −20 pixels.

Frame 1

In frame 1, when the above expression is applied giving "1" as the value of the updated number of frames i, the updated number of frames i÷the frame updated span is "1/3", and "−7" is obtained for the pixel frame offset P(1) as a result of the calculation (−40−(1/2×−40)×1/3). Accordingly, in frame 1, at the time of the left view, the image plane is shifted 7 pixels in the right direction, and at the time of the right view, the image plane is shifted 7 pixels in the left direction.

Frame 2

In frame 2, when the above expression is applied giving "2" as the value of the updated number of frames i, the updated number of frames i÷the frame updated span is "2/3", and "−14" is obtained for the pixel frame offset P(2) as a result of the calculation (−40−(1/2×−40)×2/3). Accordingly, in frame 2, at the time of the left view, the image plane is shifted 14 pixels in the right direction, and at the time of the right view, the image plane is shifted 14 pixels in the left direction.

Frame 3

In frame 3, when the above expression is applied giving "3" as the value of the updated number of frames i, the updated number of frames i÷the frame updated span is "3/3", and "−20" is obtained for the pixel frame offset P(3) as a result of the calculation (−40−(1/2×−40)×3/3). Accordingly, in frame 3, at the time of the left view, the image plane is shifted 20 pixels in the right direction, and at the time of the right view, the image plane is shifted 20 pixels in the left direction.

In this specific example, the coordinates in each frame are moved the shift distance corresponding to 1/2 of the −20 pixels (7 pixels), and in the third frame, the coordinates are shifted −20 pixels. From the fourth frame onward, processing continues with the shift number preserved from the third frame. This continues until a judgment is made in step S606 that a next frame does not exist.

According to the present embodiment as described above, changing the depth of the subtitles during scaling not suddenly but gradually enables reducing eye fatigue in the user.

Embodiment 4

The plane shift engine 20 is required to calculate a shift distance for performing plane shift according to some type of parameter for stereoscopic view. It is preferable to use a plane offset for stereoscopic view incorporated in MVC (Multi View Codec) video streams for calculating this shift distance. Note that the present invention is not limited to this, and it is also preferable that the parameter is provided to the plane shift engine 20 through various information elements that the content provider provides to the playback apparatus through the BD-ROM.

Figure 53:
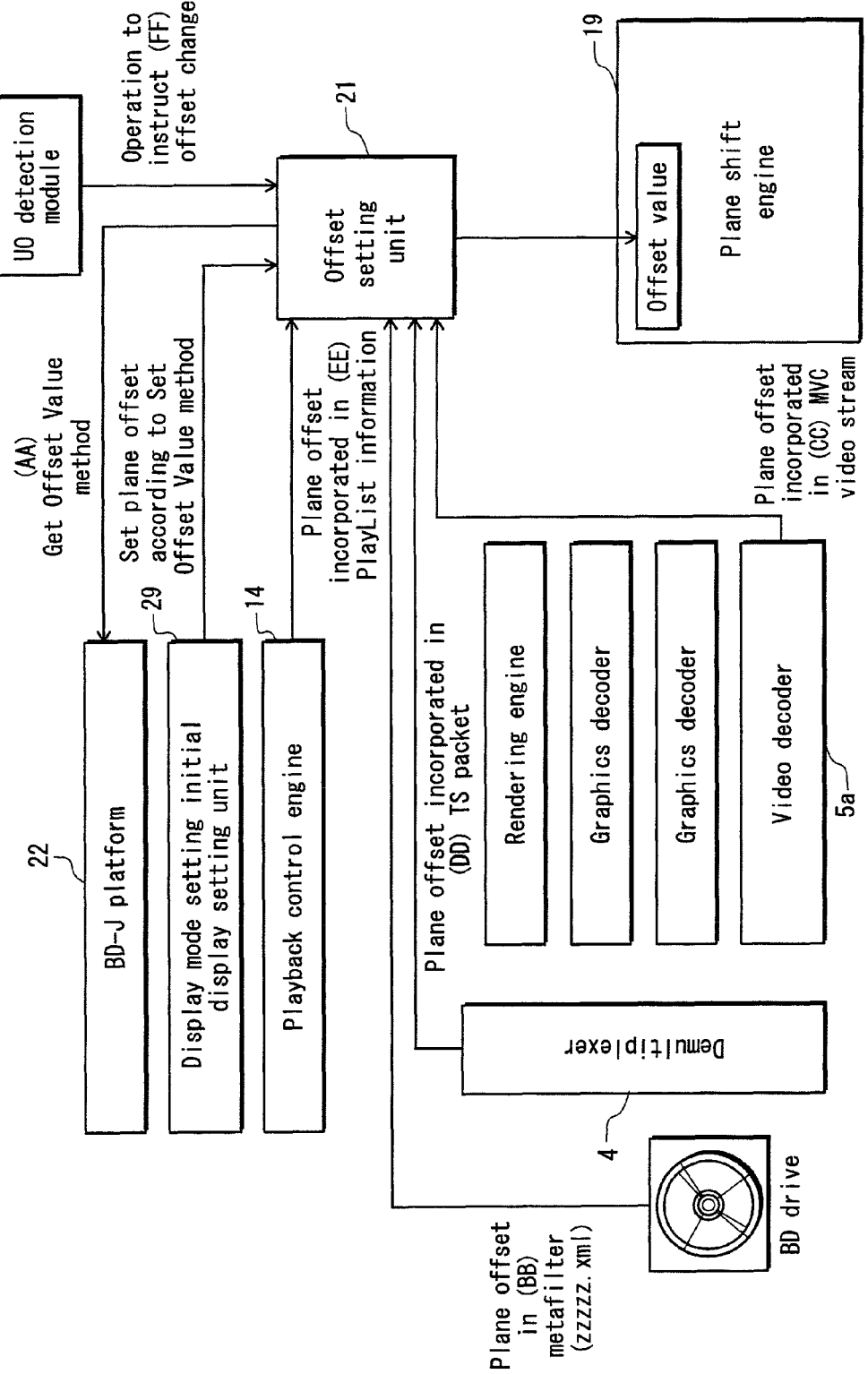
FIG. 53 shows a partial structure related to setting a frame offset.

The following describes processing for setting the plane offsets with reference to FIG. 53.

FIG. 53 shows a structure of a portion pertaining to setting the plane offsets.

The following variations (AA) to (FF) exist as methods for providing the plane offset.

(AA) The writing control unit can update the plane offset in the plane setting in the display mode storage unit 29 by the method call of the setOffsetValue by the BD-J application.

The above-stated offset can be obtained by the BD-J application in the getOffsetValue method.

When the BD-J application calls the API, and the plane offset is embedded in the BD-J application, the flexibility is high, but the ability to change offset in real-time according to depth of the video is difficult. When the plane shift engine 20 refers to the offset specified by the BD-J application, the plane offsets specified by the BD-J application is stored in the display mode storage unit 29 (for example, the plane offset set in the image plane, and the plane offset set in the interactive graphics plane) are read by the offset setting unit 21 and set in the offset value storage unit 41 in the plane shift engine 20. The plane shift engine 20 automatically shifts the plane in the horizontal direction based on the plane offset values at the time of the composition.

The following describes timing of the setting.

At any time after the application has been started, the started application can call the API that changes the depth of data held in each of the image plane 8 and the interactive graphics plane 10. This is whether the video is stopped or not. In either case (video is played or not at the time of API call), it is possible to ensure that the shift distance for the right view is in synchronization with the shift distance for the left view, by controlling timing of setting the plane offset value (from the display mode storage unit 29) in the plane shift engine 20.

Specifically, the writing control unit does not update the plane offset value in the plane shift engine 20 at timing that the BD-J application calls the setOffset( ). It is checked whether or not the writing control unit has updated the plane offset in the display mode storage unit 29 at a time when one frame worth of the left-view and one frame worth of the right-view data have been outputted. In accordance with the update, the writing control unit updates the offset value of the plane shift engine 20. Thus, it is possible to ensure that the shift distance for the right-view is in synchronization with the shift distance for the left view. When the shift distance for the right view is not in synchronization with the shift distance for the left view, the display appears in a way that is not intended by the content creator, which results in providing the unpleasant outputted video to the viewer.

(BB) When the BD-ROM is loaded, or when virtual package is constructed, the writing control unit updates the plane offset value in the plane shift engine 20 read from the meta file (ZZZZZ.xml) stored in the META directory specified by the BD-ROM or the virtual package.

(CC) When reading and decoding of the MVC video stream starts, the writing control unit updates, to the plane offset value in the plane shift engine 20, the plane offset embedded in a header area of each of the PES packets that compose the MVC video stream. Preferably, when output of one frame worth of the left-view data and one frame worth of the right-view data have completed, the writing control unit sets, as a plane offset, the offset corresponding to the next frame to be processed to a plane offset value in the read buffer 28.

In case the plane offset is embedded in the MVC video stream, since offset can be set for each video frame, the plane offset can be shifted dynamically but the cost of authoring can become a burden.

(DD) When the reading and decoding of the transport stream starts, the writing control unit updates the plane offset embedded in the header area of the transport stream to the plane offset value in the plane shift engine 20. Preferably, when output of one frame worth of the left-view data and one frame worth of the right-view data has completed, the writing control unit sets, in the read buffer 28, the offset corresponding to the frame being processed as a plane offset value in the plane shift engine 20.

In a case where the plane offset value is embedded in the stream, the offset value may be shifted dynamically with the video. Therefore, the real time property is high, but the cost of authoring can become a burden.

(EE) When the current PlayList is determined, and the PlayList information is loaded, the plane offset of the PlayList information is set to a plane offset value in the plane shift engine 20. When the PlayList information is used for determining the offset, flexibility is high at the time of authoring. However, compared to the case where the offset is embedded in the stream, it is not possible to shorten the time interval from a time point at which an offset is set to a time point at which the offset is updated. Therefore, the real-time property is a little poor.

(FF) Receiving the user operation that changes the level of the depth of image plane 8 and the data held in the interactive graphics plane 10 by the operation of the button attached to a remote control or a device (i.e. the depth is expressed by the three levels such as "distant", "normal" and "close", or depth is expressed by the numerical values such as "how many cm" or "how many mm"), the UO detection module 26 updates the plane offset value in the plane shift engine 20 with use of the user operation. This update increases or decreases the plane offset depending on the number of times the right-arrow key of the remote control 300 is pressed. Thus, the graphics can be displayed closer to the viewer or distant from the viewer by changing the number of times the right arrow or the left arrow is pressed. This enhances the operational property.

The shift distance by which the image plane 8 and the interactive graphics plane 10 are shifted is obtained by performing the calculation based on the plane offset in the plane shift engine 20 after the above-stated processing is performed. The reason why the calculation processing is necessary is that while the shift distance of the pixel data pieces in each of the image plane 8 and the interactive graphics plane 10 is defined by the number of pixel lengths, the plane offset is often defined by units different from units of pixels.

If the plane offset is embedded in the MVC video stream, the plane offset calculation unit 43 calculates the shift distance by which the coordinates of the pixel data pieces held in the graphics plane based on the shift distance shown by the plane offset that the offset setting unit 21a have stored in the plane shift engine 20, when output of one frame worth of the left-view data and one frame worth of the right-view data have completed.

This concludes the description of the various cases where the offset setting unit 21 sets the plane offset. The following describes a value provided by the user operation or the application.

The value provided from the user operation or the application may not be the actual shift distance in pixels, but is possibly an adjusted value from the value set in the current-state plane shift engine 20. In such case, the calculation of the plane offset value needs to be executed. For example, when the right-arrow key is pressed three times or a value "3" of a numerical value key is inputted, the plane shift engine 20 adds this value to the plane offset set in the apparatus, and calculates the plane offset based on the added value. When the value is a "+" value, the shift distance is decreased, and the graphics appears to be more distant from the viewer, for example. When the value is a "−" value, the shift distance is increased, and the graphics appears to be closer to the viewer, for example.

The following describes a change in depth.

As described in the above, when graphics such as subtitles and GUIs are shifted along the horizontal axis, the depth is changed by changing a shift distance for the subtitles, and shift distance for the GUI along the horizontal axis. For example, the closer the left-view subtitles and the right-view subtitles become in a predetermined direction, the closer the graphics are displayed to the screen. The more distant the left-view subtitles and the right-view subtitles become from one another in an opposite direction, the more distant the graphics are displayed from the screen. However, the relationship between the plane offset and the pop-out level is greatly affected by the number of inches of the TV and the characteristic of the liquid crystal of the 3D glasses. By setting stated coefficients in the terminal in advance, a value obtained by multiplying the plane offset by this coefficient can be used for the shifting in order to realize such an optical effect. Multiplying the plane offset by the coefficient in such a manner makes it possible to adjust the pop-out level of the stereoscopic video based on the characteristics of the TV, the playback apparatus 200 and the liquid crystal of the 3D glasses.

Embodiment 5

The present embodiment describes what type of hardware is used in the playback apparatus described in the previous embodiments.

Figure 54:
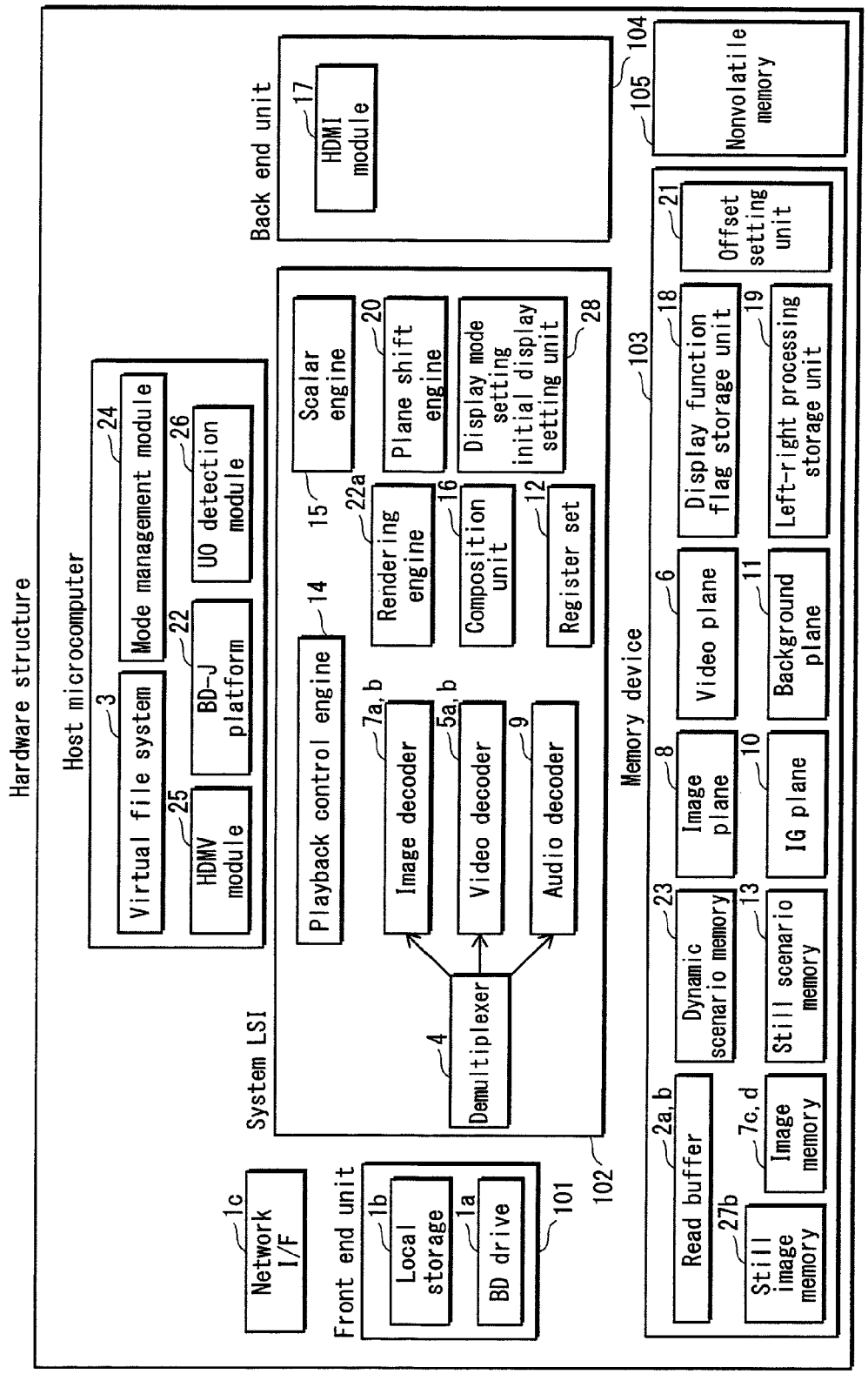
FIG. 54 shows a hardware structure of the playback apparatus.

FIG. 54 shows the internal structure of the playback apparatus 200. A front end unit 101, a system LSI 102, a memory device 103, a back end unit 104, a nonvolatile memory 105, a host microcomputer 106 and a network I/F 107 mainly compose a playback apparatus 200 in FIG. 54.

The front end unit 101 is a data input source. In a figure described previously, the front end unit 101 includes a BD drive 1a and a local storage 1b, for example.

The system LSI 102 is composed of logic elements, and is a core part of the playback apparatus 200. This system LSI includes therein at least a demultiplexer 4, video decoders 5a and 5b, image decoders 7a and 7b, an audio decoder 9, a playback state/setting register (PSR: Player Status/Setting Register) set 12, a playback control engine 14, a composition unit 16, a plane shift engine 19 and an offset setting unit 20.

The memory device 103 is composed of arrays of memory devices such as an SDRAM. The memory device 107 includes, for example, a read buffer 2a, a read buffer 2b, a dynamic scenario memory 23, a still scenario memory 13, graphics planes 6 and 8, the video plane 10 and the background plane 11.

The back end unit 104 is a connection interface that connects internal parts of the playback apparatus 200 with other devices, and includes an HDMI transmission and reception unit 17.

The nonvolatile memory 105 is a readable and writable recording medium, and is a medium that can hold recorded contents without needing power source supply. The nonvolatile memory 105 is used for backup of information on a display mode stored in a display mode storage unit 24 (described in the following). A flash memory, an FeRAM or the like may be used as this nonvolatile memory 105.

The host microcomputer 106 is a microcomputer system that is composed of a ROM a RAM, and a CPU. Programs for controlling the playback apparatus are recorded on the ROM. The programs in the ROM are written in the CPU, and by cooperation between the program and the hardware resources, the functions of the HDMV module 24, the BD-J platform 22, the mode management module 24, the UO detection module 26, and the playback control engine 14 are realized.

The following describes the system LSI.

The system LSI is an integrated circuit obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Monoscopic view Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus 101.

Such a system LSI can be embedded into various types of devices that can play back images, such as a television, game machine, personal computer, one-segment mobile phone, as well as into the playback apparatus 102. The system LSI thus greatly broadens the use of the present invention.

It is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are reserved. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback apparatus 200 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output compositions described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

In the embodiment, the invention is realized by middleware and hardware corresponding to the system LSI, hardware other than the system LSI, an interface portion corresponding to the middleware, an interface portion to intermediate between the middleware and the system LSI, an interface portion to intermediate between the middleware and the necessary hardware other than the system LSI, and a user interface portion, and when integrating these elements to form the playback apparatus, particular functions are provided by operating the respective elements in tandem.

Appropriately defining the interface corresponding to the middleware and the interface for the middleware and the system LSI enables parallel, independent development of the user interface portion, the middleware portion, and the system LSI portion of the playback apparatus respectively, and enables more efficient development. Note that there are various ways of dividing up the respective interface portions.

Notes

This concludes the description of the best modes of carrying out the invention known to the applicant at the time of application. However, further improvements and variations related to the technical topics indicated below can be added. Whether to carry out the invention as indicated in the embodiments or to use these improvements and variations is arbitrary, and is left to the discretion of the one who carries out the invention.

Embedding a Display Function Flag

A display function flag for identifying whether a stream targeted for playback is 2D or 3D exists on the BD-ROM. In the present embodiment, the display function flag is embedded in PlayList (PL) information. However, the present invention is not limited to this, and the display function flag may be embedded in a different form on the BD-ROM, provided that the flag is information that can identify the stream and whether the stream is 2D or 3D.

Physical Form of Video Plane 6

Although an example has been described in which the left eye plane and the right eye plane included in the video plane 6 shown in FIG. 4 are physically separated memories, the present invention is not limited to this, and for example, areas for the left eye plane and the right eye plane may be provided in one memory, and video data corresponding to these areas may be written in the respective planes.

Physical Form of Image Plane 8

Although an example has been described in which the left eye plane and the right eye plane included in the video plane 8 shown in FIG. 4 are physically separated memories, the present invention is not limited to this, and for example, areas for the left eye plane and the right eye plane may be provided in one memory, and video data corresponding to these areas may be written in the respective planes.

Physical Form of Interactive Graphics Plane 10

Although in FIG. 4, the interactive graphics plane 10 is shown as a left eye area (given the code (L)) and a right eye area (given the code (L)), the present invention is not limited to this. For example, physically separate areas may be used for both the left eye area (given the code (L)) and the right eye area (given the code (R)) of the interactive graphics plane 10.

Method of Adjusting Offset

The description of FIGS. 7 to 8 take as a subject an example of, when the stereo mode is OFF, and the offset of the background and video area is not adjusted (that is, when the offset is 0, more specifically, when the position in the display screen is displayed). The reason is to simplify the above description. Accordingly, the present invention is not limited to the above description, and for example, the apparatus may be configured to adjust the offsets so that, for example, the video is positioned farther back than the graphics images (subtitles), and the background data is positioned farther back than the video.

Resolution to be Supported by Background Plane 11, Image Plane 8, Interactive Graphics Plane When the playback apparatus is in 3D display mode, the background plane 11, the image plane 8, and the interactive graphics plane, in addition to the resolution of 2D mode, also may support a resolution of 1920×2160 or 1280×1440 pixels. In this case, the aspect ratio for 1920×2160 or 1280×1440 pixels becomes the aspect ratio of 16/18. The upper half can be used as an area for the left eye, and the lower half can be used as an area for the right eye.

Target of Plane Offset Setting

The plane offset may have, for example, two different shift distances for the image plane and the interactive graphics plane, and a distinction may be made between the two shift distances. If the playback apparatus includes a setup function, "0" is set as a default. In this case, graphics such as subtitles and GUI are displayed in a position on the display screen, and the effect of popping out of the screen is not achieved.

Exclusion from Composition by Composition Unit

When composition is performed in the order of 2D still image data, 2D video data, 2D graphics data (subtitle data), and 2D interactive graphics, if the video data is displayed in full screen, the 2D still image data may be excluded from the composition processing.

Flag Storage in Display Mode Storage Unit 29 Variation

A flag indicating whether to perform 2D display or 3D display in the display mode storage unit 29 may be stored by the playback state register set 12, or may be stored by both the display mode storage unit 29 and the playback state register set 12.

Creating a Calculation Table

Although there are many possible algorithms for converting a plane offset to pixel coordinates, it is preferable to use an algorithm dependent on the size or resolution of the display device to display the video, or an algorithm dependent on the size of the video to be displayed.

Also, a playback apparatus that is low on device resources may not only calculate according to a conversion algorithm, but also may prepare a scaling correspondence table, and convert the plane offsets to the pixel coordinates according to the table. Specifically, the magnification rate of the scaling factor may be limited to several patterns, and the pixel coordinates corresponding to the scaling factors may be stored in advance in a table. When a scaling factor is specified, the corresponding pixel coordinates may be transmitted back to the shift unit 28-D.

As specific values for the plane offset, three levels of values may be set, such as 50 pixels, 30 pixels, and 25 pixels. For scaling factors, three levels of values may be set, namely 2 times, 1/2 times, and 1/4 times. By limiting the plane offset and the scaling factor to these values, the calculation algorithm becomes simpler, and creating the table for the above calculation enables simplifying the implementation of the plane offset calculation unit 43.

Duplexing

Although the structure shown in the drawings includes one each of the video decoders 5a and 5b, the video plane, and the image plane addition unit, the apparatus may be configured to have two of each unit, so that processing can be performed in parallel for both the left eye image and the right eye image.

Re-Use

When storing an image plane in which decoding and scaling has been performed, this image plane may be reused. Note that when the image plane is reused, it is necessary to return a shifted image plane to the original position thereof.

Pixels in 2D

Furthermore, in a case that a 2D video stream and the depth of screen pixels in frame units of the 2D video stream are treated as input, a depth of a frontmost pixel may be extracted, and the extracted depth may be used as the plane offset.

Synchronization

Separate flags may be provided for synchronizing the left eye and the right eye, and the apparatus may be configured to only perform right eye scaling processing in the case that scaling processing has been performed for the left eye.

Factor Variations

As scaling factors, a specific specification may be made of pixel coordinates from after scaling has completed. For example, a direct specification such as a horizontal length of 1000 and a vertical length of 250 may be made.

When the scaling factor is a specific number of pixel lengths, it is preferable to calculate a ratio between before scaling and after scaling on a horizontal axis, and to obtain a new image offset by multiplying the ratio with the image offset.

Timing of Display

Although in the structure of the present embodiment, it is possible to change the depth gradually after the scaling instruction has been received, the apparatus may instead be configured to invalidate the display of subtitles, and after a certain amount of frames has elapsed, to display the video at shift pixel coordinates calculated based on a value in the subsequent information storage unit. In this method, instead of calculating a shift distance according to frames, shift and display is performed according to a pixel shift distance that can be calculated by the subsequent information storage unit, at a timing when a value in the updated number of frames storage unit arrives at a value in the frame update span storage unit. This structure enables achieving an effect of absorbing any difference in stereoscopic sense, and thus reducing eye fatigue in the user, since when the depth of the video stream after scaling is changed, the subtitles are displayed in a state that the user is accustomed to.

Mode of Recording Streams

Streams arranged on the BD-ROM may be recorded so that the right eye stream and the left eye stream are recorded separately, or may be embedded in a single stream file.

Stereoscopic Method

In contrast to, for example, displaying a normal 2-dimension movie as 24 frames per second, the parallax image method that is a premise of embodiment 1 requires displaying 48 frames per second as a total of the left eye images and the right eye images, in order to display the left eye images and the right eye images alternating on a time axis. Accordingly, this method is optimal for a display apparatus that is comparatively quick to rewrite each screen. Stereoscopic view using this type of parallax is already generally adopted in play equipment at amusement parks, etc. Since the technology for this type of stereoscopic view has been established, it is expected to be put to practical use in the home soon. Methods for achieving stereoscopic view using parallax images are not limited to this, and additionally other technologies have been proposed such as using a method of 2-color separation. Although examples have been used in the present embodiment of a successive separation method or a polarization separation method, provided that parallax images are used, the invention is not limited to these two methods.

The display apparatus 300 is also not limited to using lenticular lenses, but may instead use a device having a similar function, for example a liquid crystal element. Alternatively, stereoscopic view may be realized by providing a vertical polarizing filter for pixels for the left view, and a horizontal polarizing filter for pixels for the right eye, and by the viewer viewing the screen of the display apparatus with use of polarizing glasses including a vertical polarizing filter for pixels for the left view, and a horizontal polarizing filter for pixels for the right eye.

Image Data

It is preferable for the image data described in the embodiments to be a Presentation Graphics stream.

A Presentation Graphics stream (PG stream) is a graphics stream indicating graphics to be precisely synchronized with subtitles, etc. and pictures of a movie, and a plurality of language streams exist such as English, Japanese, and French.

The PG stream is composed of a series of functional segments, namely, PCS (Presentation Control Segment), PDS (Pallet Define Segment), WDS (WindowDefineSegment), and ODS (Object Define Segment). The ODS (Object Define Segment) is a segment that defines a graphics object that has been compressed by run-length compression with use of a pixel code and the run length. The PDS (Palette Definition Segment) is a functional segment that defines a correspondence relationship between the respective pixel codes and luminance (Y), a red color difference (Cr), a blue color difference (Cb), and a transparency value ($\alpha$ value). The PCS (PresentationControlSegment) is a functional segment that defines details of display sets in a graphics stream and defines screen composition with use of a graphics object. The screen composition may be set to Cut-In/Out, Fade-In/Out, Color Change, Scroll, or Wipe-In/Out, and acting in conjunction with PCS screen composition enables achieving an effect of displaying a next subtitle while the current subtitle gradually disappears.

When playing back a graphics stream, the graphics decoder realizes the precise synchronization described above by a pipeline of simultaneously performing processing to decode an ODS belonging to a certain display set and write a graphics object in an object buffer, along with processing to write a graphics object, obtained by decoding the ODS belonging to the preceding display set, in the plane memory from the object buffer. Since a precise synchronization with the video images is realized by performing the decode operation using the pipeline, use of the PresentationGraphics stream is not limited to playback of text such as subtitles. A PresentationGraphics stream can be used for any type of graphics playback for which precise synchronization is required, such as displaying a mascot character and causing the mascot character to move in synchronization with the video images.

Although not multiplexed with a transport stream file, in streams that achieve subtitles, aside from PG streams, there are text subtitle (textST) streams. TextST streams are streams that achieve the content of subtitles with use of character codes. A combination of these PG streams and text ST streams is called a "PGTextST stream" in BD-ROM standards. Since text subtitle (textST) streams are not multiplexed with AV streams, before playing back the text subtitle streams and the font used for developing the text of the subtitles, preloading to the memory is necessary. Also, in the text subtitle streams, for each language code, a capability flag indicating whether the language can be correctly displayed is set in the playback apparatus. Meanwhile, it is not necessary to refer to the capability flags to play back subtitles using the PresentationGraphics stream. The reason is that the subtitles in the PresentationGraphics stream need only uncompress the run length-compressed subtitles.

The playback target of the PresentationGraphics stream may be subtitle graphics chosen according to a language setting on the apparatus side. Since this structure enables achieving a display effect of using text such as is displayed in the movie images on the current DVD by subtitle graphics displayed according to the language setting on the apparatus side, the practical value is great.

The target of playback by the PresentationGraphics stream may be subtitle graphics selected according to a display setting on the apparatus side. That is, graphics for various display modes such as wide vision, pan scan, and letterbox are recorded on a BD-ROM. The apparatus selects which display mode to use according to the settings of the television to which the apparatus is connected, and displays the subtitle graphics in the selected display mode. In this case, the presentation improves when a display effect is implemented based on the PresentationGraphics stream in contrast to subtitle graphics displayed thus. Since this structure enables achieving a display effect of using text such as is displayed in the movie images by subtitles displayed according to the language setting on the apparatus side, the practical value is great. Also, the PresentationGraphics stream may be used for karaoke, and in this case, the PresentationGraphics stream may realize the display effect of changing the color of the subtitles according to the progress of a song.

(Implementation as a Program)

The application program described in the embodiments can be made as described below. First, the software developer, with use of a programming language, writes a source program to realize the content of the flowcharts and the functional structural elements. When writing the source program that embodies the content of the flowcharts and the functional structural elements, the software developer uses the class structures, variables, array variables, and external function calls to write the program in accordance with the syntax of the programming language.

The written source programs are given as files to a compiler. The compiler translates the source programs and creates an object program.

The translation by the compiler is made up of the processes of syntax analysis, optimization, resource allocation, and code generation. Syntax analysis involves performing lexical analysis and semantic analysis of the source programs, and converting the source programs to an intermediary program. Optimization involves performing operations to divide the intermediary program into basic blocks, analyze the control flow of the intermediary program, and analyze the data flow of the intermediary program. In resource allocation, to improve suitability with a command set of a targeted processor, variables in the intermediary program are allocated to a register or a memory in a targeted processor. Code generation is performed by converting the intermediary commands in the intermediary program into program code, and obtaining an object program.

The object program generated here is made up of one or more program codes for executing, on a computer, the steps of the flowcharts and the various processes carried out by the functional structural elements in the embodiments. Here, program code may be any of various types such as native code of a processor or JAVA byte code. There are various formats for realization of the steps by the program code. If it is possible to use external functions to realize the steps, call texts that call such functions become program code. Also, there are cases in which a program code for realizing one step is attributed to separate object programs. In a RISC processor in which commmand types are limited, the steps of the flowcharts may be realized by compositing calculation operation commands, logical calculation commands, branch instruction commands, etc.

When the object programs have been created, the programmer starts up a linker. The linker allocates the object programs and library programs to memory spaces, composites the object programs and library programs into one, and generates a load module. The load module generated thus is anticipated to be read by a computer, and causes the computer to execute the processing procedures and functional structural components shown in the flowcharts. The programs may be provided to users by being recorded on a recording medium that is readable by a computer.

Recording Media Variations

The recording media of the embodiments include all types of package media such as optical disks, semi-conductor memory cards, etc. The recording media of the embodiments described, as an example, an optical disk (for example, a preexisting read-only optical disk such as a BD-ROM or a DVD-ROM). However, the present invention is not limited to this. For example, it is possible to implement the present invention by writing 3D contents, including data that is necessary for implementing the present invention and has been broadcast or distributed over a network, with use of a terminal device fulfilling a function of writing 3D contents (for example, the function may be included in the playback apparatus, or may be included in an apparatus other than the playback apparatus), on a writable optical disk (for example, a preexisting writable optical disk such as BD-RE or DVD-RAM).

Structure of Video Decoders

Although in the embodiments, it was described that the function of the video decoder is fulfilled by the left eye video decoder 5a and the left eye video decoder 5b, these may be incorporated as one.

Implementation as Semiconductor Memory Card Recording Apparatus and Playback Apparatus The following describes implementing the data structure described in the embodiments as a recording apparatus that records data in a semiconductor memory, and a playback apparatus that plays back the data.

First, the following describes the technology this is premised on, which is a mechanism for protecting a copyright of data recorded on a BD-ROM.

From a standpoint, for example, of improving the confidentiality of data and copyright protection, there are cases in which portions of the data recorded on the BD-ROM are encoded as necessary.

For example, the encoded data of the data recorded on the BD-ROM may be, for example, data corresponding to a video stream, data corresponding to an audio stream, or data corresponding to a stream that includes both video and audio.

The following describes deciphering of encoded data that is among the data recorded on the BD-ROM.

In the semiconductor memory card/playback apparatus, data corresponding to a key necessary for deciphering encoded data on the BD-ROM (for example, a device key) is recorded in the playback apparatus in advance.

Meanwhile, data corresponding to the key necessary for deciphering encoded data (for example, an MKB (media key block) corresponding to the device key) and data in which the key itself, for deciphering the encoded data, is encoded (for example an encoded title key corresponding to the device key and the MKB), is recorded on the BD-ROM. Here, the device key, the MKB, and the encoded title key correspond to each other, and furthermore correspond to an identifier (for example, a volume ID) written in an area that cannot be normally copied on the BD-ROM (an area called BCA). If this composition is not correct, the code cannot be deciphered. Only if the composition is correct, the key necessary for deciphering the code (for example, a decoded title key obtained by decoding the encoded title key based on the device key, the MKB and volume key, can be elicited, and with use of the key necessary for the encoding, the encoded data can be deciphered.

When the inserted BD-ROM is played back in the playback apparatus, encoded data cannot be played back unless the BD-ROM includes a device key that is paired with a title key or MKB (or corresponds to a title key or MKB). The reason is that the key necessary for deciphering the encoded data (the title key) is itself encoded when recorded on the BD-ROM (as an encoded title key), and if the composition of the MKB and the device key is not correct, the key necessary for deciphering the code cannot be elicited.

On the other hand, the playback apparatus is configured so that, if the composition of the encoded title key, MKB, device key, and volume ID is correct, the video stream is decoded, for example with use of the key necessary for deciphering the code (the decoded title key obtained by decoding the encoded title key based on the device key, the MKB and the volume ID), and the audio stream is decoded by the audio decoder.

This completes the description of the mechanism for protecting the copyright of data recorded on the BD-ROM. This mechanism is not necessarily limited to the BD-ROM, and for example, may be applied to, for example, a readable/writable semiconductor memory (for example, a semiconductor memory card having a nonvolatile property such as an SD card).

The following describes the playback procedure of a semiconductor memory card playback apparatus. In contrast to an optical disk that is configured so that data is read from, for example, an optical disk drive, when using a semiconductor memory card, data may be read via an I/F for reading the data on the semiconductor memory card.

More specifically, when the semiconductor memory card is inserted into a slot (not depicted) in the playback apparatus, the playback apparatus and the semiconductor memory card are electrically connected via the semiconductor memory card I/F. The data recorded on the semiconductor memory card may be read via the semiconductor memory card I/F.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

The present invention can be applied to a stereoscopic video playback apparatus that performs scaling when subtitles are superimposed on a stereoscopic view video stream, in playback equipment that plays back a stereoscopic video stream, in a device that displays subtitles and graphics superimposed on a stereoscopic video stream.

REFERENCE SIGNS LIST

100 BD-ROM
200 playback apparatus 300 remote control
400 television
500 liquid crystal shutter glasses
1a BD drive
1b local storage
1c network interface
2a, 2b read buffer
3 virtual file system
4 demultiplexer
5a,b video decoder
6 video plane
7a,b image decoder
7c,d image memory
8 image plane
9 audio decoder
10 interactive graphics plane
11 background plane
12 register set
13 still scenario memory
14 playback control engine
15 scaling engine
16 composition unit
17 HDMI transmission and reception unit
18 display function flag storage unit
19 left and right processing storage unit
20 plane shift engine
21 shift distance memory
22 BD-J platform
22a rendering engine
23 dynamic scenario memory
24 mode management module
25 HDMV module
26 UO detection module
27a still image memory
27b still image decoder
28 display mode setting initial display setting unit
29 display mode storage unit

What is claimed is:

1. A playback method, comprising:
presenting graphics data on a graphics plane;
shifting the graphics plane based on first offset data to produce a first shifted graphics plane, the first offset data including a shift magnitude used to shift the first graphics plane and a shift direction used to shift the first graphics plane;
shifting the graphics plane based on second offset data to produce a second shifted graphics plane, the second offset data including a shift magnitude used to shift the second graphics plane and a shift direction used to shift the second graphics plane, the shift magnitude used to shift the first graphics plane being equal to the shift magnitude used to shift the second graphics plane, and the shift direction used to shift the first graphics plane being opposite the shift direction used to shift the second graphics plane;
presenting video data on a left-eye video plane; and
presenting video data on a right-eye video plane,
wherein the video data of the left-eye video plane and graphics data of the first shifted graphics plane are overlaid to provide a left-eye output,
wherein the video data of the right-eye video plane and graphics data of the second shifted graphics plane are overlaid to provide a right-eye output, and
wherein, when the video data on the left-eye video plane is scaled, a shift magnitude used to shift the first graphics plane is provided based on a value obtained by multiplying the shift magnitude used to shift the first graphics plane by a scaling factor which is applied to the video data on the left-eye video plane and which is inclusive of reduction.

2. A playback apparatus, comprising:
a graphics plane on which graphics data is presented;
a shift engine operable to shift the graphics plane based on first offset data to produce a first shifted graphics plane and the graphics plane based on second offset data to produce a second shifted graphics plane, the first offset data including a shift magnitude used to shift the first graphics plane and a shift direction used to shift the first graphics plane, the second offset data including a shift magnitude used to shift the second graphics plane and a shift direction used to shift the second graphics plane, the shift magnitude used to shift the first graphics plane being equal to the shift magnitude used to shift the second graphics plane, and the shift direction used to shift the first graphics plane being opposite the shift direction used to shift the second graphics plane;
a left-eye video plane on which video data is presented; and
a left-eye video plane on which video data is presented,
wherein the video data of the left-eye video plane and graphics data of the first shifted graphics plane are overlaid to provide a left-eye output,
wherein the video data of the right-eye video plane and graphics data of the second shifted graphics plane are overlaid to provide a right-eye output, and
wherein, when the video data on the left-eye video plane is scaled, a shift magnitude used to shift the first graphics plane is provided based on a value obtained by multiplying the shift magnitude used to shift the first graphics plane by a scaling factor which is applied to the video data on the left-eye video plane and which is inclusive of reduction.

* * * * *